(12) United States Patent
Iwami et al.

(10) Patent No.: US 10,869,069 B2
(45) Date of Patent: Dec. 15, 2020

(54) INFORMATION PROCESSING DEVICE AND INFORMATION PROCESSING METHOD

(71) Applicant: SONY CORPORATION, Tokyo (JP)

(72) Inventors: Hideki Iwami, Saitama (JP); Tomoya Yamaura, Tokyo (JP); Osamu Yoshimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 154 days.

(21) Appl. No.: 14/911,204

(22) PCT Filed: Aug. 18, 2014

(86) PCT No.: PCT/JP2014/071570
§ 371 (c)(1),
(2) Date: Feb. 9, 2016

(87) PCT Pub. No.: WO2015/033763
PCT Pub. Date: Mar. 12, 2015

(65) Prior Publication Data
US 2016/0198198 A1    Jul. 7, 2016

(30) Foreign Application Priority Data
Sep. 5, 2013 (JP) ................. 2013-184520

(51) Int. Cl.
*H04N 21/2343* (2011.01)
*H04N 21/258* (2011.01)
(Continued)

(52) U.S. Cl.
CPC ....... *H04N 21/2343* (2013.01); *H04N 21/238* (2013.01); *H04N 21/2385* (2013.01);
(Continued)

(58) Field of Classification Search
CPC ............ H04N 21/2343; H04N 21/238; H04N 21/2385; H04N 21/2402; H04N 21/2405; H04N 21/25833
See application file for complete search history.

(56) References Cited

U.S. PATENT DOCUMENTS 5,537,150 A     7/1996 Sugiyama et al.
8,396,983 B1    3/2013 Inskip et al.
(Continued)

FOREIGN PATENT DOCUMENTS

| CN | 102111771 A | 6/2011 |
|----|-------------|--------|
| JP | 05-308632 A | 11/1993 |

(Continued)

OTHER PUBLICATIONS

WiFi Alliance, Wifi Alliance Seamless connectivity, 2012, WiFi Alliance, all.*

(Continued)

*Primary Examiner* — Rong Le
(74) *Attorney, Agent, or Firm* — Xsensus LLP

(57) ABSTRACT

To be able to perform proper scalability transmission rate control.
An information processing device receives a stream for outputting image information from another information processing device by using wireless communication, the information processing device including a wireless communication unit and a control unit. The wireless communication unit performs communication to exchange capability information regarding the information processing device and capability information regarding the other information processing device with the other information processing device. The control unit performs scalability transmission rate control of the stream related to the other information processing
(Continued)

device based on the capability information regarding the other information processing device and a use of the information processing device.

20 Claims, 47 Drawing Sheets

(51) Int. Cl.
*H04N 21/24* (2011.01)
*H04N 21/238* (2011.01)
*H04N 21/2385* (2011.01)

(52) U.S. Cl.
CPC ..... *H04N 21/2402* (2013.01); *H04N 21/2405* (2013.01); *H04N 21/25833* (2013.01)

(56) References Cited

U.S. PATENT DOCUMENTS

| | | | |
|---|---|---|---|
| 2009/0241147 A1* | 9/2009 | Kim | H04L 1/0014 725/62 |
| 2009/0323608 A1 | 12/2009 | Adachi et al. | |
| 2010/0060801 A1* | 3/2010 | Kimura | H04H 20/08 348/732 |
| 2011/0065396 A1 | 3/2011 | Hirata | |
| 2011/0110440 A1 | 5/2011 | Kwon et al. | |
| 2011/0138427 A1 | 6/2011 | Shen et al. | |
| 2011/0158110 A1 | 6/2011 | Stacey et al. | |
| 2012/0115519 A1 | 5/2012 | Funabiki et al. | |
| 2012/0170485 A1* | 7/2012 | Maeda | H04B 7/2643 370/252 |
| 2012/0314663 A1 | 12/2012 | Dwivedi et al. | |
| 2012/0327851 A1 | 12/2012 | Wentink et al. | |
| 2013/0034042 A1 | 2/2013 | Evans et al. | |
| 2013/0148529 A1* | 6/2013 | Stacey | H04W 24/00 370/252 |
| 2013/0177071 A1* | 7/2013 | Lu | H04N 19/30 375/240.03 |
| 2013/0188928 A1* | 7/2013 | Ogawa | H04N 5/76 386/248 |

FOREIGN PATENT DOCUMENTS

| | | |
|---|---|---|
| JP | 2002-010157 A | 1/2002 |
| JP | 2008-278388 A | 11/2008 |
| JP | 2009-049889 A | 3/2009 |
| JP | 2010-114891 A | 5/2010 |
| JP | 2011-066593 A | 3/2011 |
| WO | 2012/004944 A1 | 1/2012 |

OTHER PUBLICATIONS

Extended European Search Report dated Mar. 6, 2017 in European Patent Application No. 14842985.5.
"Wi-Fi Alliance Member Symposium", Wi-Fi Alliance Vision, XP055301695, Nov. 1, 2012, pp. 1-92.
"Wi-Fi Display Technical Specification Version 1-0.0, Wi-Fi Alliance Specification", XP009172467, Aug. 24, 2012, pp. 1-149.
Search Report and Written Opinion dated Apr. 18, 2017 in Singaporean Patent Application No. 11201601366P.
International Search Report dated Nov. 18, 2014 for PCT/JP2014/071570 filed on Aug. 18, 2014.
Combined Chinese Office Action and Search Report dated May 3, 2018 in corresponding Patent Application No. 201480047302.2 (with English Translation), 37 pages.

* cited by examiner

FIG.4

MANAGEMENT INFORMATION RETENTION UNIT
390

| 391 TERMINAL IDENTIFICATION INFORMATION | 392 FREQUENCY CHANNEL | 393 RADIO-WAVE PROPAGATION MEASUREMENT INFORMATION | | | | | | 394 DEVICE INFORMATION | 395 BAND USE LEVEL | 396 OUTPUT FORM | 397 STANDBY OR WAKE-UP | 398 MULTI-RECEPTION DIVERSITY CORRESPONDENCE |
|---|---|---|---|---|---|---|---|---|---|---|---|---|
| | | PER | BER | NUMBER OF RETRANSMISSIONS OF PACKETS | THROUGHPUT | FRAME DROP | SIR (RSSI) | | | | | |
| DSC200 | 60GHz | ... | ... | ... | ... | ... | ... | MOBILE | 20Mbps | SUB | STANDBY | NO |
| DR400 | 2.4GHz | ... | ... | ... | ... | ... | ... | STATIONARY | 20Mbps | MAIN | WAKE-UP | YES | a b

FIG.18
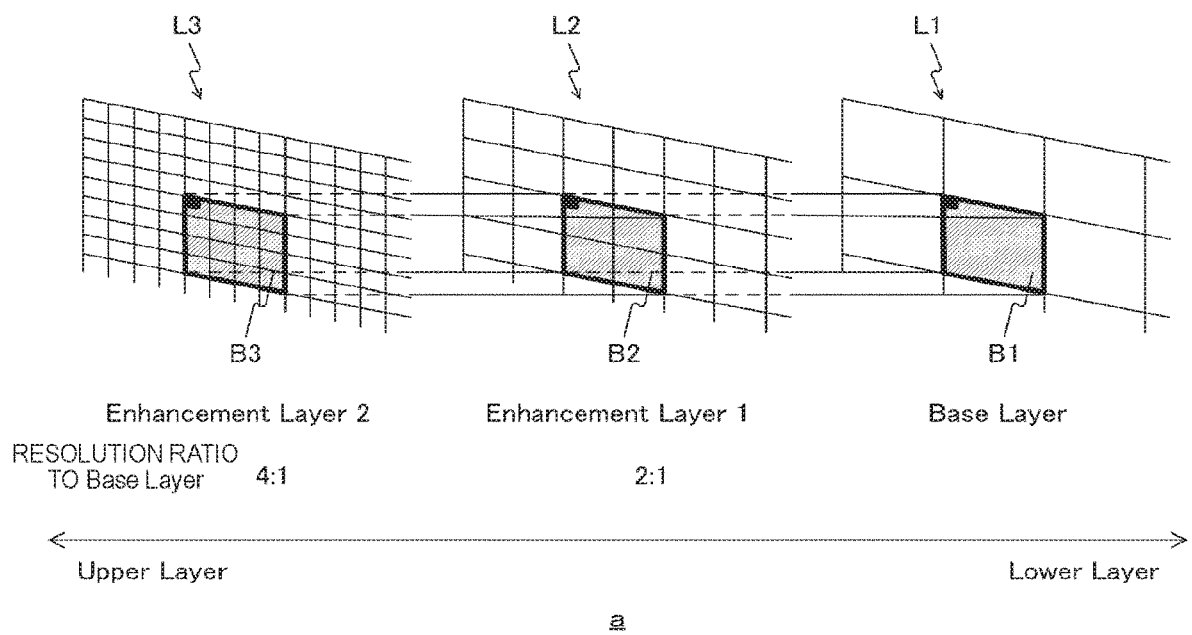
a
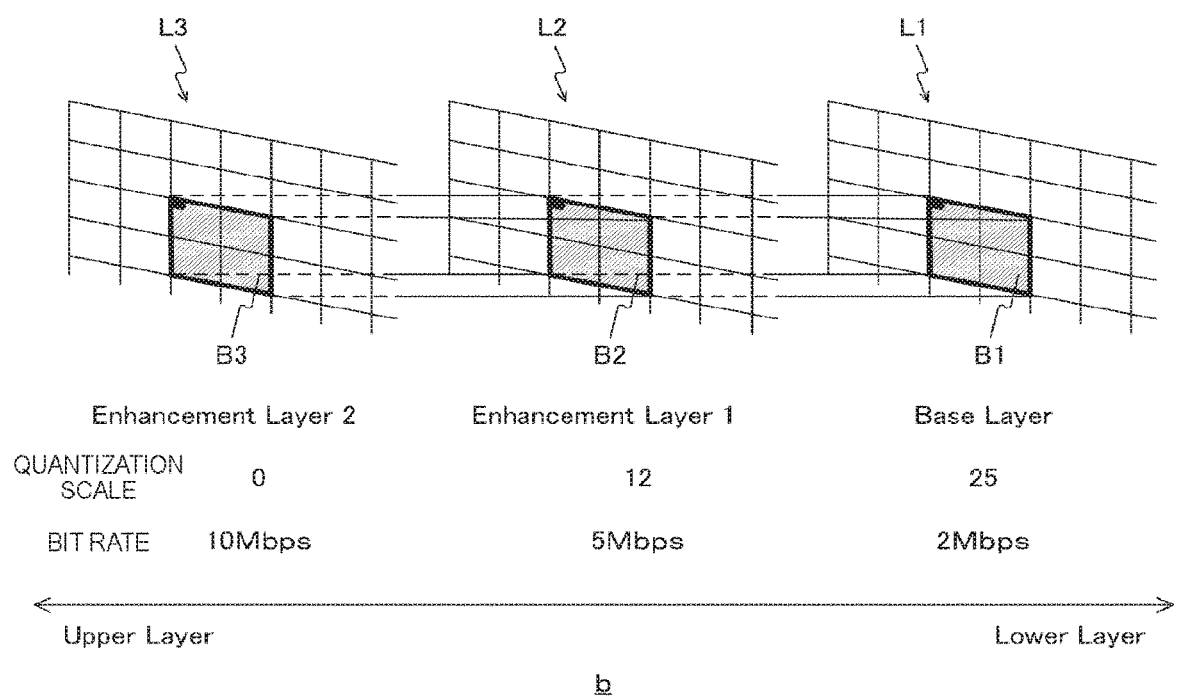
b

FIG.43
EXAMPLE OF CASE IN WHICH 128-BIT MASTER KEY (km) IS NOT STORED
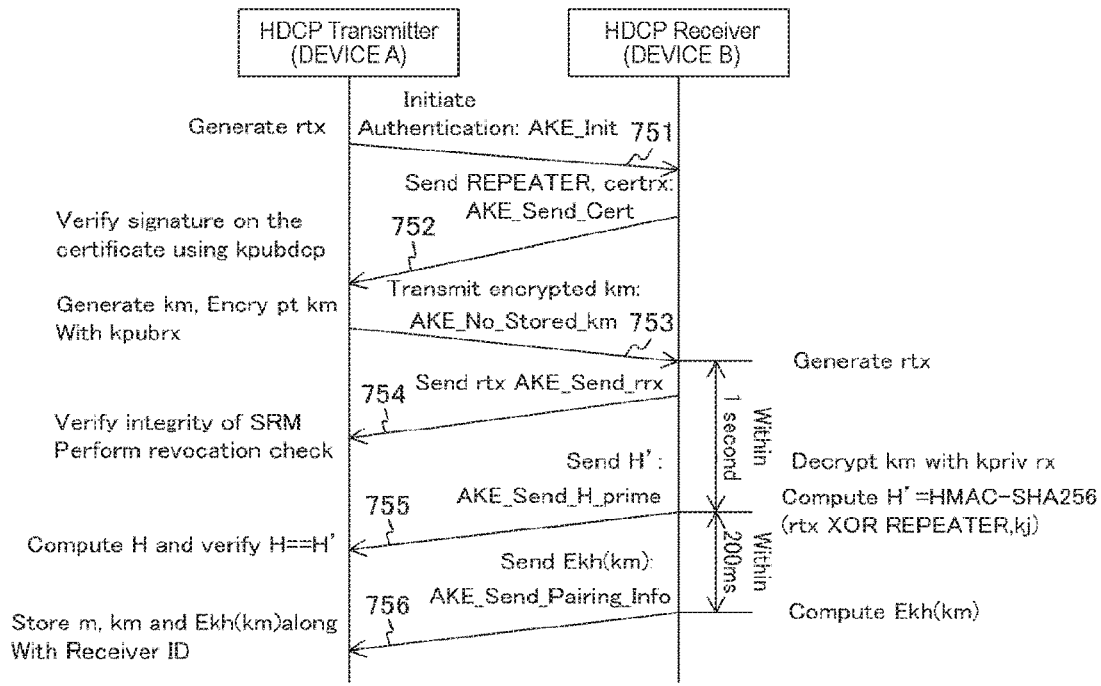
a
EXAMPLE OF CASE IN WHICH 128-BIT MASTER KEY (km) IS STORED
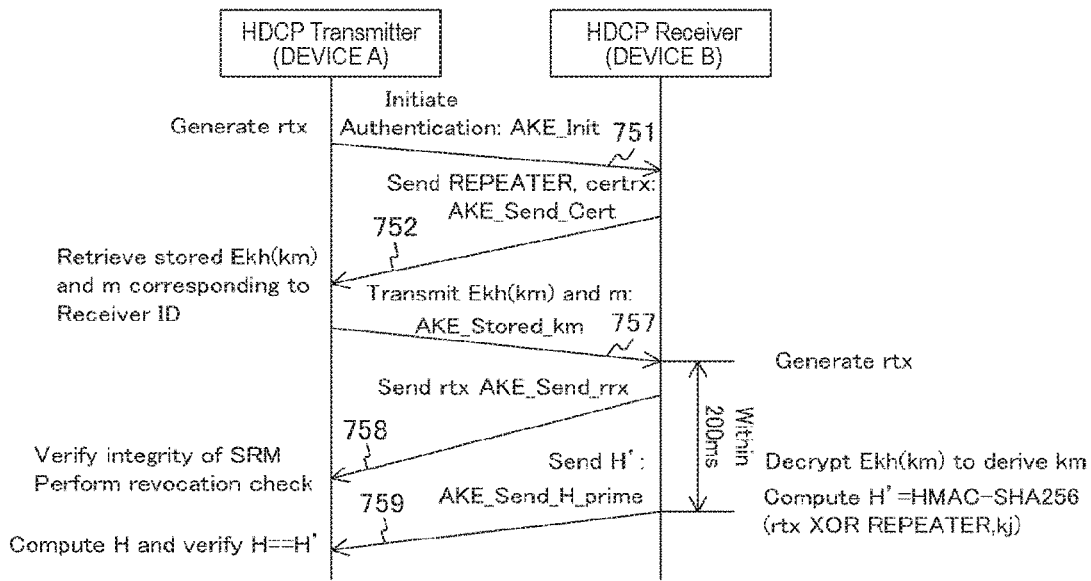
b

FIG.44
LC Message exchange sequence for HDCP 2.x
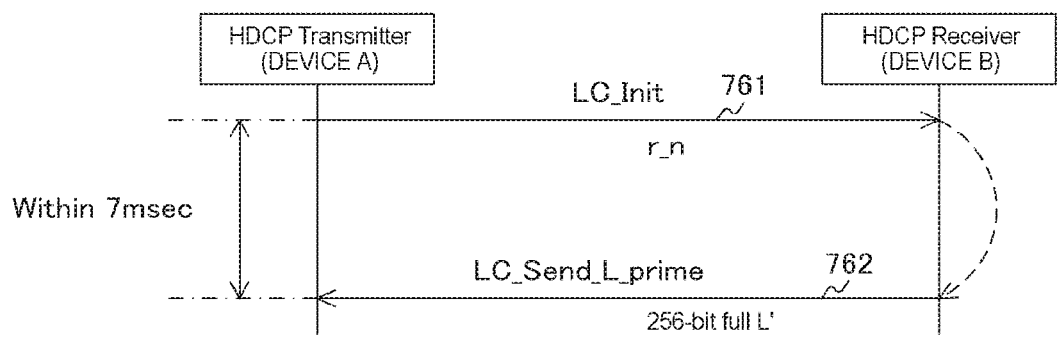
a
SKE Message exchange sequence for HDCP 2.x
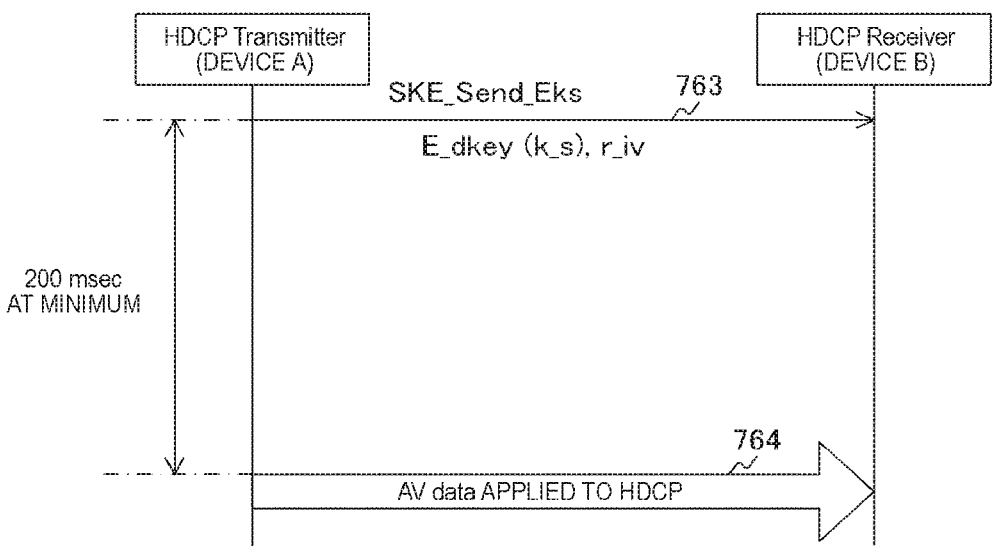
b FIG.45
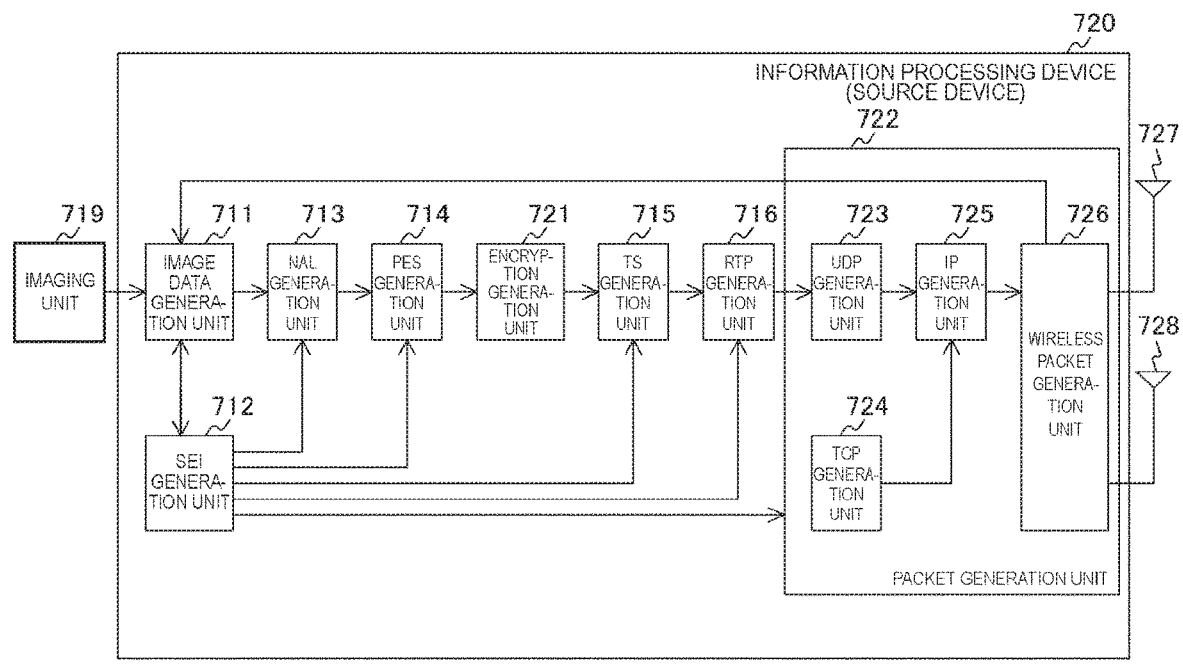
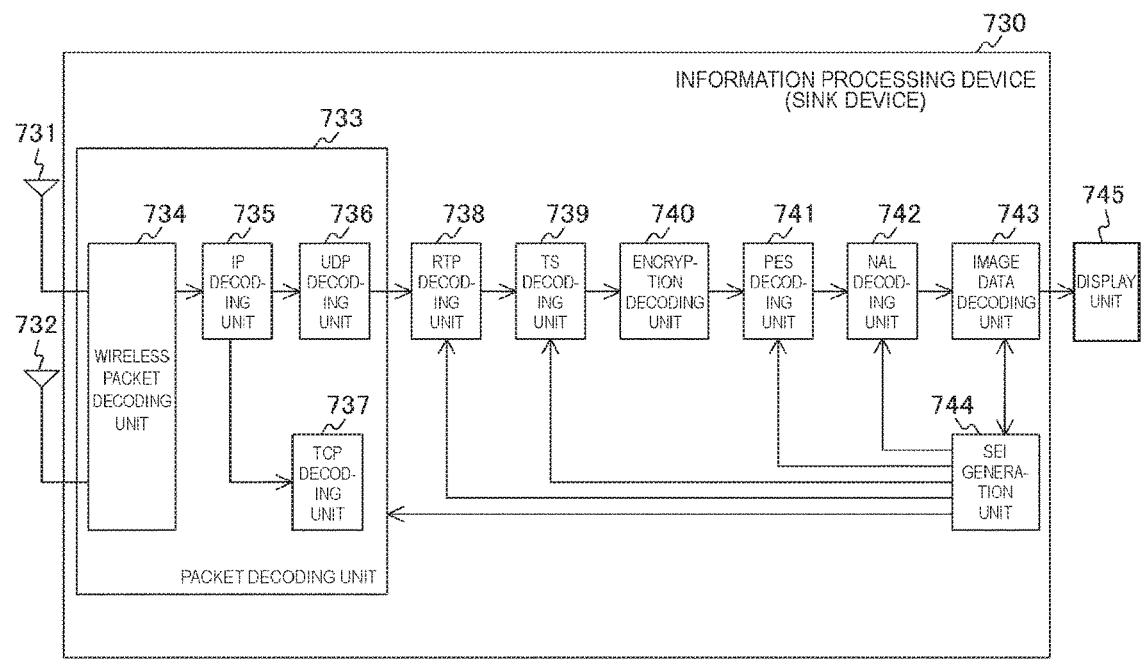

INFORMATION PROCESSING DEVICE AND INFORMATION PROCESSING METHOD

TECHNICAL FIELD

The present technology relates to an information processing device and more particularly, to an information processing device and an information processing method in which various kinds of information are exchanged using wireless communication.

BACKGROUND ART

In the related art, wireless communication technologies for exchanging various kinds of data using wireless communication are known. For example, information exchange devices that interchange various kinds of data through wireless communication between two wireless communication devices have been proposed (for example, see Patent Literature 1).

CITATION LIST

Patent Literature

Patent Literature 1: JP 2008-278388A

SUMMARY OF INVENTION

Technical Problem

According to the above-described technologies of the related art, various kinds of data can be interchanged between two information processing devices through wireless communication even when connection is not established by wired lines. For example, an image based on image data transmitted from a transmission side information processing device can be displayed on a display unit of a reception side information processing device.

Here, for example, it is assumed that there are a plurality of information processing devices on a transmission side and a plurality of images based on image data transmitted from these information processing devices are set to be displayed on a display unit of an information processing device on a reception side. In such a case, it is important to perform proper scalability transmission rate control according to the communication situation.

The present technology has been conceived taking such a situation into consideration, and aims to perform proper scalability transmission rate control.

Solution to Problem

The present technology has been made in order to solve the above-mentioned issues. According to a first aspect of the present technology, there is provided an information processing device which receives a stream for outputting image information from another information processing device by using wireless communication, an information processing method, and a program causing a computer to execute the method, the information processing device including: a wireless communication unit configured to perform communication for exchanging capability information regarding the information processing device and capability information regarding the other information processing device with the other information processing device; and a control unit configured to perform scalability transmission rate control of a stream of the other information processing device based on the capability information regarding the other information processing device and a use of the information processing device. Accordingly, an effect of performing scalability transmission rate control of the stream of the other information processing device based on the capability information regarding the other information processing device and the use of the information processing device is exhibited.

According to the first aspect, the information processing device and the other information processing device may be information processing devices which can perform wireless communication using a plurality of frequency channels, and the control unit may perform control of setting one frequency channel among the plurality of frequency channels based on the capability information regarding the other information processing device, radio wave propagation measurement information regarding communication with the other information processing device, and the use of the information processing device. Accordingly, an effect of setting one frequency channel among the plurality of frequency channels based on the capability information regarding the other information processing device, the radio wave propagation measurement information, and the use of the information processing device is exhibited.

According to the first aspect, the control unit may perform control of setting the one frequency channel based on the radio wave propagation measurement information obtained by measuring the stream from the other information processing device while the plurality of frequency channels are switched and the use of the information processing device. Accordingly, an effect of setting the one frequency channel based on the radio wave propagation measurement information obtained by measuring the stream from the other information processing device while the plurality of frequency channels are switched and the use of the information processing device is exhibited.

According to the first aspect, when communication quality specified by the radio wave propagation measurement information decreases and thus it is necessary to restrict the scalability transmission rate control, the control unit may perform control of changing a frequency channel to be used to a frequency channel with a faster data transmission speed based on the radio wave propagation measurement information and the use of the information processing device. Accordingly, an effect that, when communication quality specified by the radio wave propagation measurement information decreases and thus it is necessary to restrict the scalability transmission rate control, a frequency channel to be used is changed to a faster data transmission speed based on the radio wave propagation measurement information and the use of the information processing device is exhibited.

According to the first aspect, when communication quality specified by the radio wave propagation measurement information decreases and thus it is necessary to restrict the scalability transmission rate control, the control unit may perform control of changing a frequency channel to be used to a frequency channel with a slower data transmission speed based on the radio wave propagation measurement information and the use of the information processing device. Accordingly, an effect that, when communication quality specified by the radio wave propagation measurement information decreases and thus it is necessary to restrict the scalability transmission rate control, a frequency channel to be used is changed to a slower data transmission speed based on the radio wave propagation measurement information and the use of the information processing device is exhibited.

According to the first aspect, before a frequency channel being used is switched to another frequency channel, the control unit may perform control of restricting the scalability transmission rate. Accordingly, an effect of restricting the scalability transmission rate before a frequency channel being used is switch to another frequency channel is exhibited.

According to the first aspect, the control unit may perform control of causing display information regarding whether to disconnect a frequency channel being used to be displayed on a display unit. Accordingly, an effect of causing display information regarding whether to disconnect a frequency channel being used to be displayed on the display unit is exhibited.

According to the first aspect, when a user manipulation indicating that disconnection of a frequency channel being used is not permitted has been received, the control unit may perform control of switching the frequency channel. Accordingly, an effect of switching a frequency channel when a user manipulation indicating that disconnection of a frequency channel being used is not permitted has been received is exhibited.

According to the first aspect, the wireless communication unit may perform the exchange of the capability information by capability negotiation or capability re-negotiation defined in the Wi-Fi Display specification. Accordingly, an effect of exchanging the capability information with the capability negotiation or capability re-negotiation defined in the Wi-Fi Display specification is exhibited.

According to the first aspect, the capability information may be exchanged by an RTSP M3 Message in the capability negotiation or capability re-negotiation. Accordingly, an effect of causing the capability information to be exchanged with an RTSP M3 Message in the capability negotiation or capability re-negotiation is exhibited.

According to the first aspect, the capability information may include information indicating whether a device is a mobile device. Accordingly, an effect of using the information indicating whether a device is a mobile device is exhibited.

According to the first aspect, the capability information may include information indicating whether the use of the information processing device is changed. Accordingly, an effect of using the information indicating whether the use of the information processing device has been changed is exhibited.

According to the first aspect, the capability information may include information indicating whether a multi-reception diversity function is included. Accordingly, an effect of using the information indicating whether the multi-reception diversity function is included is exhibited.

According to the first aspect, the control unit may perform control in a manner that stop of transmission or intermittent transmission of the stream is performed when a low power-consumption mode is set. Accordingly, an effect of performing intermittent transmission or transmission stop of a stream when the low power-consumption mode is set is exhibited.

According to the first aspect, the control unit may cause at least one of a change request for a transmission rate and a change request for transmission quality to be included in a command transmitted from the information processing device to the other information processing device. Accordingly, an effect of causing at least one of a change request for a transmission rate and a change request for transmission quality to be included in a command transmitted from the information processing device to the other information processing device is exhibited.

According to the first aspect, the control unit may use a command in a state in which an HDCP session is maintained as the command. Accordingly, an effect of using a command in the state in which the HDCP session is maintained is exhibited.

According to the first aspect, the control unit may perform control in a manner that a physical layer to be used is designated from a transport layer. Accordingly, an effect of designating a physical layer to be used from a transport layer is exhibited.

According to the first aspect, the control unit may receive physical link switch information and performs control in a manner that AVC/HEVC starts from an I frame. Accordingly, an effect of receiving the physical link switch information and starting AVC/HEVC from an I frame is exhibited.

According to a second aspect of the present technology, there is provided an information processing device which transmits a stream for outputting image information to another information processing device by using wireless communication, an information processing method, and a program causing a computer to execute the method, the information processing device including: a wireless communication unit configured to perform communication for exchanging capability information regarding the information processing device and capability information regarding the other information processing device with the other information processing device; and a control unit configured to perform scalability transmission rate control of a stream of the other information processing device on the basis of control performed by the other information processing device based on the capability information regarding the information processing device and a use of the other information processing device. Accordingly, an effect of performing scalability transmission rate control of a stream of the other information processing device based on the capability information regarding the information processing device and the use of the other information processing device is exhibited.

Advantageous Effects of Invention

According to the present technology, an excellent effect of enabling proper scalability transmission rate control can be exhibited. It should be noted that the effects described herein are not necessarily limitative, and any effect described in the present disclosure may be exhibited.

BRIEF DESCRIPTION OF DRAWINGS

FIG. 4 is a diagram schematically illustrating a content example retained in a management information retention unit 390 according to the first embodiment of the present technology.

FIG. 18 is a diagram for describing examples of spatial scalability and SNR scalability used in the communication system 700 according to the second embodiment of the present technology.

FIG. 43 is a sequence chart illustrating an example of a key exchange process performed between a source device and a sink device according to the third embodiment of the present technology.

FIG. 44 is a sequence chart illustrating an example of a key exchange process performed between a source device and a sink device according to the third embodiment of the present technology.

FIG. 45 is a block diagram illustrating a functional configuration example of each information processing device included in the communication system according to the third embodiment of the present technology.

DESCRIPTION OF EMBODIMENTS

Hereinafter, modes for carrying out the present technology (hereinafter referred to as embodiments) will be described. The description will be made in the following order.

1. First embodiment (example in which control related to wireless communication is performed based on user information or management information)

2. Second embodiment (example in which scalability transmission rate control is performed)

3. Third embodiment (example in which setting and changing of multi-reception diversity and setting of content protection are performed)

1. First Embodiment

Configuration Example of Communication System

Figure 1:
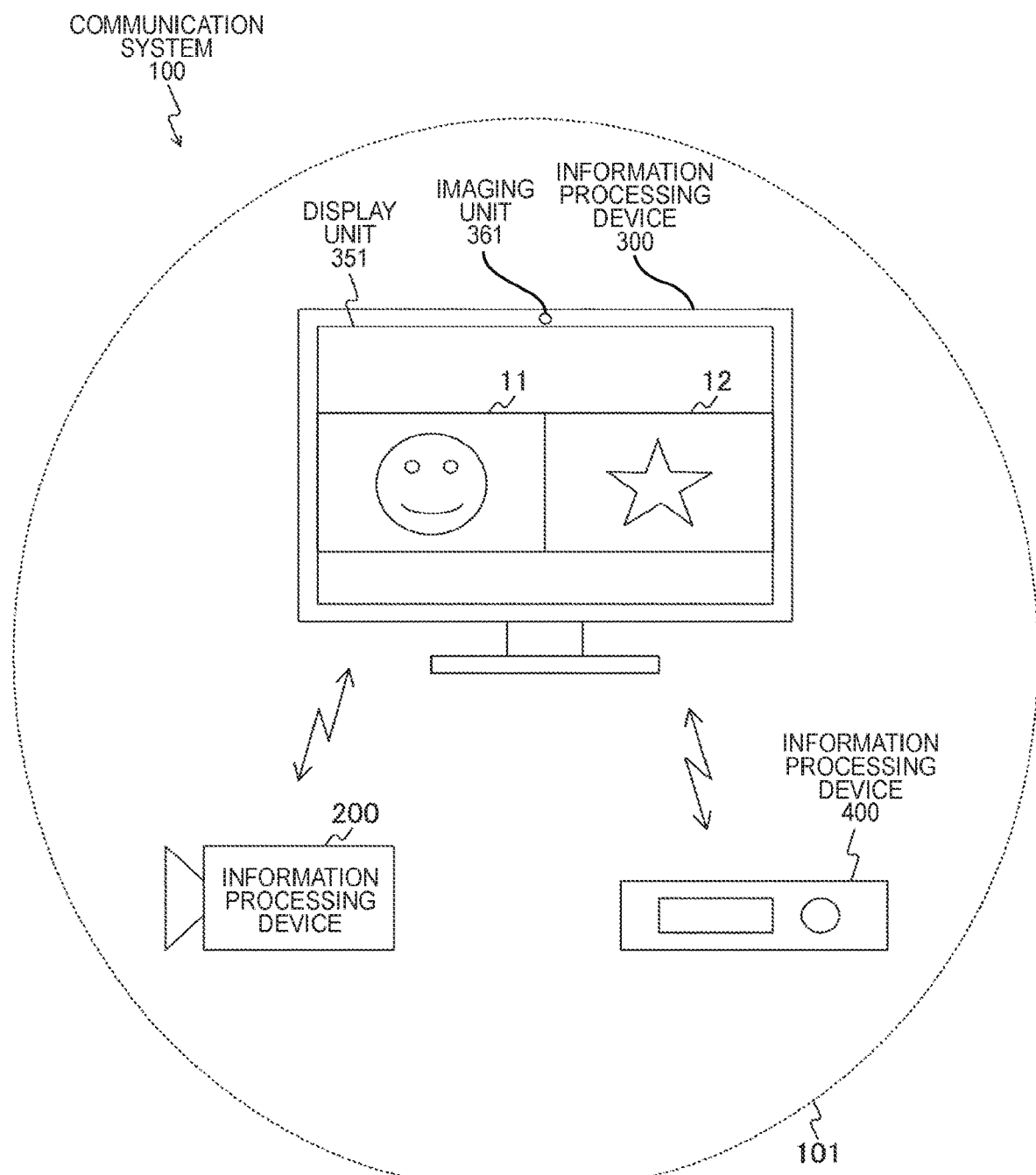
FIG. 1 is a block diagram illustrating a system configuration example of a communication system 100 according to a first embodiment of the present technology.

FIG. 1 is a block diagram illustrating a system configuration example of a communication system 100 according to a first embodiment of the present technology.

The communication system 100 includes information processing devices 200, 300, and 400. The communication system 100 is a communication system in which the information processing device 300 receives data (for example, image data or audio data) transmitted from at least one of the information processing devices 200 and 400.

The information processing devices 200, 300, and 400 are transmission and reception devices that have a wireless communication function. The information processing devices 200, 300, and 400 are, for example, display devices (for example, personal computers) or portable information processing devices (for example, smartphones or terminal terminals) that have a wireless communication function. The information processing devices 200, 300, and 400 are, for example, wireless communication devices that conform to Institute of Electrical and Electronics Engineers (IEEE) 802.11, 802.15, or 802.16, 3GPP specification (Wideband Code Division Multiple Access (W-CDMA)), Global system for Mobile Communications (GSM: registered trademark), Worldwide Interoperability for Microwave Access (WiMAX), WiMAX2, Long Term Evolution (LTE), LTE-A (Advanced), or the like. The information processing devices 200, 300, and 400 can interchange various kinds of information using the wireless communication function.

Here, an example of a case in which wireless communication using wireless Local Area Network (LAN) is performed between the information processing devices 200 and 300 or between the information processing devices 400 and 300 will be described.

As the wireless LAN, for example, Wireless Fidelity (Wi-Fi) Direct, Tunneled Direct Link Setup (TDLS), an ad-hoc network, or a mesh network can be used. As short-range wireless audio visual (AV) transmission communication used in the communication system 100, for example, Wi-Fi Certified Miracast can be used. Wi-Fi Certified Miracast is a mirroring technology for transmitting an audio or a display image reproduced with one terminal to another terminal using the technology of Wi-Fi Direct or TDLS and outputting the audio or image data similarly with the other terminal.

In Wi-Fi Certified Miracast, user Input Back Channel (UIBC) is realized on Transmission Control Protocol/Internet Protocol (TCP/IP). UIBC is a technology for transmitting manipulation information of an input device such as a mouse or a keyboard from one terminal to another terminal. Instead of Wi-Fi Certified Miracast, another remote desktop software (for example, Virtual Network Computing (VNC)) may be applied.

Here, in Wi-Fi Certified Miracast, for example, it is established that an image (video) is compressed and decompressed using H.264. For example, in Wi-Fi Certified Miracast, H.264 can be adjusted on a transmission side. An embodiment of the present technology is not limited to H.264, but can also correspond to various codecs such as H.265 (for example, high efficiency video coding (HEVC) and scalable video coding extensions of high efficiency video coding (SHVC)) and Moving Picture Experts Group (MPEG4), Joint Photographic Experts Group (JPEG) 2000, a line-based codec. In the line-based codec, for example, one or more lines are bundled and compressed or two or more lines are divided into 2×2 or more macro blocks to be compressed and decompressed. As the line-based codec, for example, wavelet transform or discrete cosine transform (DCT) can be used. Further, an image (video) may be transmitted or received with non-compression.

In the first embodiment of the present technology, an example in which the information processing device 200 sets image data and audio data generated through an imaging operation as a transmission target will be described. In the first embodiment of the present technology, an example in which the information processing device 400 sets content (for example, content formed by image data and audio data) stored in a storage unit (for example, a hard disk) as a transmission target. An electronic device (for example, a PC, a game device, a smartphone, or a tablet terminal) on which a camera is mounted as the information processing device 200 may be used. Another electronic device (for example, an imaging device, a game device, a smartphone, or a tablet terminal) that includes a display unit as the information processing device 300 may be used. The information processing device 400 may also have a tethering function and the information processing device 400 may acquire content stored in an internet services provider (IPS) via wireless or wired network and set the content as a transmission target.

For example, image data generated through an imaging operation of the information processing device 200 is transmitted to the information processing device 300 and an image 11 based on the image data is displayed on a display unit 351 of the information processing device 300. Further, content stored in a storage unit (for example, a hard disk) of the information processing device 400 is transmitted to the information processing device 300 and an image 12 based on this content is displayed on the display unit 351 of the information processing device 300.

In this way, in the first embodiment of the present technology, an example in which the information processing devices 200 and 400 serve as source side information processing devices (source devices) and the information processing device 300 serves as a sink side information processing device (sink device) will be described.

In FIG. 1, a range (information delivery range (service range) when the information processing device 300 is set as a reference) in which the information processing device 300 can perform direct communication using wireless communication is indicated as an information delivery range 101.

[Configuration Example of Information Processing Device (Source Device)]

Figure 2:
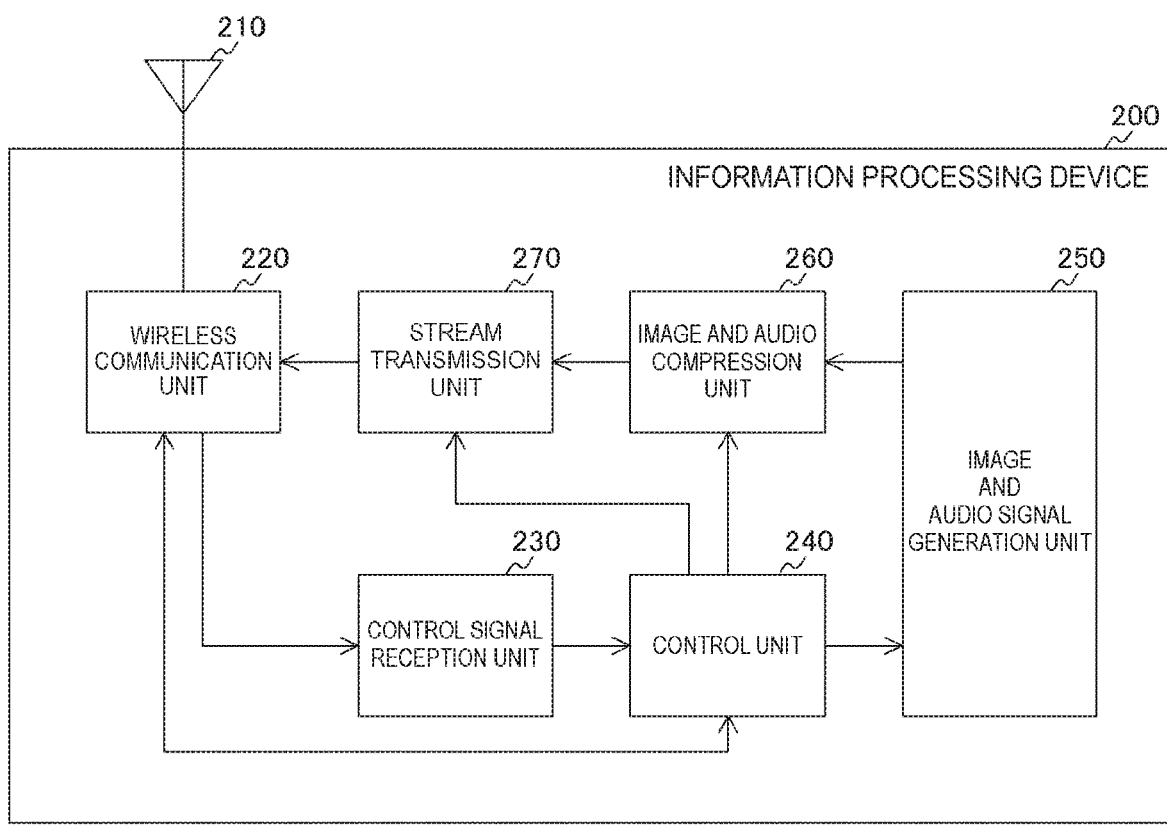
FIG. 2 is a block diagram illustrating a functional configuration example of an information processing device 200 according to the first embodiment of the present technology.

FIG. 2 is a block diagram illustrating a functional configuration example of the information processing device 200 according to the first embodiment of the present technology. The functional configuration of the information processing device 400 related to wireless communication is substantially the same as that of the information processing device 200. Therefore, in the first embodiment of the present technology, only the information processing device 200 will be described and the description of the information processing device 400 will be omitted.

The information processing device 200 includes an antenna 210, a wireless communication unit 220, a control signal reception unit 230, a control unit 240, an image and audio signal generation unit 250, an image and audio compression unit 260, and a stream transmission unit 270.

The wireless communication unit 220 transmits and receives each piece of information (for example, image data and audio data) to and from another information processing device (for example, the information processing device 300) via the antenna 210 using wireless communication under the control of the control unit 240. For example, when an image data transmission process is performed, the image data generated by the image and audio signal generation unit 250 is compressed by the image and audio compression unit 260 and the compressed image data (image stream) is transmitted from the antenna 210 via the wireless communication unit 220.

The wireless communication unit 220 is assumed to be able to transmit and receive each piece of information to and from another information processing device (for example, the information processing device 300) using a plurality of frequency channels. In the first embodiment of the present technology, an example in which the wireless communication unit 220 has a function of transmitting and receiving three kinds of frequency channels, 2.4 GHz, 5 GHz, and 60 GHz will be described. In this way, when the source device has the function of transmitting and receiving the plurality of frequency channels, a sink device (for example, the information processing device 300) can control a frequency channel to be used by each source device.

The control signal reception unit 230 acquires a control signal (for example, information interchanged with the information processing device 300) transmitted from another information processing device (for example, the information processing device 300) among the pieces of information received by the wireless communication unit 220, and then outputs the acquired control signal to the control unit 240.

The control unit 240 performs control on each piece of information to be transmitted from the information processing device 200. For example, the control unit 240 performs control on the image and audio signal generation unit 250 and the image and audio compression unit 260 based on the control signal received by the control signal reception unit 230. For example, the control unit 240 performs control such that the number of channels of audio or the resolution of image data which is a transmission target is changed or performs control such that an image region of the image data which is a transmission target is changed. That is, the control unit 240 performs transmission control of a stream which is a transmission target based on the control signal received by the control signal reception unit 230. The transmission control is, for example, data transmission speed control, scalability transmission rate control, multi-reception diversity setting control, and content protection setting control. The scalability transmission rate control will be described in a second embodiment of the present technology. The multi-reception diversity setting control and the content protection setting control will be described in a third embodiment of the present technology.

The control unit 240 may have a function of measuring a radio wave propagation situation (link radio wave propagation situation) when data is transmitted to and received from the sink device using the wireless communication and may transmit a measurement result (radio wave propagation measurement information) to the sink device.

Here, the radio wave propagation measurement information is, for example, information used to determine whether line quality with the sink device is quality with which the image data and the audio data can be transmitted and received. The radio wave propagation measurement information is used, for example, when stream transmission control (for example, the data transmission speed control, the scalability transmission rate control, the multi-reception diversity setting control, and the content protection setting control) is performed. The radio wave propagation measurement information will be described in detail with reference to FIG. 4. Instead of the radio wave propagation measurement information, the control unit 240 may count the number of retransmissions of the same packet and perform the stream transmission control based on the counted number of retransmissions.

Here, the data transmission speed mainly means an occupancy ratio to a communication line and is assumed to include a meaning of a communication speed or a communication capacity. For example, the resolution is defined as an index of image quality configured to include a component such as an image frame (the number of vertical and horizontal pixels) of the image data, or a bit rate (compression ratio) of the image data. As the index of the quality, the throughput of a stream can be used. The number of channels of audio is assumed to include a meaning of an audio recording and reproducing method such as a monaural (1.0 ch) or a stereo (2.0 ch). The number of channels of audio is defined as an index of audio quality configured to include a component such as a bit rate (compression ratio) of audio data or the number of channels. As the index of the audio quality, the throughput of a stream can be used.

The control unit 240 performs control such that a state unstable in the data rate control is improved. For example, the control unit 240 comprehends system performance information of a sink device (for example, the information processing device 300) by interchanging information with the sink device. Here, the system performance information is, for example, performance information regarding the system of the sink device. For example, the system performance information is a usable frequency channel, a resolution, Transmission Control Protocol (TCP), and User Datagram Protocol (UDP). The system performance information is, for example, information indicating each of correspondence of an encryption method, correspondence of standard definition (SD)/high definition (HD), and correspondence of a low power consumption mode. For example, the control unit 240 can select a method for the stream transmission control (for example, the data transmission speed control and the scalability transmission rate control) to further improve the entire system stability of the communication system 100 according to whether the sink device corresponds to the lower power consumption mode.

For example, the control unit 240 is assumed to insert information regarding whether the information processing device 200 is a mobile device during interchange of information with the information processing device 300. For example, capability information regarding the information processing device 200 can include information regarding whether the information processing device 200 is a mobile device. When it is comprehended that the information processing device 200 is the mobile device, the information processing device 300 can determine that it is not necessary to operate the information processing device 200 based on association with other connected information processing devices. In this way, when it is determined that it is not necessary to operate the information processing device 200, the information processing device 200 receives a transmission stop command from the information processing device 300. When the control unit 240 comprehends the transmission stop command, the control unit 240 can be powered down the function of each of the image and audio signal generation unit 250, the image and audio compression unit 260, and the stream transmission unit 270 for a given time. The control unit 240 can transition the wireless communication unit 220 to intermittent reception (which is a mode in which the wireless communication unit 220 rises up periodically so that the wireless communication unit 220 can receive a command from the information processing device 300 and the device is powered down in other cases).

The image and audio signal generation unit 250 generates data (image data and audio data) which is an output target under the control of the control unit 240 and outputs the generated data to the image and audio compression unit 260. For example, the image and audio signal generation unit 250 includes an imaging unit (not illustrated) and an audio acquisition unit (not illustrated). The imaging unit (for example, a lens, an image sensor, or a signal processing circuit) images a subject and generates an image (image data). The audio acquisition unit (for example, a microphone) acquires a surrounding audio when the image data is generated. The data generated in this way is a transmission target to be transmitted to another information processing device (for example, the information processing device 300).

The image and audio compression unit 260 compresses (encodes) the data (the image data and the audio data) generated by the image and audio signal generation unit 250 under the control of the control unit 240. Then, the image and audio compression unit 260 outputs the compressed data (the image data and the audio data) to the stream transmission unit 270. In this case, the control unit 240 may determine whether the image and audio compression unit 260 performs compression or non-compression on the data based on whether the source device or the sink device is a mobile device. That is, the control unit 240 may determine whether the compressed data is transmitted without transcoding based on whether the source device or the sink device is a mobile device. For example, when the source device is not a mobile device, the image and audio compression unit 260 can outputs the data generated by the image and audio signal generation unit 250 without compression. The image and audio compression unit 260 may be realized by performing the encoding by software or may be realized by performing the encoding by hardware. As described above, the image and audio compression unit 260 is assumed to function as a codec, but is assume to able to handle an uncompressed image or audio. Further, the image and audio compression unit 260 can also function as a scalable codec. Here, the scalable codec means, for example, a codec which can be applied freely according to the resolution of a reception side information processing device (sink device), a network environment, or the like. The scalable codec will be described in detail according to the second embodiment of the present technology.

The stream transmission unit 270 performs a transmission process of transmitting the data (the image data and the audio data) compressed by the image and audio compression unit 260 as a stream from the antenna 210 via the wireless communication unit 220 under the control of the control unit 240.

The information processing device 200 can include a display unit, an audio output unit, and a manipulation reception unit in addition to the above-described units, but these units are not illustrated in FIG. 2. The example in which the information processing device 200 generates the image data and the audio data which are the transmission targets has been described. However, the information processing device 200 may acquire image data and audio data which are transmission targets from an external device. For example, the information processing device 200 may acquire image data and audio data which are transmission targets from a web camera equipped with a microphone. The information processing device 200 may set content (for example, content formed by image data and audio data) stored in a storage device (for example, a hard disk) as a transmission target irrespective of the inside or outside of the information processing device 200. In this case, the content stored in the storage device is also assumed to be compressed content. In this case, when the compressed content is compressed in accordance with an encoding scheme defined in a standard adopted in the communication system 100, the compressed content may be transmitted without being decrypted (decoded).

A display unit (not illustrated) of the information processing device 200 is, for example, a display unit that displays an image generated by the image and audio signal generation unit 250. As the display unit, for example, a display panel such as an electro-luminescence (EL) or crystal light-emitting diode (LED) display or a liquid crystal display (LCD) can be used.

An audio output unit (not illustrated) of the information processing device 200 is, for example, an audio output unit (for example, a speaker) that outputs an audio generated by the image and audio signal generation unit 250. An image can be output from both of a transmission device and a reception device, but an audio is preferably output from only one of the transmission device and the reception device.

A manipulation reception unit (not illustrated) of the information processing device 200 is a manipulation reception unit that receives a manipulation input performed by a user and is, for example, a keyboard, a mouse, a game pad, a touch panel, a camera, or a microphone. The manipulation reception unit and the display unit can be integrally configured using a touch panel capable of performing a manipulation input when the user touches or approaches a display surface with his or her finger.

[Configuration Example of Information Processing Device (Reception Side)]

Figure 3:
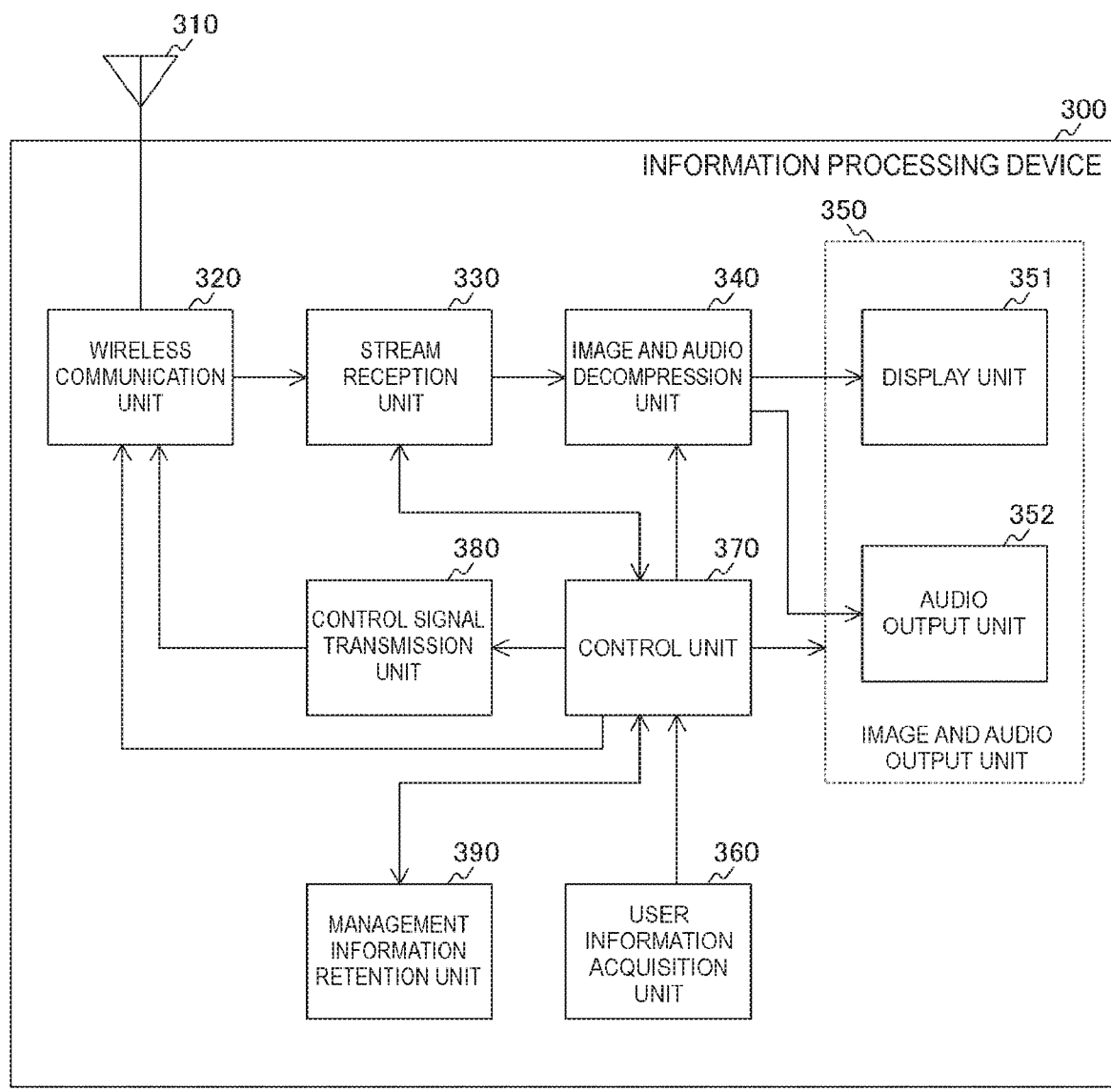
FIG. 3 is a block diagram illustrating a functional configuration example of an information processing device 300 according to the first embodiment of the present technology.

FIG. 3 is a block diagram illustrating a functional configuration example of the information processing device 300 according to the first embodiment of the present technology.

The information processing device 300 includes an antenna 310, a wireless communication unit 320, a stream reception unit 330, an image and audio decompression unit 340, an image and audio output unit 350, a user information acquisition unit 360, a control unit 370, a control signal transmission unit 380, and a management information retention unit 390.

The wireless communication unit 320 transmits and receives each piece of information (for example, image data and audio data) to and from another information processing device (for example, the information processing device 200) via the antenna 310 using wireless communication under the control of the control unit 370. For example, when an image data reception process is performed, the image data received by the antenna 310 is decompressed (decoded) by the image and audio decompression unit 340 via the wireless communication unit 320 and the stream reception unit 330. Then, the decompressed image data is supplied to the image and audio output unit 350 and an image according to the decompressed image data is output from the image and audio output unit 350. That is, the image according to the decompressed image data is displayed on a display unit 351.

The wireless communication unit 320 is assumed to be able to transmit and receive each piece of information to and from another information processing device (for example, the information processing device 200) using a plurality of frequency channels. In the first embodiment of the present technology, an example in which the wireless communication unit 320 has a function of transmitting and receiving three kinds of frequency channels, 2.4 GHz, 5 GHz, and 60 GHz will be described. That is, the wireless communication unit 320 can perform communication using a first frequency band and communication using a second frequency band of a higher data transmission speed than the first frequency band. The control unit 370 controls a frequency channel to be used among a plurality of frequency channels in wireless communication with each source device.

Link between the information processing devices 200 and 300 and link between the information processing devices 400 and 300 may be established with the same frequency channel or may be established with different frequency channels.

In the first embodiment of the present technology, an example in which the wireless communication unit 320 has the function of transmitting and receiving three kinds of frequency channels, 2.4 GHz, 5 GHz, and 60 GHz will be described, but an embodiment of the present technology is not limited thereto. For example, the wireless communication unit 320 may have a function of transmitting and receiving other frequency channels, two frequency channels, four or more frequency channels.

The stream reception unit 330 receives streams (for example, an image stream and an audio stream) and interchange information with each source device among the pieces of information received by the wireless communication unit 320 under the control of the control unit 370. Then, the stream reception unit 330 outputs the received command information to the control unit 370 and outputs the received streams to the image and audio decompression unit 340 and the control unit 370.

Here, the interchange information with each source device is information transmitted from a source device (for example, the information processing device 200) and includes, for example, a request for acquiring system performance information of the information processing device 300. The system performance information is, for example, information indicating a usable frequency channel, a resolution, TCP, and UDP or each of correspondence of an encryption method, correspondence of SD/HD, and correspondence of a low power consumption mode.

The stream reception unit 330 has a function of measuring a radio wave propagation situation (link radio wave propagation situation) when data is transmitted to and received from a sink device using the wireless communication. The stream reception unit 330 outputs a measurement result (radio wave propagation measurement information) to the control unit 370. The radio wave propagation measurement information will be described in detail with reference to FIG. 4.

The image and audio decompression unit 340 decompresses (decodes) the streams (image data and the audio data) transmitted from another information processing device (for example, the information processing device 200) under the control of the control unit 370. Then, the image and audio decompression unit 340 outputs the decompressed data (the image data and the audio data) to the image and audio output unit 350. The image and audio decompression unit 340 may be realized by performing the decoding by software or may be realized by performing the decoding by hardware. As described above, the image and audio decompression unit 340 is assumed to function as a codec, but is assume to able to handle an uncompressed image or audio. Further, the image and audio decompression unit 340 can also function as a scalable codec.

The image and audio output unit 350 includes a display unit 351 and an audio output unit 352.

The display unit 351 is a display unit that displays each image (for example, the images 11 and 12 illustrated in FIG. 1) based on the image data decompressed by the image and audio decompression unit 340. As the display unit 351, for example, a display panel such as an organic EL panel, a crystal LED display, an LCD panel can be used. As the display unit 351, a touch panel capable of performing a manipulation input when a user touches or approaches a display surface with his or her finger may be used.

The audio output unit 352 is an audio output unit (for example, a speaker) that outputs various audios (an audio and the like related to an image displayed on the display unit 351) based on the audio data decompressed by the image and audio decompression unit 340. Here, as an audio output method, for example, a method of reproducing only an audio of a source device allocated to a main image from a speaker and reproducing no audio of a source device allocated to a sub-image can be used. As another audio output method, for example, a method of setting the volume of an audio of a source device allocated to a main image as a main and lowering the volume of an audio of a source device allocated to a sub-image and reproducing the audio can be used. Other audio output methods may be used.

The user information acquisition unit 360 acquires information regarding a user (user information) and outputs the acquired user information to the control unit 370. For example, the user information acquisition unit 360 can acquire the user information by receiving an input from a manipulation reception unit (a keyboard, a mouse, a remote controller, a game pad, or a touch panel) for which the user can directly set a display method. The manipulation reception unit is, for example, a manipulation member that designates any region in an image displayed on the display unit 351. For example, the user information acquisition unit 360 can acquire the user information by receiving an input from a device which can comprehend a user's intention, such as a camera, a microphone, or any of various sensors (for example, gyro sensors and sensors detecting human bodies).

For example, the user information acquisition unit 360 acquires the user information generated through a user motion when information based on the stream received from another information processing device (for example, the information processing device 200) using the wireless communication is output from the image and audio output unit 350. The user information is, for example, user information generated through a user motion related to an image displayed on the display unit 351. For example, the user information is information generated based on a user manipulation related to the image displayed on the display unit 351.

The control unit 370 causes the management information retention unit 390 to retain each piece of information acquired by the stream reception unit 330 and manages each source device based on management information retained the management information retention unit 390. The control unit 370 performs the stream transmission control (for example, the data transmission speed control, the scalability transmission rate control, and the multi-reception diversity setting control) so that stability is improved for streams transmitted from a plurality of source devices in the entire system.

For example, the control unit 370 performs the stream transmission control (for example, the data transmission speed control, the scalability transmission rate control, the multi-reception diversity setting control, and the content protection setting control) based on the user information acquired by the user information acquisition unit 360 and the management information retained in the management information retention unit 390. Specifically, the control unit 370 generates a control signal for each source device to perform the stream transmission control (for example, the data transmission speed control, the scalability transmission rate control, the multi-reception diversity setting control, and the content protection setting control) based on the management information retained in the management information retention unit 390 and outputs the generated control signal to the control signal transmission unit 380. For example, the control unit 370 changes the resolution of an image displayed on the display unit 351 based on the user information and the management information and generates a control signal to request a transmission rate equivalent to the resolution to each source device. For example, the control unit 370 generates a control signal to change a display region of an image on the display unit 351 based on the user information and the management information. For example, the control unit 370 generates a control signal to change the size of an image on the display unit 351 based on the user information and the management information.

The control unit 370 performs control such that a frequency channel and a resolution to be used are set based on the user information and the management information. For example, the control unit 370 sets a frequency channel to be used for each source device in the plurality of frequency channels of the wireless communication unit 320. When the power consumption mode is different from each frequency channel, the control unit 370 comprehends each mode and sets the frequency channel for caring the power consumption of a mobile device. That is, the control unit 370 can separately set a first power consumption mode related to the first frequency band and a second power consumption mode related to the second frequency band of a higher data transmission speed than the first frequency band.

The control signal transmission unit 380 performs a transmission process of transmitting the control signal output from the control unit 370 to another wireless communication device via the wireless communication unit 320 and the antenna 310.

The management information retention unit 390 is a table that retains information (management information) to manage each source device connected to the information processing device 300 using the wireless communication. Content retained in the management information retention unit 390 will be described in detail with reference to FIG. 4.

[Content Example Retained in Management Information Retention Unit]

FIG. 4 is a diagram schematically illustrating a content example retained in the management information retention unit 390 according to the first embodiment of the present technology.

The management information retention unit 390 is a table that retains information (management information) to manage each source device connected to the information processing device 300 using the wireless communication. For example, in the management information retention unit 390, terminal identification information 391, a frequency channel 392, a radio wave propagation measurement information 393, device information 394, a band use level 395, an output form 396, standby or wake-up 397, and multi-reception diversity correspondence 398 are retained in association therewith.

In the terminal identification information 391, identification information is stored to identify the source devices connected to the information processing device 300 using the wireless communication.

In the frequency channel 392, a frequency channel actually used by the source device connected to the information processing device 300 using the wireless communication is stored.

In the radio wave propagation measurement information 393, radio wave propagation measurement information regarding the source device connected to the information processing device 300 using the wireless communication is stored. The radio wave propagation measurement information is measured by the stream reception unit 330 for each source device connected to the information processing device 300 using the wireless communication.

As the radio wave propagation measurement information 393, for example, a packet error rate (PER), a bit error rate (BER), the number of retransmissions of packets, and a throughput are stored. As the radio wave propagation measurement information 393, for example, frame drop, a signal to interference ratio (SIR), and a received signal strength indicator (RSSI) are stored. Here, instead of the SIR, a signal to interference plus noise ratio (SINR) may be used. The radio wave propagation measurement information 393 illustrated in FIG. 4 is an example. At least one piece of information among the pieces of information may be stored or another piece of radio wave propagation measurement information may be measured by the stream reception unit 330 to be stored. The radio wave propagation measurement information measured by the source device may be acquired and stored. Packet delay received by a reception side may be determined and information regarding the packet delay may be used as radio wave propagation measurement information. The packet delay serves as one index related to radio wave propagation since delay occurs in transmission to the reception side through a retransmission process in layer 2 at the time of occurrence of an error. The packet delay serves as, for example, an index indicating where link characteristics deteriorate in a wireless system in which a plurality of devices share wireless bands.

In the device information 394, classification of the source device (an attribute of the source device) connected to the information processing device 300 using the wireless communication is stored. For example, either of a mobile device and a stationary device is stored as the classification of the source device. Either of a device of which a power source is inserted and another device may be stored as the classification of the source device. Either of a battery-driven device and another device may be stored as the classification of the source device.

In the band use level 395, a band use level of the source device connected to the information processing device 300 using the wireless communication is stored. As the band use level, for example, a resolution or a throughput can be used. For example, in the band use level, a throughput during use may be stored, a pre-decided table may be prepared, and a number indicating correspondence of a range of the table may be stored and managed.

In the output form 396, a data output form based on a stream transmitted from the source device connected to the information processing device 300 using the wireless communication is stored. For example, a display form (a main image or a sub-image) of the image data which is displayed on the display unit 351 and which is based on the stream transmitted from the source device is stored. For example, an output form (a main audio or a sub-audio) of the audio data which is output from the audio output unit 352 and which is based on the stream transmitted from the source device is stored. A format in which the sub-image is not displayed may be realized in accordance with the display form.

In the standby or wake-up 397, a mode (a standby mode or a wake-up mode) of the source device connected to the information processing device 300 using the wireless communication is stored. The standby mode and the wake-up mode will be described in detail with reference to FIGS. 6 to 8.

In the multi-reception diversity correspondence 398, information indicating whether the source device connected to the information processing device 300 using the wireless communication corresponds to the multi-reception diversity is stored. The multi-reception diversity will be described in detail according to the third embodiment of the present technology.

In this way, the management information retained in the management information retention unit 390 is information for associating the identification information (the terminal identification information 391) used to identify the other information processing device with the capability information regarding the other information processing device for management. The management information retained in the management information retention unit 390 includes at least the information (the radio wave propagation measurement information 393) regarding the radio wave propagation measurement related to the communication with the other information processing device and the information (the standby or wake-up 397) regarding power consumption as the capability information regarding the other information processing device. The management information retained in the management information retention unit 390 includes the information (the output form 396) regarding an output form for displaying the image information as the capability information regarding the other information processing device. The information regarding the output form is, for example, information indicating that the image information is displayed as main information or sub-information.

[Transition Example of Image]

FIG. 5 is a diagram illustrating a transition example of images displayed on the display unit 351 of the information processing device 300 according to the first embodiment of the present technology.

Figure 5A:
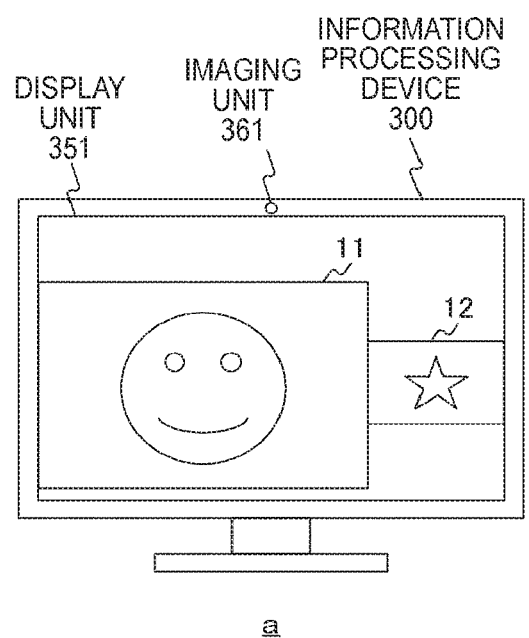
FIG. 5 is a diagram illustrating a transition example of images displayed on a display unit 351 of the information processing device 300 according to the first embodiment of the present technology.

FIG. 5*a* illustrates an example of a display form in which the images 11 and 12 are displayed on the display unit 351 of the information processing device 300 by setting the image 11 as a main image and setting the image 12 as a sub-image.

Figure 5B:
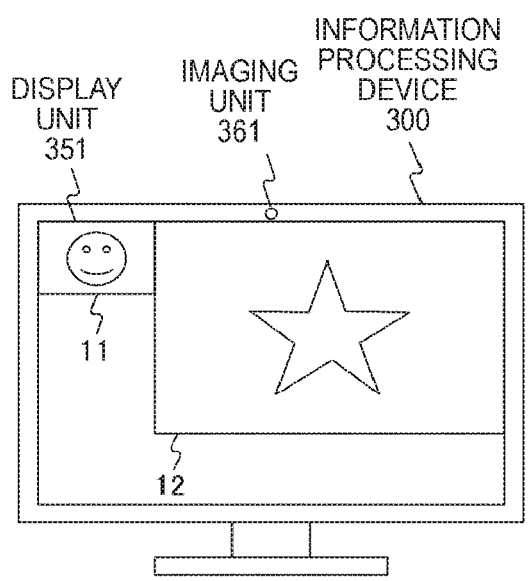

FIG. 5*b* illustrates an example of a display form in which the images 11 and 12 are displayed on the display unit 351 of the information processing device 300 by setting the image 11 as a sub-image and setting the image 12 as a main image.

For example, a case in which each of the information processing devices 200 and 400 transmits a stream (the image data and the audio data) with a standard resolution to the information processing device 300 is assumed. In this case, as illustrated in FIG. 1, the image 11 based on the image data from the information processing device 200 and the image 12 based on the image data from the information processing device 400 can be displayed on the display unit 351 of the information processing device 300 so that the sizes of the images 11 and 12 are the same. In this example, a given resolution and a display region are defined to be the same, but a scaler function may be added to the display unit 351 so that the images 11 and 12 are rescaled and displayed on the display unit 351. However, in the embodiments of the present technology, to facilitate the description, this function is assumed not to be used in the description.

In the display forms of the images 11 and 12, for example, the display forms set at the time of the previous communication may be retained and the images 11 and 12 may be displayed on the display unit 351 of the information processing device 300 according to the display forms.

The display forms of the images 11 and 12 may be decided based on an order of connection to the information processing device 300. For example, a case in which the information processing device 200 is first connected to the information processing device 300 and the information processing device 400 is connected to the information processing device 300 after the connection is assumed. In this case, the images 11 and 12 are displayed on the display unit 351 of the information processing device 300 by setting the image 11 as the main image and setting the image 12 as the sub-image. That is, the images may be displayed in the procedure of the main image and the sub-image based on the order of the connection to the information processing device 300.

As illustrated in FIG. 5a, when the images 11 and 12 are displayed on the display unit 351 by setting the image 11 as the main image and setting the image 12 as the sub-image, user information for setting the image 12 as the main image is assumed to be acquired by the user information acquisition unit 360. For example, when a viewer performs a manipulation of setting the image 12 as the main image using a pointer such as a remote controller or a gesture, the user information for setting the image 12 as the main image is acquired by the user information acquisition unit 360. In this case, as illustrated in FIG. 5b, the images 11 and 12 are displayed on the display unit 351 by setting the image 12 as the main image and setting the image 11 as the sub-image. Further, display positions of the images 11 and 12 on the display surface of the display unit 351 are decided based on user information (for example, a manual manipulation or a line of sight) acquired by the user information acquisition unit 360.

[Communication Example]

Figure 6:
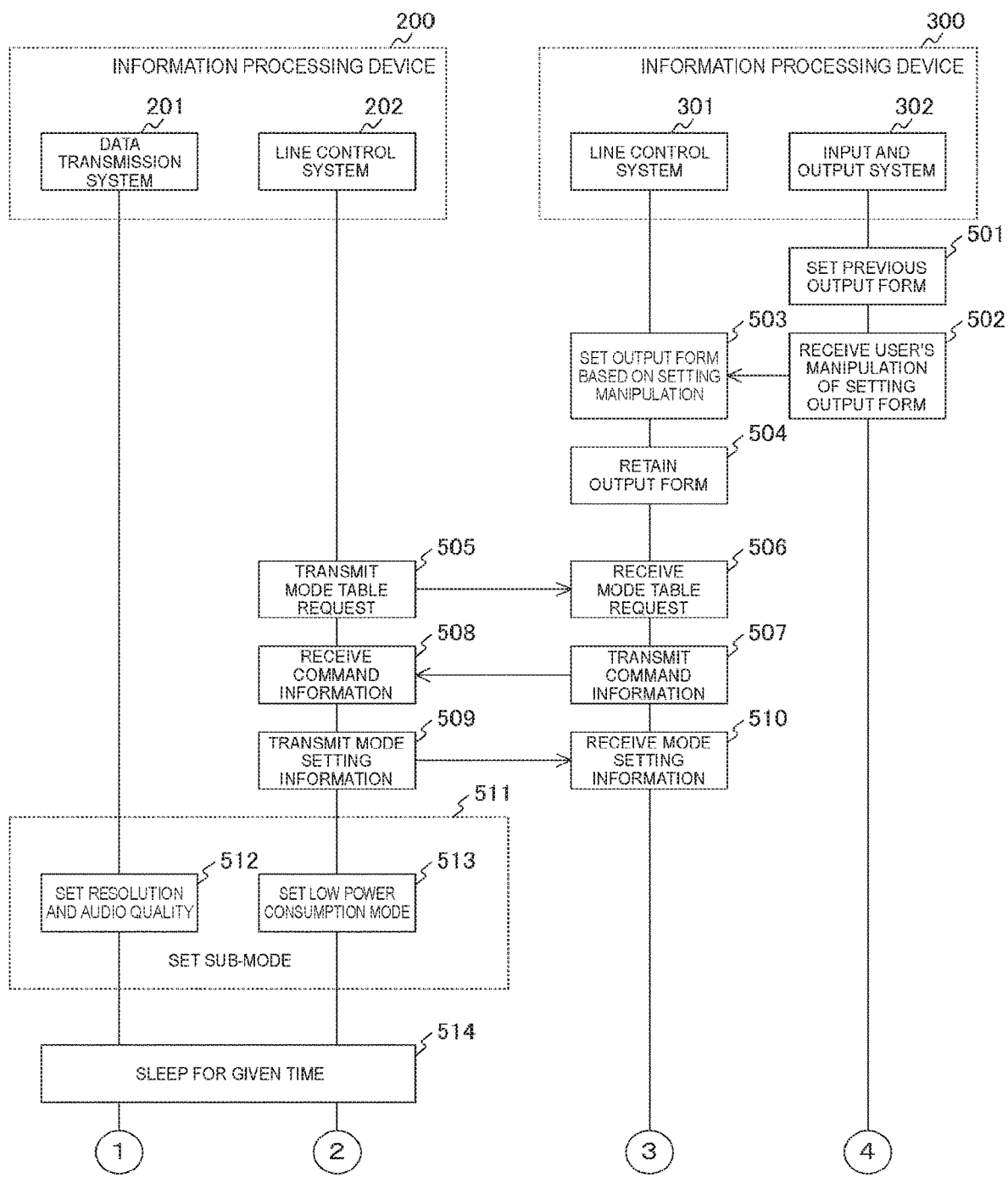
FIG. 6 is a sequence chart illustrating a communication process example between devices included in the communication system 100 according to the first embodiment of the present technology.
Figure 7:
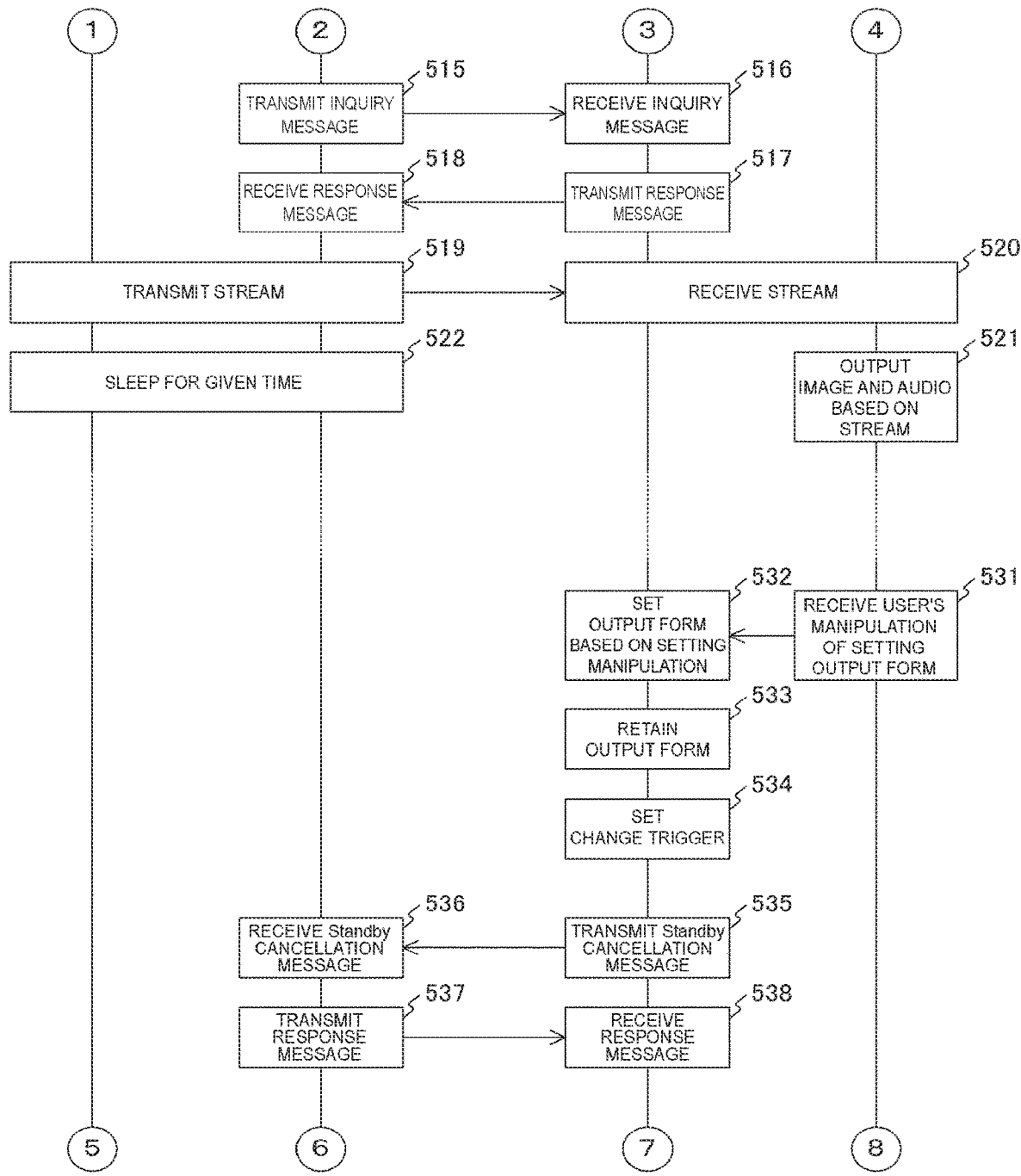
FIG. 7 is a sequence chart illustrating a communication process example between devices included in the communication system 100 according to the first embodiment of the present technology.
Figure 8:
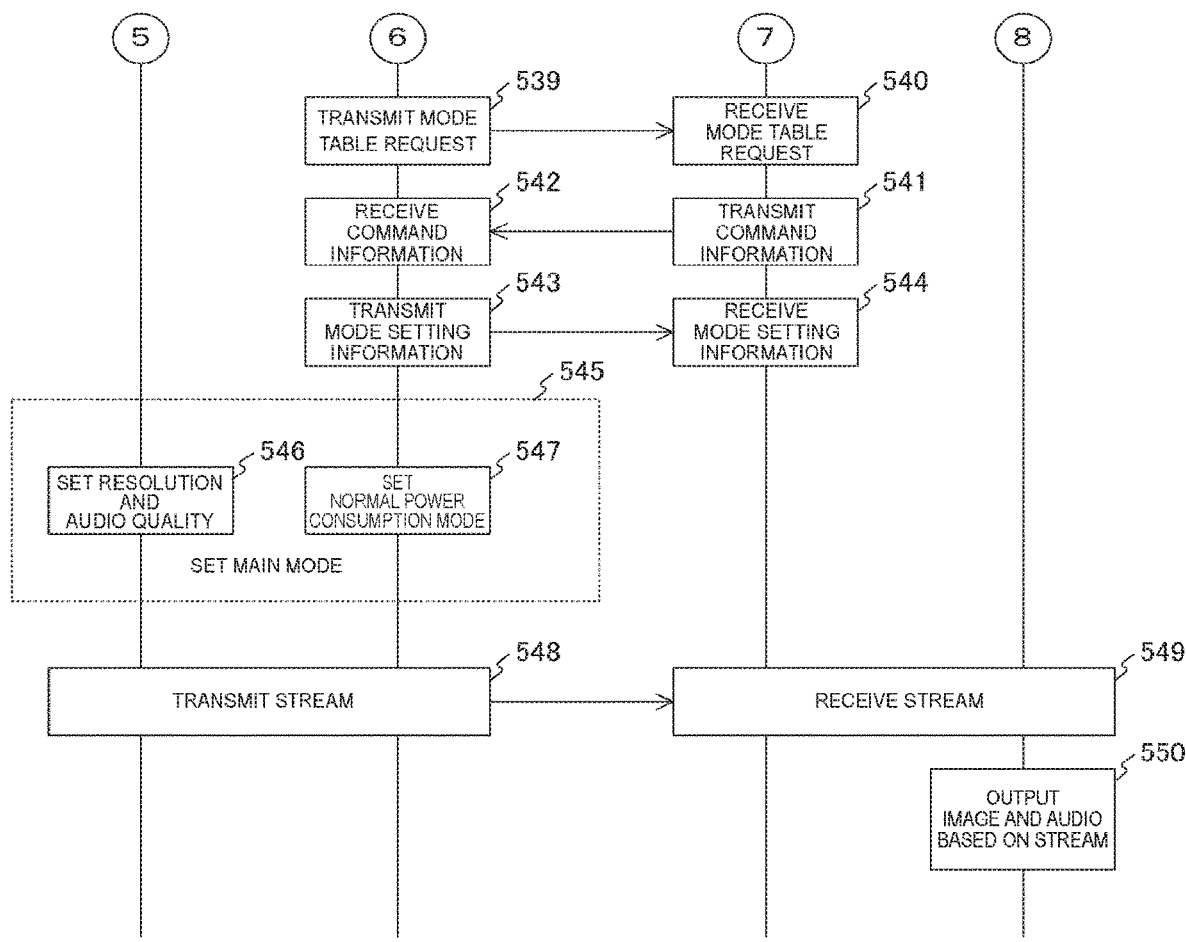
FIG. 8 is a sequence chart illustrating a communication process example between devices included in the communication system 100 according to the first embodiment of the present technology.

FIGS. 6 to 8 are sequence charts illustrating a communication process example between the devices included in the communication system 100 according to the first embodiment of the present technology. FIGS. 6 to 8 illustrate an example of a communication process between the information processing devices 200 and 300.

In FIGS. 6 to 8, the image and audio signal generation unit 250, the image and audio compression unit 260, and the stream transmission unit 270 among the units included in the information processing device 200 are illustrated as a data transmission system 201. The antenna 210, the wireless communication unit 220, the control signal reception unit 230, and the control unit 240 are illustrated as a line control system 202.

In FIGS. 6 to 8, the antenna 310, the wireless communication unit 320, the stream reception unit 330, the control unit 370, and the control signal transmission unit 380 in the configuration of the information processing device 300 are illustrated as a line control system 301. The image and audio decompression unit 340, the image and audio output unit 350, and the user information acquisition unit 360 are illustrated as an input and output system 302.

In FIGS. 6 to 8, first, an example in which an image based on the image data from the information processing device 200 is displayed as a sub-image on the display unit 351 of the information processing device 300 and a low power consumption mode is set in the information processing device 200 is illustrated. Subsequently, an example in which an image based on the image data from the information processing device 200 is displayed as a main image on the display unit 351 and a normal power consumption mode is set in the information processing device 200 is illustrated. That is, in FIGS. 6 to 8, a connection setup example of the information processing devices 200 and 300 and a transition example of the power consumption mode in the information processing device 200 are illustrated.

First, when the information processing device 300 is powered up, a previous output form (which is an output form when the information processing device 300 is powered down) is set as an output form (which is an image display form and an audio output form) of the information processing device 300 (501). The control unit 370 of the information processing device 300 causes the management information retention unit 390 to retain the management information of each source device connected to the information processing device 300 using the wireless communication (illustrated in FIG. 4). As illustrated in FIG. 5, the control unit 370 of the information processing device 300 causes the display unit 351 to display the images 11 and 12 corresponding to two streams respectively transmitted from the information processing devices 200 and 400 based on the previous output form.

Subsequently, a case in which the user performs a manipulation of setting the output form (changing manipulation) is assumed (502). In this case, a control signal related to the setting manipulation is acquired as the user information by the user information acquisition unit 360 and the user information is output to the control unit 370. Then, the control unit 370 changes the content retained in the management information retention unit 390 (illustrated in FIG. 4) based on the user information (503 and 504). For example, as illustrated in FIG. 5b, a case in which the setting manipulation (changing manipulation) is performed to set the image 11 based on the image data from the information processing device 200 as the sub-image is assumed. In this case, the control unit 370 changes the output form 396 (illustrated in FIG. 4) of the information processing device 200 in the management information retention unit 390 to "SUB" (503 and 504).

The information processing device 200 transmits a mode table request (an inquiry request of the resolution, the audio quality, the low power consumption mode, and the like) to the information processing device 300 periodically or aperiodically (also including only the start time) (505 and 506). The mode table request is a request for transmitting each piece of information (which is information used to communicate with the information processing device 200 with the management information regarding the information processing device 300 (for example, resolution information or the like which can be displayed by the information processing device 200)) managed in the information processing device 300.

When the information processing device 300 receives the mode table request (506), the information processing device 300 transmits command information according to the mode table request (507 and 508). The command information is, for example, information regarding the information processing device 200 used for the information processing device 300 to give a setting demand to the information processing device 200 along with the radio wave propagation environment and the display form. For example, the command information is information that includes output form information (for example, a main image and a sub-image) of the resolution and the audio quality, whether to correspond to the low power consumption mode, a maker name, and presence or absence of a multi-reception diversity function. For example, the command information is information that includes the resolution and the audio quality, the kinds of image and audio codecs, presence of absence of a 3D function, presence or absence of the content protection, the display size of a display device, topology information, a usable protocol, setting information (port information or the like) of the protocol, connection interface information (the type of connector or the like), horizontal synchronization and vertical synchronization positions, performance priority request information of a source device, a mode control table response to whether to correspond to the low power consumption mode, a maximum transmission throughput or a receivable maximum throughput of wireless transmission, central processing unit (CPU) power, a battery remaining quantity, and power supply information. Each piece of information is included in a part of capability information. Here, the output form information of the resolution and the audio quality regarding the information processing device 200 is, for example, information indicating whether the output form of the data from the information processing device 200 is a main form or a sub-form. The information processing device 300 transmits the command information including a demand for the setting of the resolution and the audio quality or the low power consumption mode as a parameter from the viewpoint of the information processing device 300. Besides each piece of information regarding the information processing device 200, the information processing device 300 may transmit each piece of information regarding all the source devices as the command information. In this case, the information processing device 200 selects and uses only information dedicated for the own information processing device. When a device that conforms to Wi-Fi Certified Miracast, the device corresponds to wfd-audio-codecs, wfd-video-formats, wfd-content-protection, wfd-displayedid, wfd-coupledsink, wfd-client-rtpports, wfd-I2C, wfd-uibccapability, wfd-connectortype, wfd-sandby-resume-capability, and the like defined as RTSP Message, but message content to be transmitted is assumed not to be limited in these commands.

When the information processing device 200 receives the command information (508), the control unit 240 of the information processing device 200 specifies whether the output form of the data from the information processing device 200 is the main form or the sub-form based on the command information. Based on the command information, the control unit 240 of the information processing device 200 determines whether the information processing device 300 has a function corresponding to a power consumption operation mode. Subsequently, the control unit 240 of the information processing device 200 transmits mode setting information indicating that the specified output form is set to the information processing device 300 (509 and 510). Here, the sub-form is assumed to be specified as the output form of the data from the information processing device 200. The information processing device 300 is assumed to have a function corresponding to the low power consumption mode. Accordingly, the control unit 240 of the information processing device 200 transmits mode setting information for notifying the information processing device 300 that the specified output form (sub-form) is set and the low power consumption mode is set, to the information processing device 300 (509 and 510).

In this example, the example in which the image is specified as the main image or the sub-image and the low power consumption mode is set based on the command information has been described, but the low power consumption mode may be set without using the determination of the main image or the sub-image as a reference. For example, the low power consumption mode may be set by interchanging a permission flag indicating that the mode can transition to the low power consumption mode between the source and sink devices.

Subsequently, the control unit 240 of the information processing device 200 sets a sub-mode as the transmission mode (511). Accordingly, in the data transmission system 201, audio quality is set to output a resolution and sub-audio for displaying the sub-image (512). In the line control system 202, the low power consumption mode is set (513).

Here, when the low power consumption mode is set in this way, both of the sink and source devices are assumed to have the function. For example, a mobile device (for example, a cellular phone, a smartphone, or a tablet terminal) is driven by a battery to operate in many cases. Therefore, when the output form of the data from the own information processing device is not the main form (when the output form is the sub-form), it is desirable to reduce battery consumption of the own information processing device as much as possible. Accordingly, in the source device in which the output form in the sink device is set to the sub-form, it is desirable to set the low power consumption mode. Further, in the setting process (512), only an audio of the source device allocated to the main image may be set to be reproduced from a speaker and the audio of the source device allocated to the sub-image may be set not to be reproduced. The volume of the audio of the source device allocated to the main image may be set as a main and the volume of the audio of the source device allocated to the sub-image may be set to be lowered and reproduced.

In this way, the control unit 370 of the information processing device 300 performs control such that the low power consumption mode in the information processing device 200 is set when the output form is set as the sub-image (sub-display). That is, the control unit 370 of the information processing device 300 performs control such that the power consumption mode is set in the information processing device 200 based on the output form of the display unit 351 in which the image information is output based on the stream.

When the low power consumption mode is set in this way (513), the control unit 240 of the information processing device 200 starts intermittent transmission (514 to 522).

Specifically, the information processing device 200 stops the transmission process only for a given time and sleeps each unit (514). Subsequently, when the given time passes (514), the information processing device 200 wakes up each unit of the information processing device 200 to perform the transmission process and performs the transmission process to the information processing device 300 (515 to 520).

For example, the control unit 240 of the information processing device 200 transmits an inquiry message for confirming whether any change is made in the information processing device 300 to the information processing device 300 (for example, a change in the output form) (515 and 516).

When the inquiry message is received (516), the control unit 370 of the information processing device 300 transmits a response message to the information processing device 200 to notify whether any change is made (for example, the change in the output form) (517 and 518). Here, it is assumed that no change is made in the information processing device 300 (for example, the change in the output form). Therefore, the control unit 370 of the information processing device 300 transmits a response message for notifying that no change is made (for example, the change in the output form) to the information processing device 200 (517 and 518).

When the response message indicating that no change is made (for example, the change in the output form) in this way (518), it is not necessary to change the setting in the information processing device 200. Therefore, the control unit 240 of the information processing device 200 transmits a stream for outputting the sub-image and the sub-audio to the information processing device 300 (519 and 520). When the information processing device 300 receives the stream in this way (520), the information processing device 300 outputs the image and the audio based on the received stream (521). For example, as illustrated in FIG. 5*b*, the image 11 based on the stream from the information processing device 200 is displayed as the sub-image on the display unit 351.

When the transmission process ends (519), the information processing device 200 stops the transmission process only for a given time and sleeps each unit (522). The intermittent transmission is continuously performed until a change request is given from the information processing device 300.

Here, in the intermittent transmission, a period in which the stream is not transmitted from the information processing device 200 occurs. Therefore, the information processing device 300 preferably performs a display process of interpolating and displaying the image corresponding to the stream finally received from the information processing device 200. However, the information processing device 300 is assumed not to have an interpolation process function either. In this case, during the sleep period, the image from the information processing device 200 may not be displayed on the display unit 351. Therefore, when the information processing device 300 does not have the interpolation process function, the image data from the information processing device 200 may be continuously transmitted. For example, in the stream which is a transmission target from the information processing device 200, the final image data at the time of the transmission stop is retained in a transmission buffer. During the sleep period, the image processing of the information processing device 200 is stopped, but the transmission process is continuously performed in a wireless link and the image data retained in the transmission buffer is continuously transmitted.

During the sleep period, only the image corresponding to the stream transmitted from the information processing device 400 may be displayed on the display unit 351. For example, the image corresponding to the stream transmitted from the information processing device 400 can be displayed on the entire surface of the display unit 351.

Next, an example of the case in which the user performs a manipulation of setting the output form (changing manipulation) will be described.

When the user performs the manipulation of setting the output form (changing manipulation) (531), as described above, the control unit 370 changes the content retained in the management information retention unit 390 (illustrated in FIG. 4) based on the user information related to the setting manipulation (532 and 533). For example, as illustrated in FIG. 5a, the case in which the user performs the setting manipulation (changing manipulation) of setting the image 11 based on the image data from the information processing device 200 as the main image is assumed. In this case, the control unit 370 changes the output form 396 (illustrated in FIG. 4) of the information processing device 200 in the management information retention unit 390 to "MAIN" (532 and 533).

Here, as described above, when the low power consumption mode is set in the information processing device 200, the information processing device 200 is assumed to sleep. In this way, when the information processing device 200 sleeps, the information processing device 200 may not be notified that the user performs the manipulation of setting the output form (changing manipulation).

Accordingly, when the user performs the manipulation of setting the output form (changing manipulation) 531 and the content retained in the management information retention unit 390 (illustrated in FIG. 4) is changed (532 and 533), the control unit 370 of the information processing device 300 sets a change trigger (534). The change trigger is a trigger for notifying the information processing device 200 that the user performs the manipulation of setting the output form (changing manipulation) when the inquiry message is received from the information processing device 200. Through the change trigger, the information processing device 200 cancels the state of the standby mode and notifies the information processing device 200 that the user performs the manipulation of setting the output form (changing manipulation).

Here, a case in which each unit of the information processing device 200 wakes up and the transmission process to the information processing device 300 starts is assumed. In this case, the control unit 370 of the information processing device 300 transmits a standby cancellation message to the information processing device 200 (535 and 536).

When the standby cancellation message is received (536), the control unit 240 of the information processing device 200 transmits a response message to the information processing device 300 (537 and 538).

In this way, it is necessary to inquire the setting in the information processing device 200 in accordance with the standby mode cancellation request from the sink device (535 to 538). Therefore, the control unit 240 of the information processing device 200 transmits the mode table request to the information processing device 300 (539 and 540). As described above, the mode table request is a request for transmitting each piece of information (the management information regarding the information processing device 200) managed in the information processing device 300. In the above-described processes (535 to 538), the messages (for example, the response message to the inquire message in the processes (515 to 518)) of the change (for example, the change in the output form) may be interchanged.

When the information processing device 300 receives the mode table request (540), the information processing device 300 transmits the command information according to the mode table request (541 and 542). Here, when the command information is already transmitted from the information processing device 300 to the information processing device 200, the information processing device 200 already acquire the information included in the command information. Therefore, the information processing device 300 may transmit only difference information as the command information according to the mode table request (541 and 542). The difference information is information regarding the change and is, for example, output form information of the resolution and the audio quality regarding the information processing device 200.

When the command information is received (542), the control unit 240 of the information processing device 200 specifies whether the output form of the data from the information processing device 200 is the main form or the sub-form based on the command information. Subsequently, the control unit 240 of the information processing device 200 transmits the mode setting information indicating the setting of the specified output form to the information processing device 300 (543 and 544). Here, the main form is assumed to be specified as the output form of the data from the information processing device 200. Accordingly, the control unit 240 of the information processing device 200 transmits the mode setting information for notifying the information processing device 300 that the specified output form (main form) is set and the normal power consumption mode is set, to the information processing device 300 (543 and 544). The processes (539 to 544) may be performed with Capability Re-negotiation when the device conforms to Wi-Fi Certified Miracast. In the case of Capability Re-negotiation, it is not necessary to perform negotiation again in regard to the setting values unchanged in the output form in the process (534). For example, wfd-displayedid, wfd-client-rtpports, wfd-I2C, and wfd-connectortype can be exemplified.

Subsequently, the control unit 240 of the information processing device 200 sets the main mode as the transmission mode (545). Accordingly, in the data transmission system 201, the resolution for displaying the main image and the audio quality for outputting the main audio are set (546). In the line control system 202, the normal power consumption mode is set (547).

When the normal power consumption mode is set in this way (547), the control unit 240 of the information processing device 200 starts a normal transmission process (548 and 549). That is, the information processing device 200 transmits the stream for outputting the main image and the main audio to the information processing device 300 (548 and 549). When the stream is received in this way (549), the information processing device 300 outputs the image and the audio based on the received stream (550). For example, as illustrated in FIG. 5a, the image 11 based on the stream from the information processing device 200 is displayed as the main image on the display unit 351.

In this example, the example in which the previous output form (the output form when the information processing device 300 is powered down) is set as the display form of the display unit 351 when the information processing device 300 is powered up has been described. However, when the information processing device 300 is powered up, another output form may be set. For example, when the information processing device 300 is powered up, a default output form may be normally set. Alternatively, the display form may be decided based on an order of connection to the information processing device 300.

In FIGS. 6 to 8, the example in which the information processing device 200 inquires the setting information regarding the information processing device 300 and sets the transmission parameters based on the received parameter information has been described. However, the information processing device 200 may ask a setting request for the parameters desired to be set to the information processing device 300 and may set the parameters when the information processing device 200 receives a response indicating that there is no problem from the information processing device 300. This example is illustrated in FIGS. 9 and 10.

[Communication Example]

Figure 9:
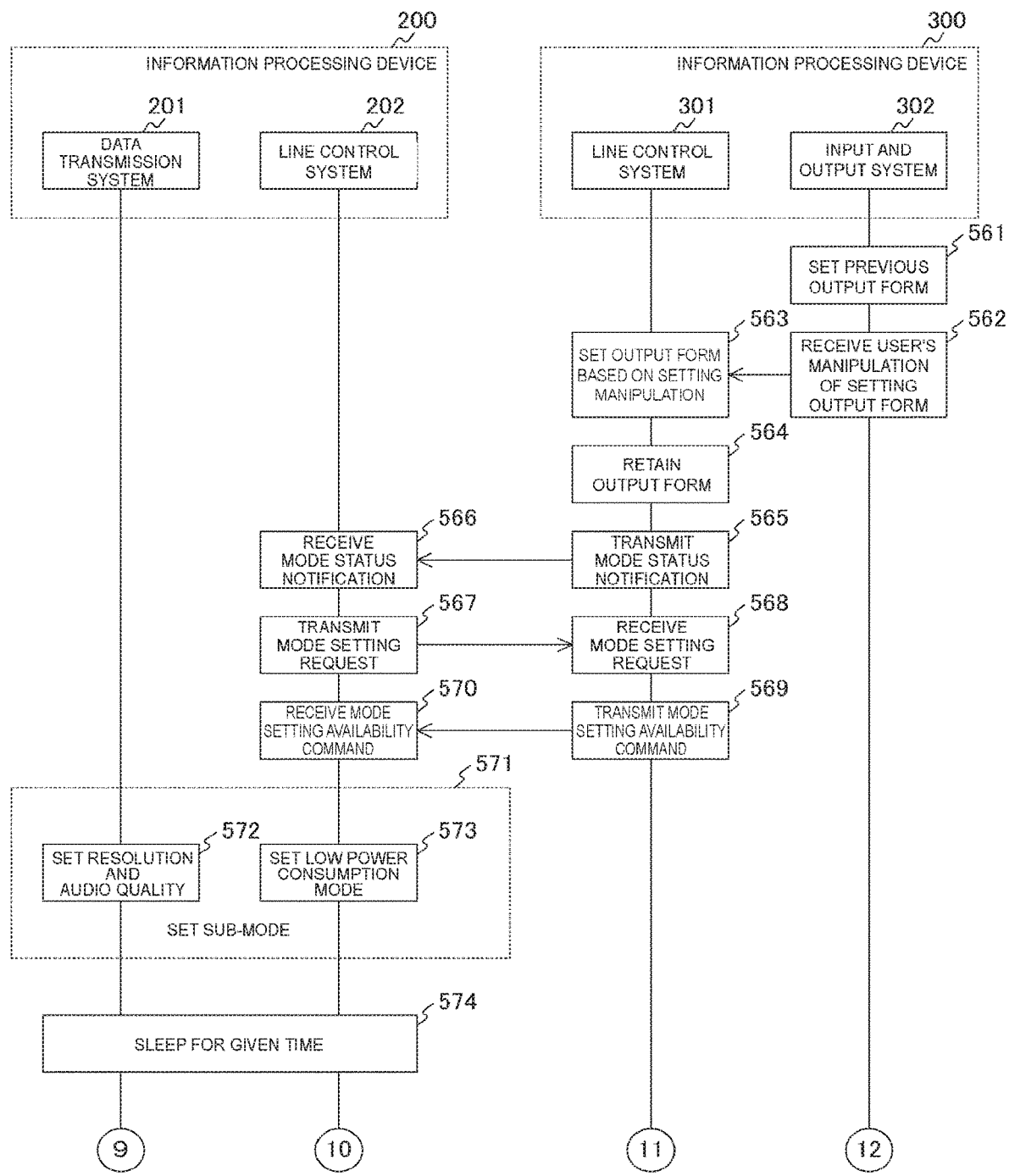
FIG. 9 is a sequence chart illustrating a communication process example between devices included in the communication system 100 according to the first embodiment of the present technology.
Figure 10:
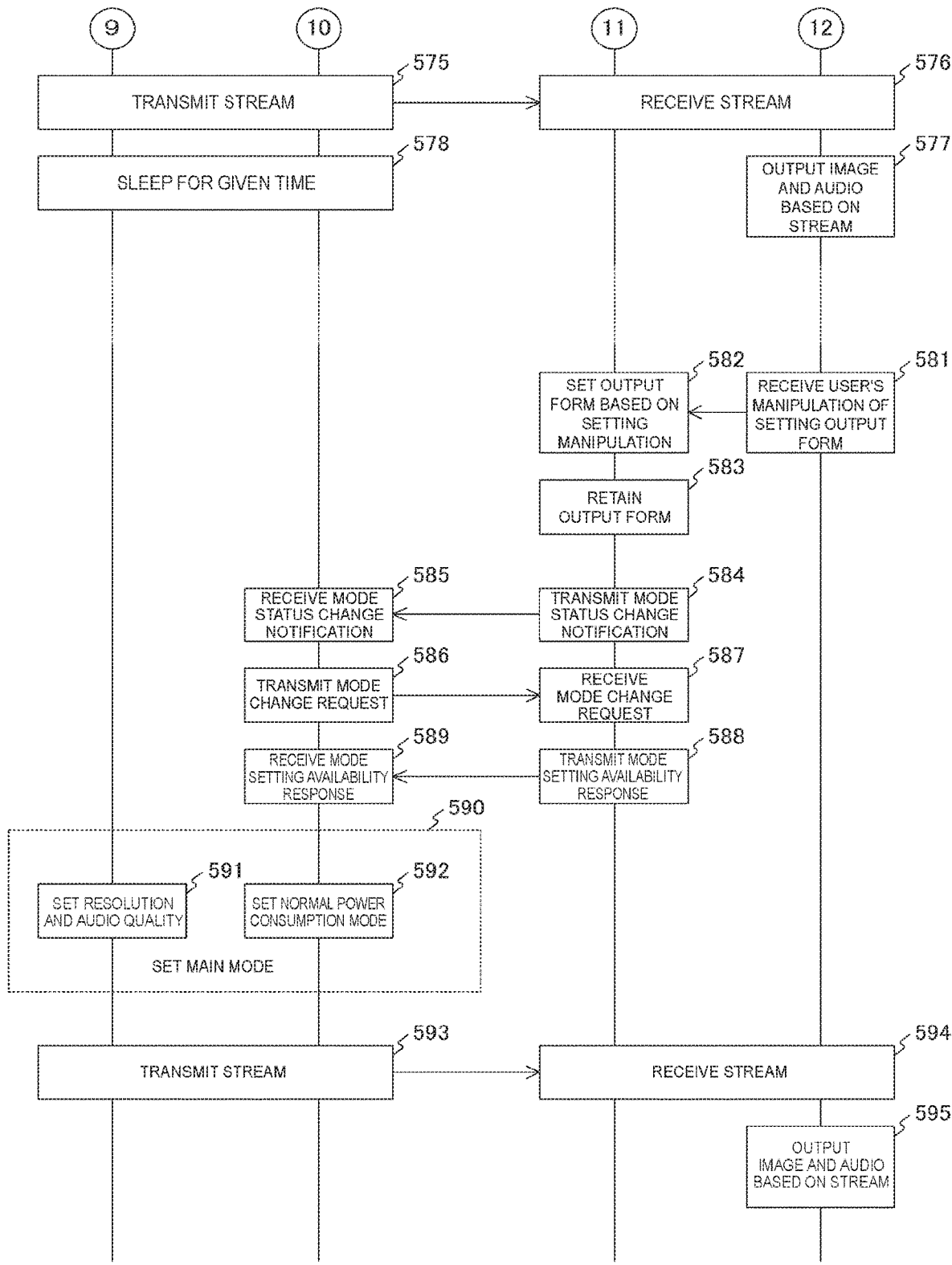
FIG. 10 is a sequence chart illustrating a communication process example between devices included in the communication system 100 according to the first embodiment of the present technology.
Figure 11:
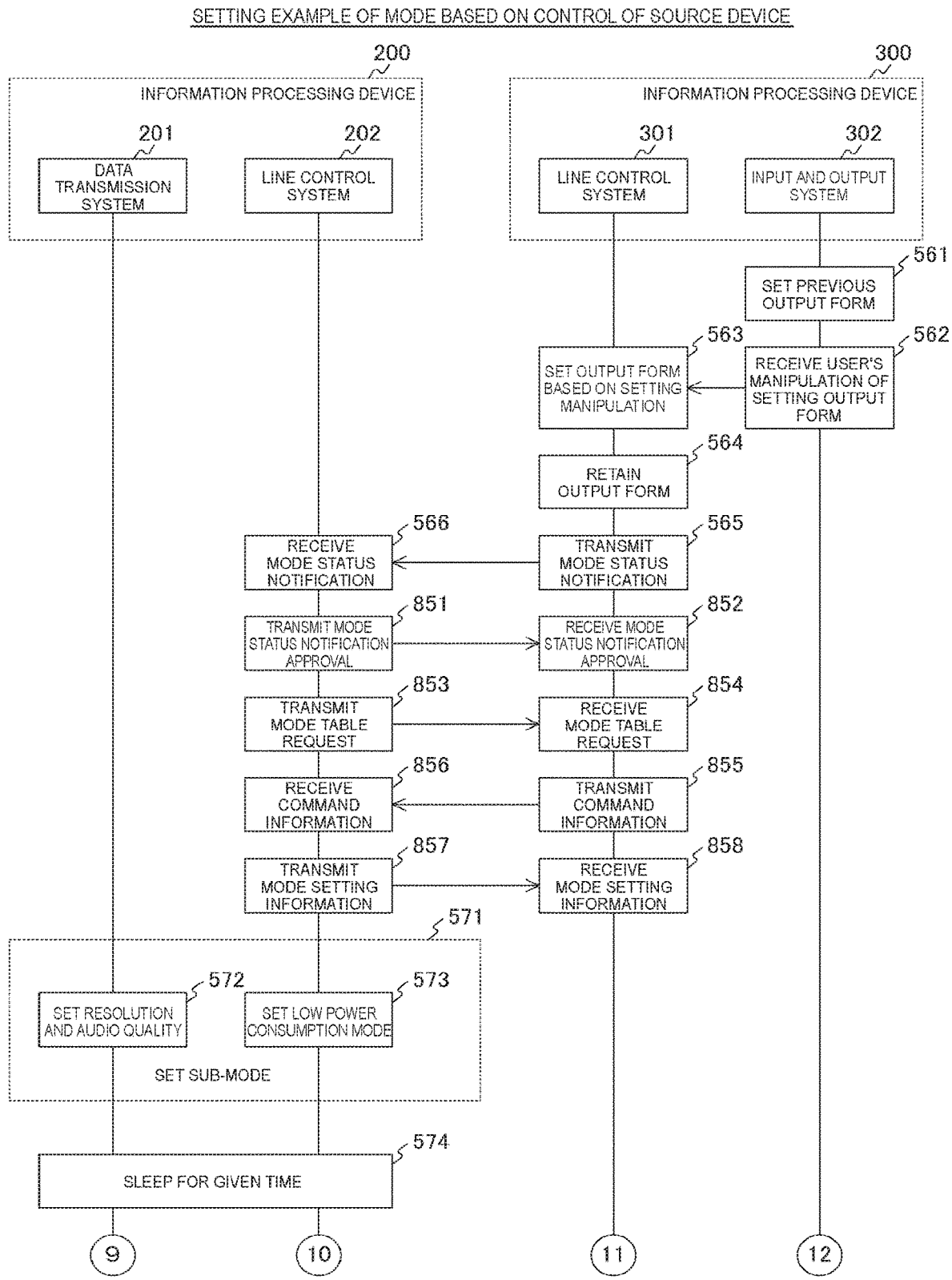
FIG. 11 is a sequence chart illustrating a communication process example between devices included in the communication system 100 according to the first embodiment of the present technology.

FIGS. 9 to 11 are sequence charts illustrating a communication process example between devices included in the communication system 100 according to the first embodiment of the present technology. In FIGS. 9 and 10, a part of the communication process example illustrated in FIGS. 6 to 8 is modified. Therefore, in FIGS. 9 and 10, the same reference numerals are given to common portions to the communication process example illustrated in FIGS. 6 to 8 and the description thereof will be partially omitted. In FIG. 11, a part of the communication process example illustrated in FIG. 9 is modified. Therefore, in FIG. 11, the same reference numerals are given to common portions to the communication process example illustrated in FIG. 9 and the description thereof will be partially omitted.

Processes (561 to 564) illustrated in FIG. 9 correspond to the processes (501 to 504) illustrated in FIG. 6.

Subsequently, the control unit 370 of the information processing device 300 transmits a mode status notification for notifying the information processing device 200 of the output form set by the user to the information processing device 200 (565 and 566). The mode status notification is information for giving notification of the resolution and the audio quality, the kinds of image and audio codecs, presence of absence of a 3D function, presence or absence of the content protection, the display size of a display device, topology information, a usable protocol, setting information (port information or the like) of the protocol, connection interface information (the type of connector or the like), horizontal synchronization and vertical synchronization positions, performance priority request information of a source device, a mode control table response to whether to correspond to the low power consumption mode, a maximum transmission throughput or a receivable maximum throughput of wireless transmission, central processing unit (CPU) power, a battery remaining quantity, and power supply information which can be set by the information processing device 200 along with the output form (for example, the main form or the sub-form) set by the user.

In this way, immediately after the setting manipulation of the output form by the user in the information processing device 300 is performed, the mode status notification for notifying the information processing device 200 of the output form related to the setting manipulation can be transmitted to the information processing device 200. Therefore, it is possible to shorten a setting time (change time) between the information processing devices 200 and 300 connected using the wireless communication.

When the mode status notification is received (566), the control unit 240 of the information processing device 200 compares a status parameter specified by the received mode status notification to a status parameter of the own information processing device. Subsequently, the control unit 240 of the information processing device 200 decides the setting content (for example, the resolution and audio, and the power consumption mode) based on a comparison result. Subsequently, the control unit 240 of the information processing device 200 transmits a mode setting request for notifying of the decided setting content (for example, the resolution and audio, and the power consumption mode) to the information processing device 300 (567 and 568).

When the mode setting request is received (568), the control unit 370 of the information processing device 300 determines whether to permit the setting content (for example, the resolution and audio, and the power consumption mode) specified by the received mode setting request. Then, the control unit 370 of the information processing device 300 transmits a mode setting availability command for notifying the determination result to the information processing device 200 (569 and 570).

When the mode setting availability command is received (570), the control unit 240 of the information processing device 200 confirms the content of the mode setting availability. For example, when a mode setting availability command indicating permission of the setting content related to the mode setting request transmitted by the information processing device 200 is received, the control unit 240 of the information processing device 200 sets the sub-mode as the transmission mode (571). Further, processes (571 to 574) illustrated in FIG. 9 correspond to the processes (511 to 514) illustrated in FIG. 6. Further, processes (575 to 578) illustrated in FIG. 10 correspond to the processes (519 to 522) illustrated in FIG. 7.

When a mode setting availability command indicating non-permission of the setting content related to the mode setting request transmitted by the information processing device 200 is received, the control unit 240 of the information processing device 200 newly decides the setting content (for example, the resolution and audio, and the power consumption mode). Then, the control unit 240 of the information processing device 200 transmits a mode setting request for notifying the information processing device 300 of the newly decided setting content (for example, the resolution and audio, and the power consumption mode) to the information processing device 300.

Processes (581 to 583) illustrated in FIG. 10 correspond to the processes (531 to 533) illustrated in FIG. 7.

Subsequently, the control unit 370 of the information processing device 300 transmits a mode status change notification for notifying the information processing device 200 of the output form changed by the user to the information processing device 200 (584 and 585). The mode status change notification is information for notifying of the resolution and the audio quality which can be set by the information processing device 200 and whether to correspond to the low power consumption mode along with the output form (for example, the main form or the sub-form) changed by the user.

When the mode status change notification is received (585), the control unit 240 of the information processing device 200 decides the setting content (for example, the resolution and audio, and the power consumption mode). The process of deciding the setting content is the same as the above-described decision process. Subsequently, the control unit 240 of the information processing device 200 transmits the mode change request for notifying the information processing device 300 of the decided setting content (for example, the resolution and audio, and the power consumption mode) to the information processing device 300 (586 and 587).

When the mode change request is received (587), the control unit 370 of the information processing device 300 determines whether to permit the setting content (for example, the resolution and audio, and the power consumption mode) specified by the received mode change request. Then, the control unit 370 of the information processing device 300 transmits the mode setting availability command for notifying the determination result to the information processing device 200 (588 and 589).

When the mode setting availability command is received (589), the control unit 240 of the information processing device 200 confirms the content of the mode setting availability command and sets the transmission mode (590). This confirmation process is the same as the above-described confirmation process. Processes (590 to 595) illustrated in FIG. 10 correspond to the processes (545 to 550) illustrated in FIG. 8.

Here, when the source device performs switch between the sub-image and the main image, information (for example, information for comprehending the beginning of a group of picture (GOP) or information for comprehending the beginning of a picture) indicating a timing of the switch may be included in the stream to be transmitted. In other words, when the source device performs the switch between the main display and the sub-display, information indicating the timing of the switch may be transmitted to the sink device. In this case, the sink device receiving the stream can switch between the sub-image and the main image at an appropriate timing based on information indicating the timing. That is, when physical link switch information is received, the control unit of the source device can perform control such that AVC/HEVC starts from the I frame. In this way, an environment in which VC/HEVC is started from the I frame is, for example, a timing at which a wireless link is changed by FST or a timing at which switching diversity is switched. Accordingly, a packet loss occurs at the time of the switching of the wireless link. Therefore, the packet loss can be made invisible by transmitting the I frame subsequently. However, a codec capable of receiving the switching information and outputting the I frame is necessary.

Here, FIGS. 6 to 10 illustrates the example in which the standby and wake-up of the source device connected to the sink device is controlled. Here, the standby and wake-up of the sink device may be controlled based on the standby and wake-up of the source device connected to the sink device. For example, when all of the source devices connected to the sink device stand by, control can be performed such that the sink device stands by. When at least one of the source devices connected to the sink device wakes up, control can be performed such that the sink device wakes up.

A modification example of the case in which the sink device notifies the source device that the content retained in the process (564) is changed in the processes (565 to 570) illustrated in FIG. 9 and the source device transmits the mode table request is illustrated in FIG. 11.

As illustrated in FIG. 11, the information processing device 300 transmits a mode status notification to notify the information processing device 200 that the output form is changed (564) and prompt to transmit a mode setting request from the information processing device 200 (565 and 566). When the correspondence is possible, the information processing device 200 receiving the mode status notification transmits a mode status notification approval indicating approval of the mode status notification to the information processing device 300 (851 and 852).

In this way, after the mode status notification approval is transmitted (851), processes are performed (853 to 858). The processes (853 to 858) correspond to the processes (505 to 510) illustrated in FIG. 6. In this way, by performing the processes (853 to 858) after the transmission of the mode status notification approval (851), the stream transmission control (for example, the data transmission speed control, the scalability transmission rate control, the multi-reception diversity setting control, and the content protection setting control) can be appropriately in a state change (the change of the output form (564)).

Here, for example, in a command prepared in Wi-Fi Certified Miracast, an RTSPM5 message including wfd-triggered-method is currently defined as a command which is transmitted to the information processing device 300 by the information processing device 200. However, when the RTSPM5 message including wfd-triggered-method is expanded as a command which is transmitted to the information processing device 200 by the information processing device 300, the RTSPM5 message including wfd-triggered-method can be received by the information processing device 200 and the information processing device 200 can start capability re-negotiation with the information processing device 300. That is, the management information can be exchanged using the RTSPM5 message including wfd-triggered-method. For example, when the management information is changed, the control unit 370 of the information processing device 300 can perform control such that the RTSPM5 message including wfd-triggered-method defined in the Wi-Fi Certified Miracast specification is transmitted as a command for notifying the information processing device 200 of the change to the information processing device 200. Beside the command, a command may be newly defined to serve as an equivalent. For example, the control unit 370 of the information processing device 300 can include at least one of a transmission rate changing request and a transmission quality changing request in the command to be transmitted from the information processing device 300 to the information processing device 200 and transmit the command to the information processing device 200. As the command, for example, a command (for example, WFD-triggered-method of M5 or a command of M4 or higher) in a state in which an HDCP (which will be described in the third embodiment of the present technology) session is maintained can be used.

[Operation Example of Information Processing Device (Source Device)]

Figure 12:
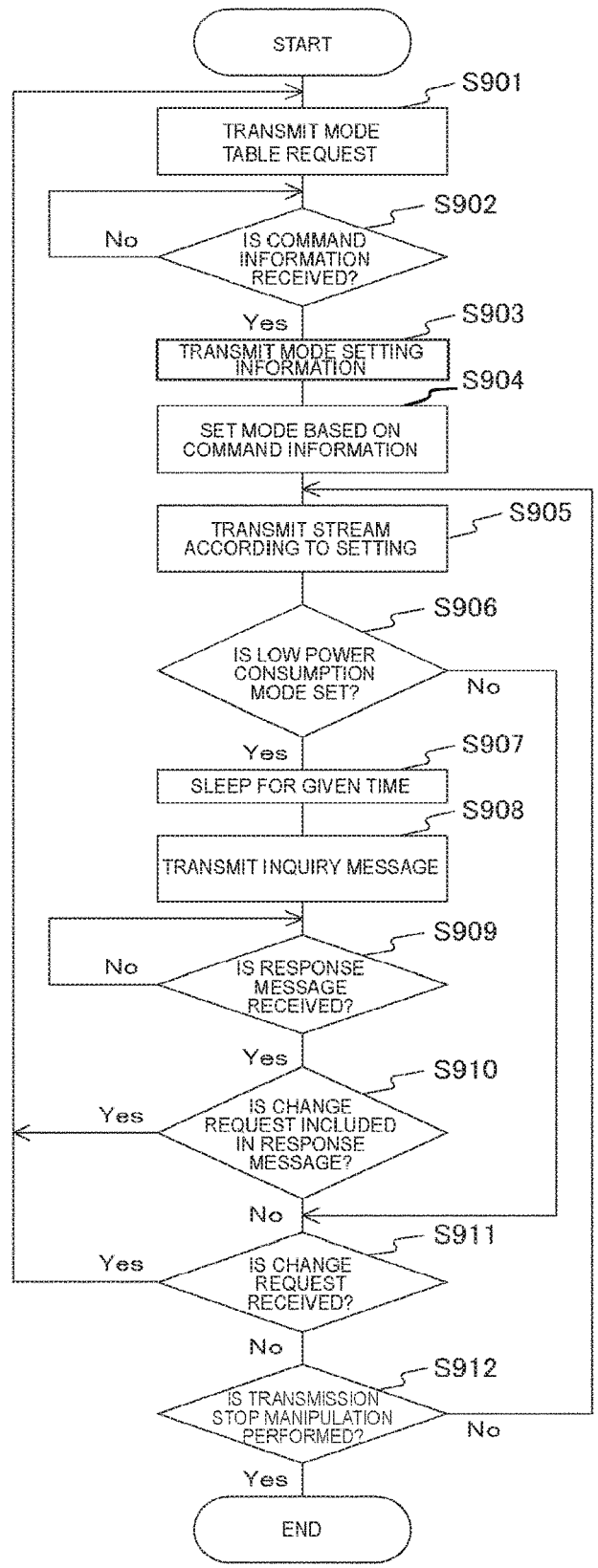
FIG. 12 is a flowchart illustrating an example of a processing procedure of a data transmission process performed by the information processing device 200 according to the first embodiment of the present technology.

FIG. 12 is a flowchart illustrating an example of a processing procedure of a data transmission process performed by the information processing device 200 according to the first embodiment of the present technology. FIG. 12 illustrates an example of a case in which the information processing device 200 first transmits the stream (the image data and the audio data) with a standard resolution to the information processing device 300. In this case, the output based on the stream to the information processing device 300 is assumed to be performed.

First, the control unit 240 transmits the mode table request to the information processing device 300 (step S901). Subsequently, the control unit 240 determines whether the command information is received from the information processing device 300 (step S902). When the command information is not received, the monitoring is continuously performed. When the command information may not be received despite waiting of a given time, the process may end as a timeout. For example, in Wi-Fi Certified Miracast, a timeout from 5 seconds to 9 seconds is set according to a situation.

When the command information is received from the information processing device 300 (step S902), the control unit 240 transmits the mode setting information indicating that the mode is set based on the received command information to the information processing device 300 (step S903).

Subsequently, the control unit 240 sets the mode based on the received command information (step S904). When a change request for increasing the resolution is included in the command information, the control unit 240 sets the resolution of the image and the audio in response to the change request. When a change request for decreasing the resolution is included in the command information, the control unit 240 sets the resolution of the image and the audio quality of the audio in response to the change request.

Subsequently, the control unit 240 performs the transmission process of transmitting the stream to the information processing device 300 according to the setting (step S905).

Subsequently, the control unit 240 determines whether the low power consumption mode is set (step S906). When the low power consumption mode is not set (that is, the normal power consumption mode is set), the process proceeds to step S911. Conversely, when the low power consumption mode is set (step S906), the control unit 240 sleeps for a given time (step S907).

Subsequently, the control unit 240 transmits an inquiry message to the information processing device 300 (step S908). Subsequently, the control unit 240 determines whether a response message is received from the information processing device 300 (step S909). When the response message is not received, the monitoring is continuously performed. When the response message may not be received despite of waiting of a given time, the process may end as a timeout. For example, in Wi-Fi Certified Miracast, a timeout from 5 seconds to 9 seconds is set according to a situation.

When the response message is received from the information processing device 300 (step S909), the control unit 240 determines whether a change request is included in the response message (step S910). When the change request is included in the response message (step S910), the process returns to step S901.

When the change request is not included in the response message (step S910), the control unit 240 determines whether the change request is received (step S911). When the change request is received (step S911), the process returns to step S901. Conversely, when the change request is not received (step S911), the control unit 240 determines whether a transmission stop manipulation is performed (step S912). When the transmission stop manipulation is performed (step S912), the operation of the data transmission process ends. Conversely, when the transmission stop manipulation is not performed (step S912), the process returns to step S905.

[Operation Example of Information Processing Device (Sink Device)]

Figure 13:
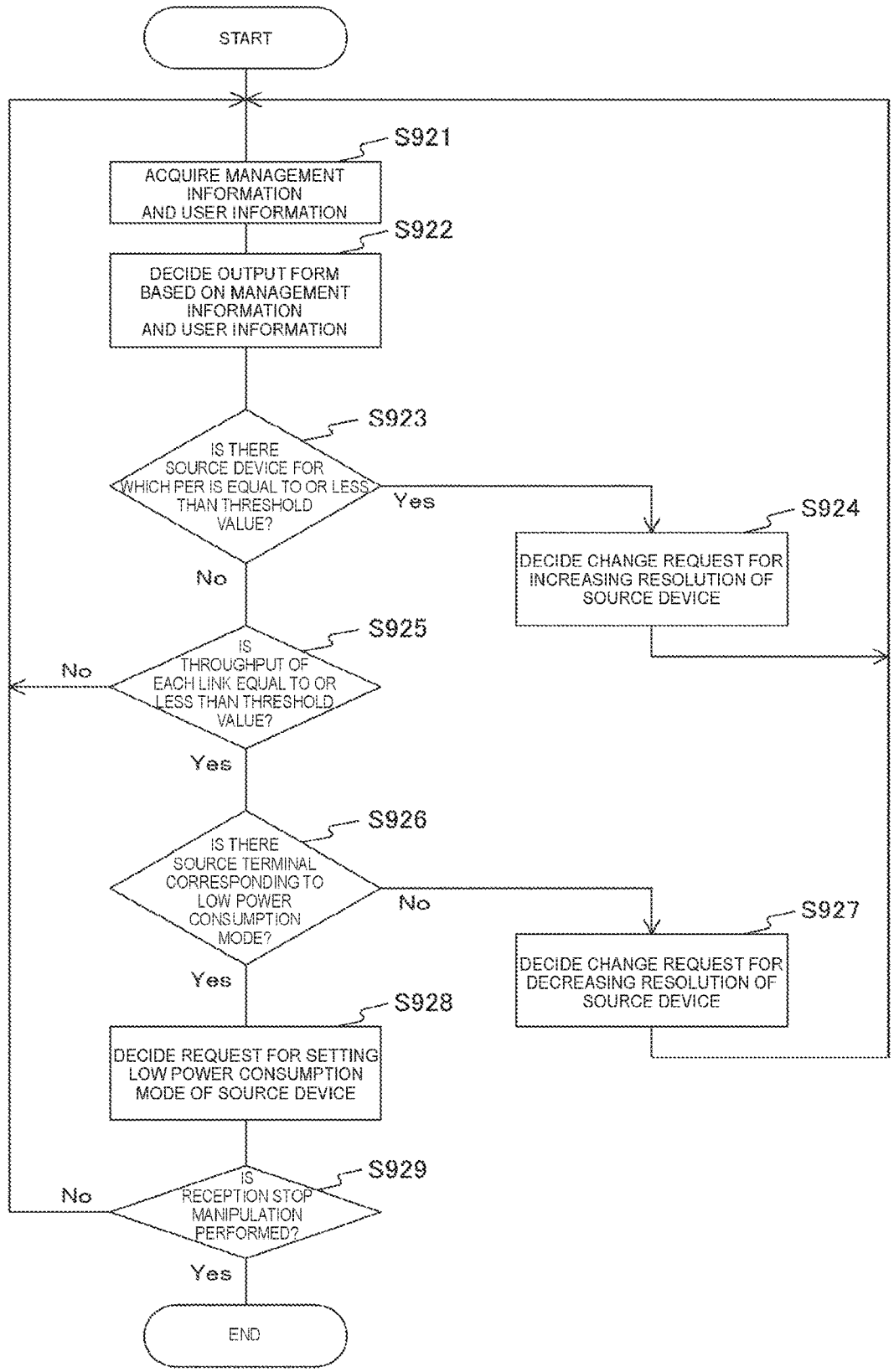
FIG. 13 is a flowchart illustrating an example of a processing procedure of a data transmission speed control process performed by the information processing device 300 according to the first embodiment of the present technology.

FIG. 13 is a flowchart illustrating an example of a processing procedure of a data transmission speed control process performed by the information processing device 300 according to the first embodiment of the present technology. FIG. 13 illustrates an example in which setting content (for example, a resolution and a power consumption mode) related to the source device is decided when the information processing device 300 receives the stream (the image data and the audio data).

For example, the control unit 370 of the information processing device 300 can decide the resolution to be used and the frequency channel to be used according to the user information for setting the main image or a link radio wave propagation environment between the information processing device 300 and each source device.

For example, a case in which a user manipulation of selecting the image 12 in the state illustrated in FIG. 5a performed is assumed. In this case, it is desirable to increase the resolution of the image 12 and decreases the resolution of the image 11. Further, it is desirable to select optimum resolutions of the images 11 and 12 according to elapse of a time and based on the link radio wave propagation environment of each source device.

For example, the information processing device 300 can comprehend the radio wave propagation characteristics while flowing data corresponding to the corresponding throughput to the plurality of frequency channels. For example, the information processing device 300 retains a table to comprehend an ideal throughput for each of the plurality of frequency channels. Then, the information processing device 300 may comprehend an available data transmission speed of the frequency channel to be used based on the number of simultaneously used source devices and the PER and may select an optimum frequency channel for each frequency channel.

For example, the control unit 370 acquires the management information from the management information retention unit 390 and acquires the user information from the user information acquisition unit 360 (step S921). Subsequently, the control unit 370 decides the output form based on the acquired management information and user information (step S922). Based on the decided output form, the images corresponding to two streams transmitted from each of the plurality of source devices are displayed on the display unit 351.

Subsequently, the control unit 370 determines whether there is the source device for which the PER included in the management information is less than a threshold value (step S923). When there is the source device for which the PER included in the management information is equal to or less than the threshold value (step S923), the control unit 370 decides a change request for increasing the resolution of the source device (step S924). The control unit 370 performs control such that a high data transmission speed is allocated to the main image in accordance with the output form based on the user information. For example, the change request is included in the command information (for example, the command information illustrated in FIG. 6) to be transmitted to this source device. It may be determined whether the throughput after the increase in the resolution of the source device is less than the threshold value and the rate of the stream may be controlled based on the determination result.

When there is no source device for which the PER included in the management information is equal to or less than the threshold value (step S923), the control unit 370 determines whether the throughput of each source device is equal to or less than a threshold value based on the management information (step S925). That is, it is determined whether the throughput of each link is not problematic even for the current frequency channel (step S925).

When the throughput of each source device is not equal to or less than the threshold value (step S925), the process returns to S921. Conversely, when the throughput of each source device is equal to or less than the threshold value (step S925), the control unit 370 determines whether there is the source device corresponding to the low power consumption mode based on the management information (step S926).

When there is the source device corresponding to the low power consumption mode (step S926), the control unit 370 decides a change request for setting the low power consumption mode in the source device corresponding to the low power consumption mode (step S928). For example, the change request is included in the command information (for example, the command information illustrated in FIG. 6) to be transmitted to this source device.

When there is no source device corresponding to the low power consumption mode (step S926), the control unit 370 decides a change request for decreasing the resolution of the source device (the source device for which the PER is equal to or less than the threshold value) (step S927). For example, the change request is included in the command information (for example, the command information illustrated in FIG. 6) to be transmitted to this source device.

It is determined whether a reception stop manipulation is performed (step S929). When the reception stop manipulation is performed, the operation of the data transmission speed control process ends. When the reception stop manipulation is not performed, the process returns to step S921. When there is the source device that enters the sleep state through the setting of the low power consumption mode, the number of source devices connected to the information processing device 300 decreases. In this case, the threshold value for the throughput in step S925 may be changed. After the threshold value for the throughput is changed in this way, a step corresponding to step S925 may be further performed.

In this way, it is possible to realize a control protocol in which the sink device trains a line environment for a given time and notifies the source device of the resolution with which stable video communication can be performed. A control protocol in which the source device performs training in a line environment for a given time and requests a resolution with which stable video communication can be performed, and the sink device responds to the request may also be realized.

In this way, the control unit 370 of the information processing device 300 can perform transmission control (for example, data transmission speed control) of two streams transmitted from each source device based on the management information of the management information retention unit 390 and the user information acquired by the user information acquisition unit 360.

Further, control may be performed such that a sum data transmission speed of the two streams transmitted from each of the information processing devices 200 and 400 is minimized. For example, a maximum allowable value of the sum data transmission speed is set in the control unit 370 of the reception side information processing device 300. After the control unit 370 transmits a change request for decreasing a bit rate to the information processing device 200, the control unit 370 acquires bit rates of two streams transmitted from the information processing devices 200 and 400 from the stream reception unit 330. Subsequently, the control unit 370 calculates a sum data transmission speed of the acquired two streams. Subsequently, the control unit 370 decides the bit rate of the streams transmitted from the information processing device 400 within a range not greater than the set maximum allowable value and transmits a change request for increasing the bit rate to the information processing device 400. When the PER is large and thus is not receivable in the same frequency channel despite of the setting of the minimum bit rate, a different frequency channel may be used. When the images (the main image and the sub-image) are paused for a given time or more, the image data may be stopped as long as a manipulation (for example, pointing) is not performed by the user.

In this way, according to the first embodiment of the present technology, even when one sink device receives a plurality of streams transmitted from a plurality of source devices, appropriate stream transmission control (for example, the data transmission speed control) can be performed according to a manipulation, a situation, and an intention of the user. For example, it is possible to decrease the data transmission speeds of some of the plurality of image and audio streams and increase the data transmission speeds of the remaining streams according to an operation, a situation, and an intention of the user.

For example, when a sink device receives and displays a plurality of streams, important images and audios with high quality set timely by the user can be enjoyed. For the otherwise images and audios, the data transmission speeds can be adjusted automatically to the optimum frequency channel, power consumption, and transmission rate.

Here, for the management information retained in the management information retention unit 390, a command prepared in Wi-Fi Certified Miracast can be used for exchanging the management information. In this case, capability negotiation or capability re-negotiation defined in the Wi-Fi Display specification can be used. Here, as capability negotiation or capability re-negotiation, for example, RFC5939 or the Wi-Fi Certified Miracast specification can be exemplified. However, capability negotiation or capability re-negotiation is not limited thereto, but is defined as interchange of the device performance information. A communication example of the interchange using a command of the Wi-Fi Certified Miracast specification is illustrated in FIGS. 14 to 16.

[Communication Example of Interchange Using Wi-Fi Certified Miracast Specification Command]

Figure 14:
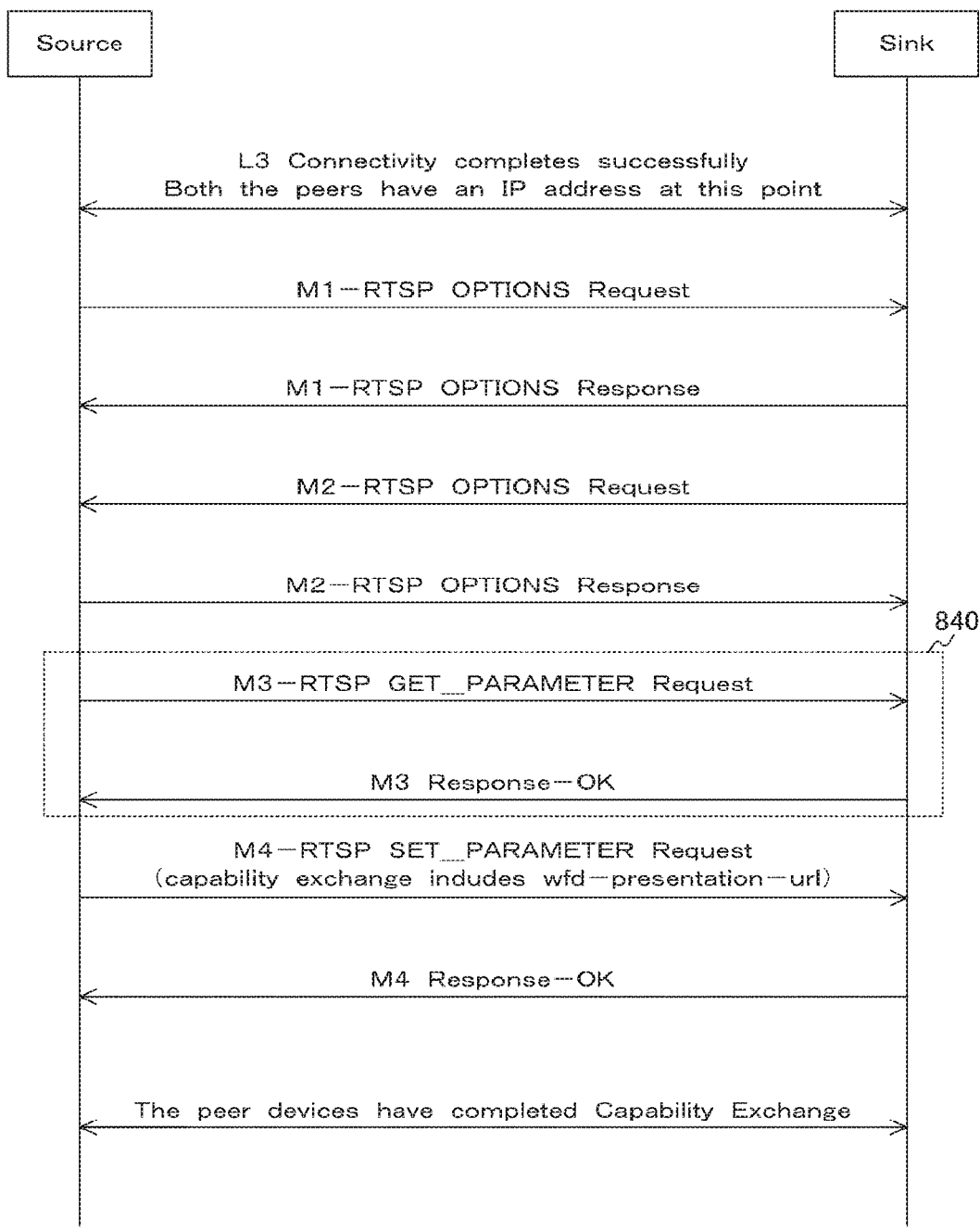
FIG. 14 is a sequence chart illustrating a communication process example between a source device and a sink device according to the first embodiment of the present technology.
Figure 15:
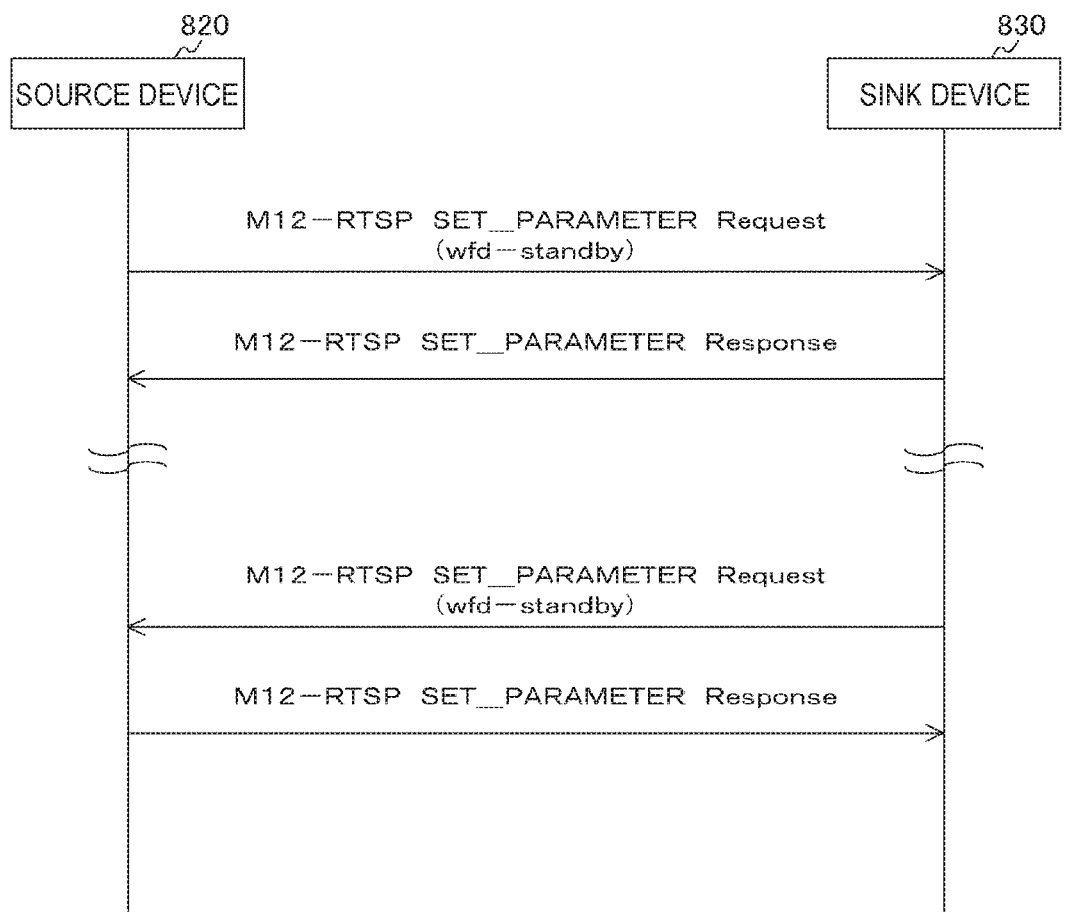
FIG. 15 is a sequence chart illustrating a communication process example between a source device and a sink device according to the first embodiment of the present technology.
Figure 16:
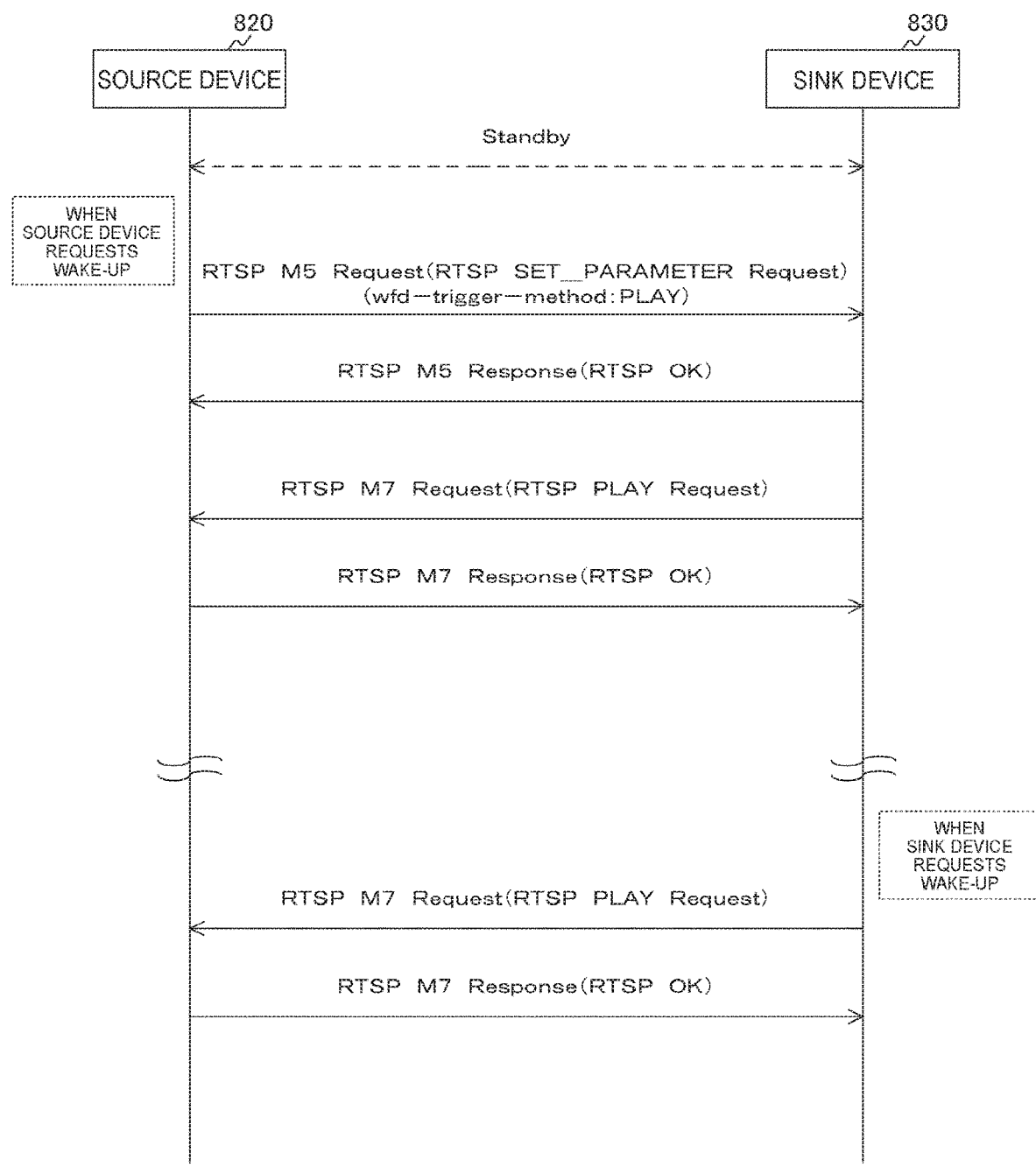
FIG. 16 is a sequence chart illustrating a communication process example between a source device and a sink device according to the first embodiment of the present technology.

FIGS. 14 to 16 are sequence charts illustrating a communication process example between a source device and a sink device according to the first embodiment of the present technology. FIGS. 14 to 16 illustrate a communication example of interchange using an RTSP protocol. A source device 820 corresponds to the information processing devices 200 and 400 and a sink device 830 corresponds to the information processing device 300.

First, the description will be made with reference to FIG. 14. For example, as indicated by a dotted rectangle 840 of FIG. 14, an "RTSP M3 Request" (RTSP GET_PARAMETER Request) message transmitted from the source device to the sink device and an "RTSP M3 Response" (RTSP GET_PARAMETER Response) message transmitted from the sink device to the source device in response to the "RTSP M3 Request" (RTSP GET_PARAMETER Request) message can be used. This exchange process corresponds to, for example, the processes (505 to 508) illustrated in FIG. 6 and the processes (539 to 542) illustrated in FIG. 8. On the other hand, the messages may be appropriately transmitted from the source device to the sink device. For example, the interchange of the "RTSP M3 Request" (RTSP GET_PARAMETER Request) message and the "RTSP M3 Response" (RTSP GET_PARAMETER Response) message may be omitted, the management information may be included in a message to be transmitted from the source device to the sink device, the management information may be transmitted from the source device to the sink device, and the sink device may select the information and retain the information in the management information retention unit 390. For example, when the content protection setting is performed, link protection setup is performed after M3 Response. Therefore, it is desirable to perform communication while ensuring a secrecy ability of a link set once by transmitting only messages of M4 or higher.

The interchange of information regarding the power consumption mode can be performed with predetermined messages using the RTSP protocol. For example, three kinds of management information of the following (1) to (3) can be exchanged:

(1) "setting to the standby mode,"
(2) "when the source device cancels the standby mode or when the source device cancels the standby mode of the sink device," and
(3) "when the sink device cancel the standby mode or when the sink device cancels the standby mode of the source device."

First, the description will be made with reference to FIG. 15. For example, when a command prepared in Wi-Fi Certified Miracast is used, an "RTSP M12 Request" (RTSP SET_PARAMETER (with WFD-standby)) message transmitted from the source device 820 to the sink device 830 and an "RTSP M12 Response" (RTSP OK) message transmitted from the sink device 830 to the source device 820 in response to the "RTSP M12 Request" (RTSP SET_PARAMETER (with WFD-standby)) message can be used in the interchange of (1) "setting to the standby mode," as described above. On the other hand, the same also applies to the setting to the standby mode from the sink device 830 to the source device 820.

Next, the description will be made with reference to FIG. 16. For example, (2) "when the source device cancels the standby mode or when the source device cancels the standby mode of the sink device," as described above, the source device 820 interchanges an "RTSP M5 Request" (RTSP SET_PARAMETER (Request (wfd-trigger-method: PLAY)) message transmitted to the sink device 830 and an "RTSP M5 Response" (RTSP OK) message transmitted from the sink device 830 to the source device 820 in response to the "RTSP M5 Request" (RTSP SET_PARAMETER (Request (wfd-trigger-method: PLAY)) message. The sink device 830 can uses an "RTSP M7 Request" (RTSP PLAY Request) message transmitted to the source device 820 and an "RTSP M7 Response" (RTSP OK) message transmitted from the source device 820 to the sink device 830 in response to the "RTSP M7 Request" (RTSP PLAY Request) message.

For example, (3) "when the sink device cancel the standby mode or when the sink device cancels the standby mode of the source device," as described above, the sink device 830 can use the "RTSP M7 Request" (RTSP PLAY Request) message transmitted to the source device 820 and the "RTSP M7 Response" (RTSP OK) message transmitted from the source device 820 to the sink device 830 in response to the "RTSP M7 Request" (RTSP PLAY Request) message. The interchange corresponds to, for example, the processes (515 to 518) illustrated in FIG. 7 and the processes (535 to 538) illustrated in FIG. 7.

For example, in the interchange of the processes (565 to 570) illustrated in FIG. 9, the "RTSP M12 Request" (RTSP SET_PARAMETER (with WFD-standby)) message transmitted from the sink device 830 to the source device 820 and the "RTSP M12 Response" (RTSP OK) message transmitted from the source device 820 to the sink device 830 in response to the "RTSP M12 Request" (RTSP SET_PARAMETER (with WFD-standby)) message can be used.

Further, for example, in the interchange of the processes (584 to 589) illustrated in FIG. 10, the "RTSP M7 Request" (RTSP PLAY Request) message transmitted from the sink device 830 to the source device 820 and the "RTSP M7 Response" (RTSP OK) message transmitted from the source device 820 to the sink device 830 in response to the "RTSP M7 Request" (RTSP PLAY Request) message may be used.

In this way, the wireless communication unit 320 can perform the exchange of the capability information with capability negotiation or capability re-negotiation defined in the Wi-Fi Display specification. For example, the capability information is exchanged with the RTSP M3 message in capability negotiation or capability re-negotiation.

In this way, for example, the wireless communication unit 320 of the information processing device 300 performs the communication with the source device to exchange the capability information regarding the information processing device 300 and the capability information regarding the information processing device 200. The wireless communication unit 220 of the information processing device 200 performs the communication with the information processing device 300 to exchange the capability information regarding the information processing device 200 and the capability information regarding the information processing device 300. In this case, the wireless communication units 220 and 320 can exchange the capability information with capability negotiation or capability re-negotiation.

The control unit 370 of the information processing device 300 performs the stream transmission control (for example, the data transmission speed control, the scalability transmission rate control, the multi-reception diversity setting control, and the content protection setting control) with the information processing device 200 based on the capability information regarding the information processing device 200, the radio wave propagation measurement information regarding the communication with the information processing device 200, and the use of the information processing device 300. A stream transmission method is different from in the embodiment of the present technology, but the control unit 240 of the information processing device 200 can also perform the stream transmission control (for example, the data transmission speed control, the scalability transmission rate control, the multi-reception diversity setting control, and the content protection setting control) with the information processing device 300 based on the control performed from the information processing device 300 based on the capability information regarding the information processing device 200 and the radio wave propagation measurement information regarding the communication of the stream with the information processing device 300.

The control unit 370 of the information processing device 300 performs the control such that the power consumption mode is set in the information processing device 200 based on the capability information (for example, the information indicating whether the device is a mobile device) regarding the information processing device 200. In this case, the control unit 370 can perform the control such that the low power consumption mode is set in the information processing device 200 based on the capability information regarding the information processing device 200 and the management information for managing the information processing device 200. The control unit 240 of the information processing device 200 sets the power consumption mode based on the control performed from the information processing device 300 based on the capability information regarding the information processing device 200. In the embodiment of the present technology, the example of the topology in which two source devices are used has been described, but an embodiment of the present technology is not limited to the embodiment of the present technology. For example, when the number of devices is 2 or more, it is necessary to control data transmission speed control corresponding to the number of devices and state transition is considerable. Therefore, the control is difficult, but benefit can be obtained. It is possible to also correspond to topology in which two or more source devices are connected.

2. Second Embodiment

In the second embodiment of the present technology, an example in which the scalability transmission rate control is performed using a scalable codec will be mainly described.

Here, roughness of target rate precision of transmission rate control between source and sink devices and a transmission rate control method when an obstacle is located between the source and sink devices will be described.

[When Obstacle is Located Between Source and Sink Devices]

For example, a case in which an obstacle (for example, a person) causing instability of a connection environment of source and sink devices is located will be considered. For example, when a person blocks source and sink devices, a connection environment is instantaneously interrupted despite being temporary. The instantaneous interruption differs according to a situation. However, for example, there is a concern of application transmission being affected. For example, when an end-to-end delay time from the source device to the sink device is about tens of milliseconds, there is a concern of the instantaneous interruption time affecting the application transmission.

[Roughness of Target Rate Precision of Transmission Rate Control]

In recent years, a scalable codec has started to be used in order to transmit the same images and audios to a plurality of locations from MCU (multipoint connection) mainly in TV conference. When the scalable codec is compared to a normal codec, the hardware scales of both an encoder and a decoder increase. However, in terms of multicast use, there is the advantage that a transmission side can perform transmission regardless of a display ability or a decoding ability of a reception side. The reception side can freely select a display resolution or temporal scalability depending on a reception ability, and thus all of the reception devices may not necessarily match the same setting.

Further, the scalable codec is considered to be technically effective in a high dynamic range environment of a transmission rate. For example, a data transmission rate can be narrowed by notifying an encoder side of reception characteristics while displaying even a video which can be generated with wirelessly receivable packets. In actual use, however, a reception side display device has a resolution of SD, HD, or 4K. Therefore, in spatial scalability or temporal scalability, it is difficult to effectively set a transmission rate with granularity of several Mbps. For this reason, it is general to set reduction of a data transmission rate with granularity such as ½, ¼, or ⅟₁₆. In a unicast environment of a wireless network, there is a demand for necessity to adjust a signal-to-noise ratio (SNR) scalability and spatial scalability or temporal scalability in a range in which a loss of the reception side is not noticeable.

[Transmission Rate Control Method]

Here, a case in which a scalable codec is used on a wireless network system of 60 GHz typified by IEEE802.11ad will be considered.

For example, in wireless video transmission in which IEEE802.11a/B/g/n is used, the dynamic range of a data transmission rate is not large (for example, a range in which a throughput allowable without a packet loss in video transmission is 1 Mbps to 20 Mbps) and there is also radio wave interference between links. Therefore, when a network is formed, control is mainly performed such that a wireless band is not used as much as possible by narrowing an encoding rate.

However, when a wireless network is used at 60 GHz, a data transmission rate is equal to or greater than maximum 2 Gbps. Compared to a 2.4 GHz band or a 5 GHz band, the interference between links is reduced since spatial division can be performed in a beamforming environment. That is, interference present in the same channel and caused by another network is reduced. For example, when a 1-to-2 network is used at a transmission rate of 1 Gbps, two units can mutually use a transmission rate corresponding to 500 Mbps without interference. Therefore, it is not necessary to decrease video and audio data transmission rates unnecessarily. Thus, video and audio data may be transmitted at a rate corresponding to 500 Mbps and image data of a reception side may be displayed with a resolution of a layer which can receive the image data.

Further, it is possible to measure an error rate corresponding to 500 Mbps. For example, a case in which an interference wave is entered and a transmission rate is abruptly reduced to about ⅟₁₀ is assumed. In this case, when control is performed to instantaneously decrease a rate so that no error occurs, link quality is normally obtained as feedback information from a reception side and the link quality is determined. However, the feedback information may not be comprehended in the abrupt decrease in the transmission rate as in the interference wave, and a transmission side may not handle the decrease in the transmission rate except for, for example, a transmission buffer amount or the number of retransmissions of transmission packets. For this reason, it is necessary to comprehend a radio wave propagation environment faster. When the interference wave disappears and the link quality becomes better, it is desirable to increase the video and audio data transmission rates narrowed until now and returns to high image quality. However, originally, since the transmission rate is narrowed, it may not be comprehended how far the transmission rate is increased. When a wireless network is used at 60 GHz, the transmission rate is high at 1 Gbps. Therefore, even when image transmission of 500 Mbps is performed, the remaining 500 Mbps can be returned to error measurement. That is, an error rate corresponding to 500 Mbps can be assumed while performing the image transmission. Therefore, a link environment in which a difference in the transmission rate is large, it is important to appropriately perform the transmission rate control of video and audio data. Accordingly, in the second embodiment of the present technology, an example in which the transmission rate control is appropriately performed will be described.

[Configuration Example of Communication System]

Figure 17:
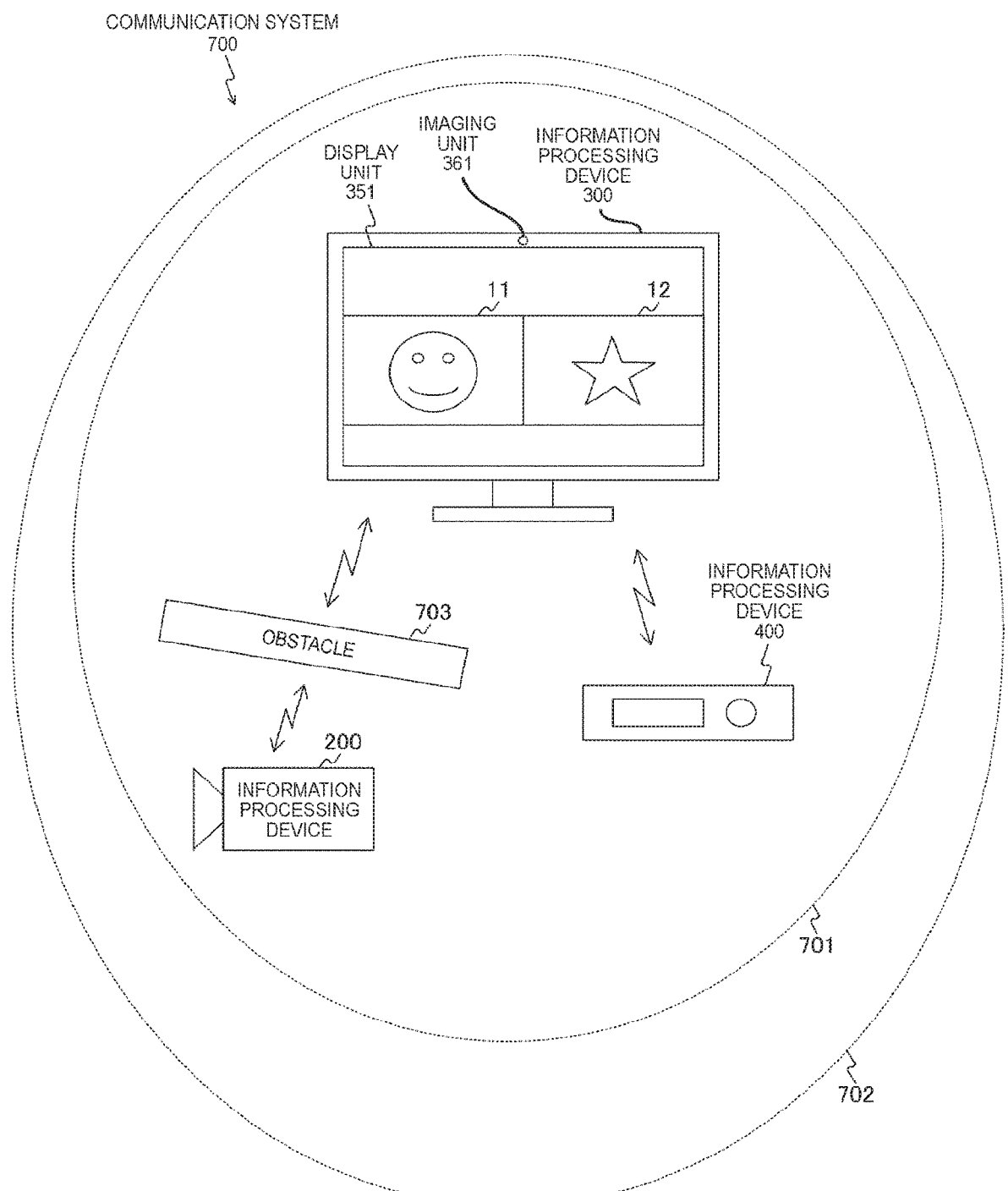
FIG. 17 is a block diagram illustrating a system configuration example of a communication system 700 according to a second embodiment of the present technology.

FIG. 17 is a block diagram illustrating a system configuration example of a communication system 700 according to the second embodiment of the present technology.

The configuration of the communication system 700 is the same as the configuration of the communication system 100 illustrated in FIG. 1. Therefore, the same reference numerals are given to common portions to the communication system 100 illustrated in FIG. 1 and the description thereof will be partially omitted.

However, FIG. 17 is different from FIG. 1 in that radio wave arrival ranges of two kinds of different frequency channels are indicated as radio wave arrival ranges (service ranges) of the information processing device 300 by dotted ellipses 701 and 702. For example, a first frequency channel is set to 60 GHz and a radio wave arrival range of the first frequency channel is indicated by the ellipse 701. A second frequency channel is set to 2.4 GHz and a radio wave arrival range of the second frequency channel is indicated by the ellipse 702.

Here, the radio wave arrival range 701 means, for example, a range (service range) in which the information processing devices 200 and 400 can transmit streams to the information processing device 300 using the first frequency channel. The radio wave arrival range 702 means, for example, a range (service range) in which the information processing devices 200 and 400 can transmit streams to the information processing device 300 using the second frequency channel.

FIG. 17 illustrates an example of a case in which the information processing device 200 is a mobile device and an obstacle (for example, a person) 703 is located between the information processing devices 200 and 300. Here, an example in which the information processing devices 200 and 300 perform a connection process when the information processing devices 300 and 400 transmit streams will be described.

As described above, the information processing device 200 is present within the radio wave arrival range 701. When the obstacle 703 is not present, normal connection with the information processing device 300 can be performed. However, illustrated in FIG. 17, when the obstacle 703 is present between the information processing devices 200 and 300, radio waves interchanged between the information processing devices 200 and 300 may be absorbed to or reflected from the obstacle 703. Therefore, an instantaneous interruption between the information processing devices 200 and 300 or a considerable decrease in a data transmission rate between the information processing devices 200 and 300 despite presence within the radio wave arrival range 701 is assumed.

Here, when the instantaneous interruption between the information processing devices 200 and 300 is temporary, a case in which the connection can be restored by a line restoration mechanism or the like at 60 GHz (hereinafter referred to as case 1) is assumed. As the connection restoration mechanism, for example, a method of controlling directivity of a radio wave of beamforming, beam tracking, or the like can be exemplified. On the other hand, a case in which the obstacle 703 blocks radio waves of the information processing device 200 in all of the directions and a line of 60 GHz is continuously disconnected (hereinafter referred to as case 2) is also assumed. In case 2, the same operation as that of a case in which the radio wave arrival range 701 moves to the radio wave arrival range 702 is performed. Further, a video of stream transmission is disturbed in both of case 1 and case 2.

Accordingly, to correspond to the connection environment illustrated in FIG. 17, a frequency range in which a service area is large is preferably used between two frequency channels in case 2. For example, in the second embodiment of the present technology, an example in which the second frequency channel (2.4 GHz band) in which a service area is large is used between two frequency channels will be described.

That is, when the communication quality specified by radio wave propagation measurement information decreases and it is necessary to restrict stream transmission control (for example, data transmission speed control and scalability transmission rate control), the control unit 370 can perform control such that the used frequency channel is changed to a frequency channel of a faster data transmission speed based on the radio wave propagation measurement information and the use of the information processing device 300. Examples of the use of the information processing device 300 include a display form of the display unit 351 and a movement state of the information processing device 300. The use of the information processing device 300 is assumed to include a case in which instantaneous interruption occurs between the information processing devices 200 and 300. When the communication quality specified by radio wave propagation measurement information decreases and it is necessary to restrict the stream transmission control (for example, the data transmission speed control and the scalability transmission rate control), the control unit 370 can perform control such that the used frequency channel is changed to a frequency channel of a slower data transmission speed based on the radio wave propagation measurement information and the use of the information processing device 300. For example, when the communication quality specified by radio wave propagation measurement information decreases and it is necessary to restrict the stream transmission control (for example, the data transmission speed control and the scalability transmission rate control), the data transmission speed can be faster for correspondence by changing the frequency channel to the first frequency channel at the time of the using of the second frequency channel based on the radio wave propagation measurement information and the use of the information processing device 300. Conversely, the data transmission speed can be changed to be slower for correspondence by changing the frequency channel to the second frequency channel at the time of using of the first frequency channel. An embodiment of the present technology is not limited to only the switching of the frequency channel, but another method may be used. For example, by changing a bandwidth, it is possible to perform the stream transmission control (for example, the data transmission speed control and the scalability transmission rate control). For example, in 802.11, a plurality of bandwidths are supported, and a 20 MHz band, a 40 MHz band, an 80 MHz band, a 160 MHz band, and the like are present. When the bandwidth increases, the data transmission speed becomes faster. The control unit 370 may perform control such that the bandwidth is enlarged or reduced when the communication quality specified by the radio wave propagation measurement information decreases and it is necessary to restrict the stream transmission control (for example, the data transmission speed control and the scalability transmission rate control). In this way, by setting the capability of the information processing device 200 comprehensively based on the use of the information processing device 300 and the radio wave propagation environment, it is possible to improve stability of the entire system.

In case 1, according to the instantaneous interruption time of the information processing device 200, the connection may continue without change of the frequency channel of the information processing device 200 or the frequency channel of the information processing device 200 may be changed. As a determination reference of whether to continue the connection of the information processing device 200, for example, there is the number of control trials the directivity of the radio wave is controlled.

In case 2, when the information processing device 200 moves from the radio wave arrival range 701 to the radio wave arrival range 702, the user may be instructed whether to disconnect the information processing device 200 and raise the image quality and the audio quality of another link or to change the frequency channel of the information processing device 200 without disconnection of the information processing device 200. For example, by causing the information processing device 300 to display a pop-up for instructing whether to disconnect information processing device 200 and permit an increase in the image quality and the audio quality of another link, it is possible to instruct the user using the pop-up. For example, when whether the information processing device 200 is caused to display the pop-up is displayed by the information processing device 300 and an instruction to cause the information processing device 200 to display the pop-up is given, the information processing device 200 may be caused to display the pop-up.

In this case, the user of the information processing device 200 can give the instruction. To ensure a more stable link, it is desirable to select a communication scheme with a slower transmission speed than a communication scheme with a fast transmission speed and start the communication when the connection process starts.

For example, when the disconnection is permitted on the pop-up, the information processing device 300 performs a process of stopping the stream transmission with the information processing device 200 until an improvement in the link radio wave propagation situation. In this case, the management information regarding the information processing device 200 retained in the management information retention unit 390 is erased.

For example, when the disconnection is not permitted on the pop-up, the information processing device 300 performs a process of changing the frequency channel of the information processing device 200.

In this way, the control unit 370 can perform control such that the display unit 351 is caused to display the display information (for example, the pop-up) regarding whether to disconnect the used frequency channel. When a user manipulation indicating that the disconnection of the used frequency channel is not permitted is received, the control unit 370 performs control such that the frequency channel is newly changed.

For example, in a situation in which the stream is transmitted with the link of the information processing devices 400 and 300, it is necessary to perform a process so that the stream transmission of another link is not affected. Therefore, it is desirable to perform preliminary setting rather than instructing the user at a movement timing of the information processing device 200. In this case, when the link is automatically switched, the image quality decreases due to a change in the resolution. Therefore, as a method of notifying the user of the link change state, display of "2.4 GHz," "60 GHz," or the like may be performed.

Figure 22:
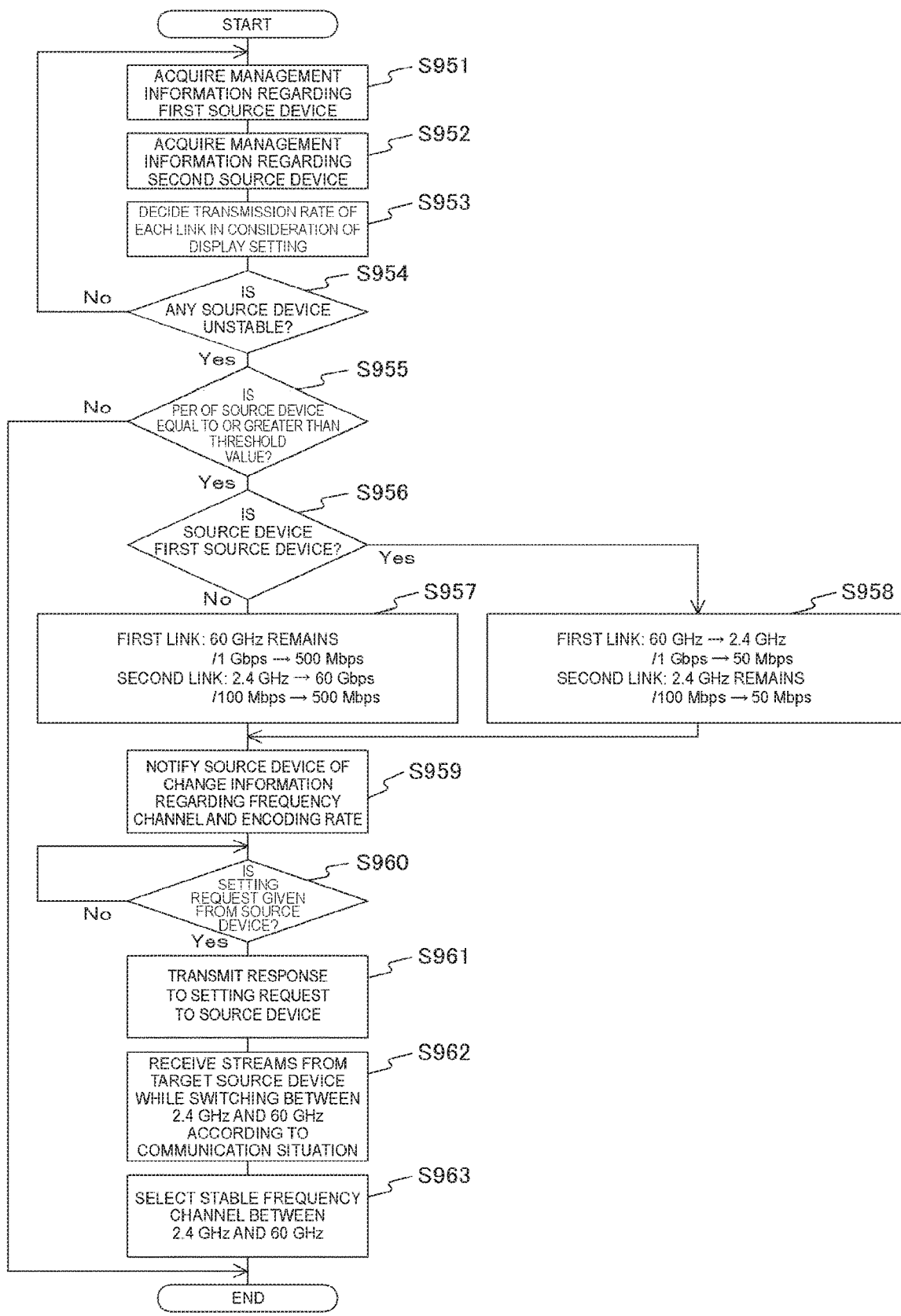
FIG. 22 is a flowchart illustrating an example of a processing procedure of a frequency channel setting process performed by an information processing device 300 according to the second embodiment of the present technology.

Here, an operation environment in which the information processing device 200 frequently moves between the radio wave arrival ranges 701 and 702 is also assumed. Accordingly, FIG. 22 illustrates an example in which the first and second frequency channels are switched at a high speed.

[Image Compression Example]

Next, an example of an image compression method of making a packet loss invisible to a user even in an environment in which the dynamic range of an encoding rate is large will be described. In the second embodiment of the present technology, transmission rate control using a scalable codec will be described as an example. First, the scalable codec will be described.

[Examples of Spatial Scalability and SNR Scalability]

FIG. 18 is a diagram for describing examples of the spatial scalability and the SNR scalability used in the communication system 700 according to the second embodiment of the present technology.

FIG. 18a is a diagram for describing an example of the spatial scalability. Specifically, three layers L1, L2, and L3 to be subjected to scalable encoding are illustrated.

The layer L1 is a base layer and the layers L2 and L3 are enhanced layers. A ratio of the spatial resolution of the layer L2 to the layer L1 is 2:1. A ratio of the spatial resolution of the layer L3 to the layer L1 is 4:1. Even when the resolutions are mutually different in this way, there is a high possibility of a motion appearing in a prediction unit B1 inside the layer L1 also appearing similarly in a corresponding prediction unit B2 inside the layer L2 and a corresponding prediction unit B3 inside the layer L3. This is motion correlation between the layers in the spatial scalability.

FIG. 18b is a diagram for describing an example of the SNR scalability. Specifically, three layers L1, L2, and L3 to be subjected to scalable encoding are illustrated.

The layer L1 is a base layer and the layers L2 and L3 are enhanced layers. The spatial resolutions of the layers L1, L2, and L3 are mutually the same.

However, for example, a minimum quantization scale of the layer L1 is 25 and a bit rate of an encoded stream is suppressed to about 2 Mbps by quantization of an orthogonal transform coefficient. On the other hand, for example, a minimum quantization scale of the layer L2 is 12 and a bit rate of an encoded stream is about 5 Mbps. For example, a minimum quantization scale of the layer L3 is 0 and a bit rate of an encoded stream is about 10 Mbps. Even when the bit rates are mutually different in this way, there is a high possibility of a motion appearing in the prediction unit B1 inside the layer L1 also appearing similarly in the corresponding prediction unit B2 inside the layer L2 and the corresponding prediction unit B3 inside the layer L3. This is motion correlation between the layers in the SNR scalability.

[Example of Stream Transmission Amount Using Scalable Video Coding Extensions of High Efficiency Video Coding (SHVC)]

Figure 19:
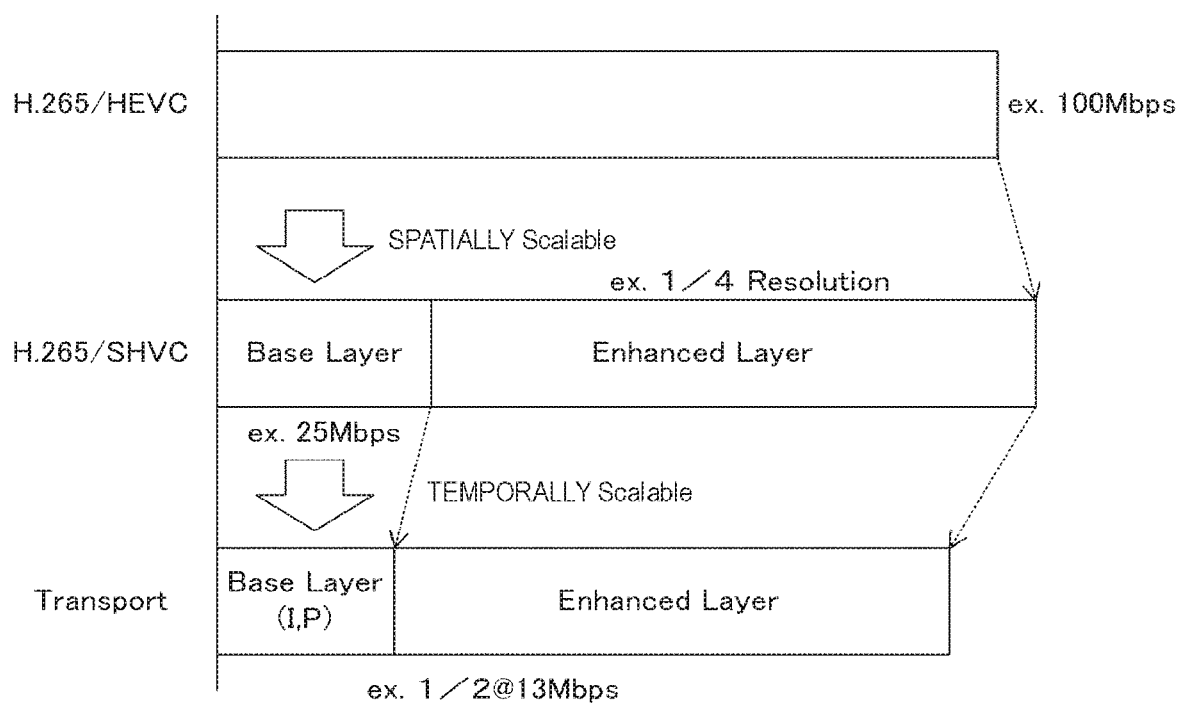
FIG. 19 is a diagram schematically illustrating a stream transmission amount using SHVC used in the communication system 700 according to the second embodiment of the present technology.

FIG. 19 is a diagram schematically illustrating a stream transmission amount using SHVC used in the communication system 700 according to the second embodiment of the present technology.

As illustrated in FIG. 19, a high-quality video corresponding to HD is subjected to image compression with high efficiency video coding (HEVC) and an image quality equivalent to 100 Mbps is assumed. For example, the image quality is encoded with scalability to correspond to 25 Mbps of the base layer and correspond to 100 Mbps of the enhanced layer in SHVC when the spatial scalability is used.

For example, when only an equivalence of 25 Mbps of the base layer can be received by a sink device, video display is achieved. Further, when an equivalence of 100 Mbps of the enhanced layer is received, higher quality is realized.

When the data transmission rate is further narrowed from the viewpoint of the data transmission rate control, the data transmission rate can be set to ½ or ¼ by using the temporal scalability.

For example, a case in which an original image is 60 fps and an application allowing up to 30 fps is assumed. In this case, for an image with HD 100 Mbps, the data transmission rate can be narrowed up to 13 Mbps (100 Mbps×(½)×(¼)) using the spatial scalability and the temporal scalability, as illustrated in FIG. 19.

[Example in which Data Transmission Rate is Narrowed Using SNR Scalability]

Figure 20:
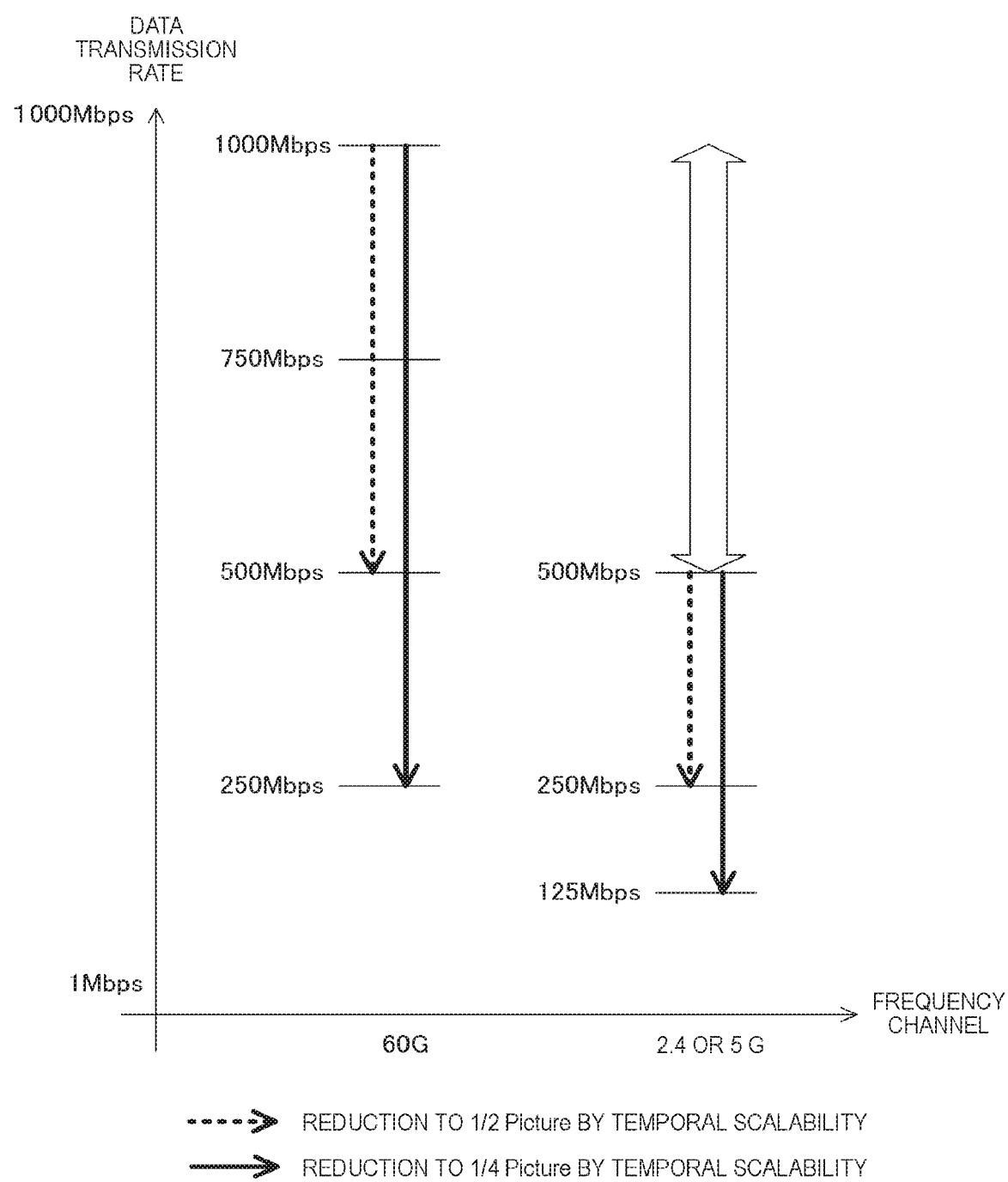
FIG. 20 is a diagram schematically illustrating an example in which a data transmission rate is narrowed using the SNR scalability used in the communication system 700 according to the second embodiment of the present technology.

FIG. 20 is a diagram schematically illustrating an example in which a data transmission rate is narrowed using the SNR scalability used in the communication system 700 according to the second embodiment of the present technology. Specifically, an example in which the data transmission rate is narrowed from 1000 Mbps to 125 Mbps using the SNR scalability will be described.

Here, a case in which the wireless communication units 220 and 320 illustrated in FIGS. 2 and 3 use 60 GHz is assumed. In this case, the data transmission rate of 1000 Mbps which is 10 times HD 100 Mbps can be narrowed up to 500 Mbps or 250 Mbps using ½ temporal scalability and ¼ temporal scalability. For example, when the data transmission rate received by the sink device is equal to or greater than 250 Mbps, a video does not stop. Therefore, for example, a reception side may not receive a video at 1000 Mbps. However, when the reception side can receive a video at up to 500 Mbps, it is possible to output a high-quality video in which the display quality of the sink device is 500 Mbps.

A case in which the sink device capable of receiving the video at up to 500 Mbps notifies the source device of the data transmission rate and the source device reduces the data transmission rate of the SNR scalability to 500 Mbps is assumed. In this case, the SNR is less than that of a video encoded for a target of 1000 Mbps, but the reception side can switch and reproduce a video seamlessly without a deterioration in fps.

In FIGS. 19 and 20, simple numerical values have been used to facilitate the description. However, these numeral values are merely examples and the same can also apply to other numeral values. In FIG. 20, an example in which a narrowing width of the data transmission rate is set to two stages is illustrated, but the same can also apply to a case in which the narrowing width is set to three stages. For example, as the number of stages increases as in three or more stages, the minimum data transmission rate can be narrowed, and thus the dynamic range of the data transmission rate can be broadened. Further, even when the transmission rate is returned from a low transmission rate to a high transmission rate, communication is performed at the data transmission rate of 500 Mbps to the data transmission rate of 1000 Mbps and a received reception transmission rate from the information processing device is comprehended. Accordingly, the packet loss can be made invisible, and thus an optimum SNR can be set.

[Acquisition Example of Management Information]

Figure 21:
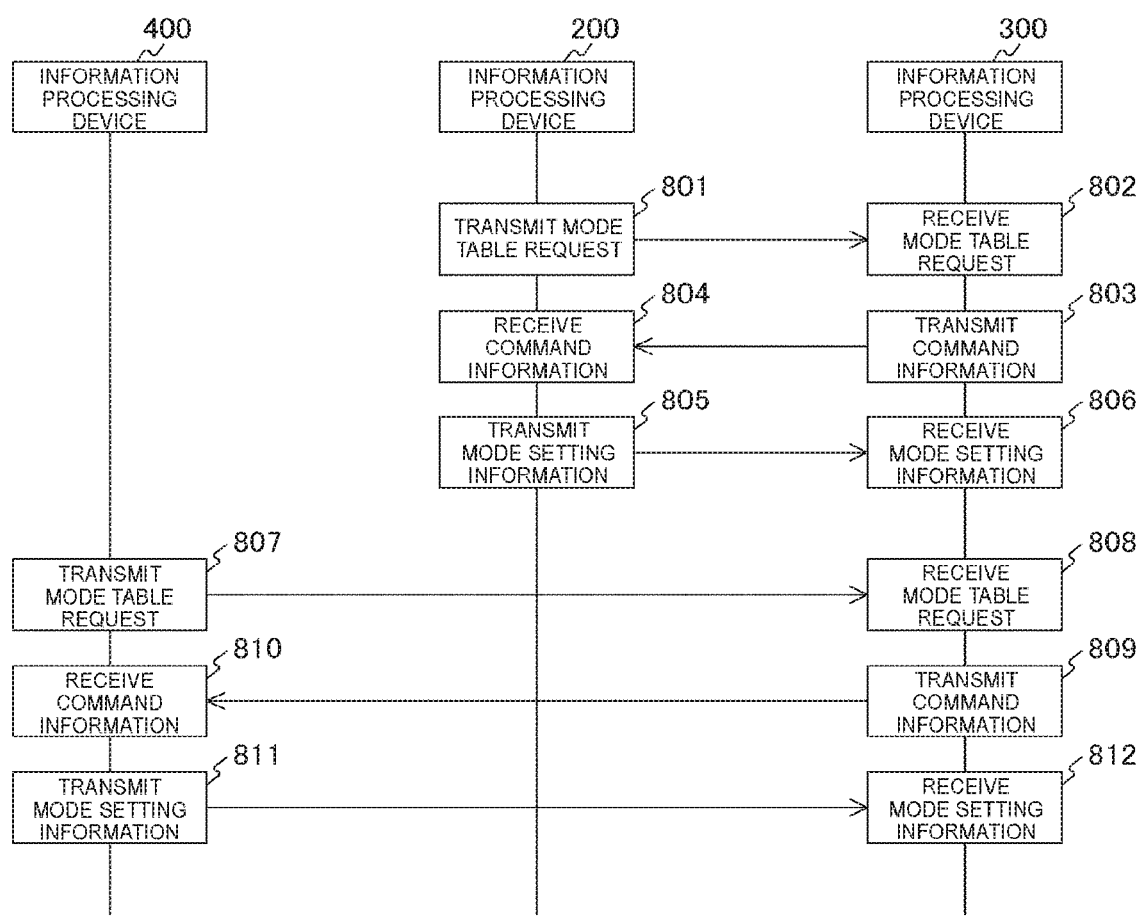
FIG. 21 is a sequence chart illustrating a communication process example between devices included in the communication system 700 according to the second embodiment of the present technology.

FIG. 21 is a sequence chart illustrating a communication process example between the devices included in the communication system 700 according to the second embodiment of the present technology. FIG. 21 illustrates an example in which the information processing device 300 acquires the management information regarding each of the information processing devices 200 and 400.

Processes (801 to 806) and processes (807 to 812) illustrated in FIG. 21 correspond to the processes (505 to 510) illustrated in FIG. 6.

In FIG. 21, the same acquisition example of the management information as the first embodiment of the present technology is illustrated, but the management information regarding each information processing device may be acquired according to another method.

[Operation Example of Information Processing Device (Source Device)]

FIG. 22 is a flowchart illustrating an example of a processing procedure of a frequency channel setting process performed by the information processing device 300 according to the second embodiment of the present technology.

FIG. 22 illustrates an example of a case in which the information processing device 300 performs link (first link) connection with the information processing device 200 and performs link (second link) connection with the information processing device 400. FIG. 22 illustrates an example in which content transmission is performed using the first frequency channel in the first link and content transmission is performed using the second frequency channel in the second link when the processing procedure starts. FIG. 22 illustrates an example in which it is determined whether there is a problem in data transmission speeds of both of the two frequency channels and connection setting is performed such that the two frequency channels are switched at a high speed while being conscious of a data transmission speed state of another link. FIG. 22 illustrates an example in which an operation starts by setting the first link to 60 GHz and setting the second link to 2.4 GHz for convenience. Since the data transmission speeds of the two frequency channels are assumed to be 10 times or more, the data transmission rate at 2.4 GHz is supposed to be 100 Mbps and the data transmission rate at 60 GHz is supposed to be 1 Gbps for description in the example illustrated in FIG. 22.

First, the control unit 370 acquires the management information regarding a first source device (the information processing device 200) (step S951). Subsequently, the control unit 370 acquires the management information regarding a second source device (the information processing device 400) (step S952). Each piece of management information is retained in the management information retention unit 390. A method of acquiring the management information is illustrated in FIG. 21.

Subsequently, the control unit 370 decides data transmission rates of the links (the first and second links) in consideration of the display setting (a display position, a size, or the like of an image on the display surface) (step S953).

The data transmission rates of the links (the first and second links) may be decided using the parameters illustrated in FIG. 4. For example, the data transmission rates of the links (the first and second links) can be decided as setting values in consideration of the areas of the main image and sub-image.

Here, a relation between the data transmission rates of the main image and the sub-image will be described. For example, a case in which the main image has an area which is N times of the area of the sub-image is assumed. In this case, the data transmission rate of the main image when 60 GHz is used can be set to 1 Gbps (N/(N+1)). The data transmission rate of the main image when 2.4 GHz is used can be set to 100 Mbps×(N/(N+1)).

The data transmission rate of the sub-image when 60 GHz is used can be set to 1 Gbps×(1/(N+1)). The data transmission rate of the sub-image when 2.4 GHz is used can be set to 100 Mbps×(1/(N+1)).

Subsequently, the control unit 370 determines whether each source device connected to the information processing device 300 is unstable (step 954). Here, the fact that the source device is unstable means, for example, that an image displayed on the display unit 351 is disturbed. Conversely, when all of the source devices are not unstable (step S954), the process returns to step S951.

When any source device is unstable (step S954), determination based on stability of the link of the unstable source device (target source device) is performed (step S955). For example, the control unit 370 determines whether the PER of the source device is equal to or greater than a threshold value (step S955). When the PER of the source device is less than the threshold value (step S955), the link of the source can be determined to be stable. Therefore, an operation of the frequency channel setting process ends.

In this example, the example in which the PER is used as an index when the stability of the link is determined has been described, but another index may be used. For example, the stability of the link may be determined using a BER, an RSSI, a PER, the number of retransmissions of packets, a throughput, frame drop, an SIR, or the like as the index. Packet delay received by a reception side may be determined and information regarding the packet delay may be used as radio wave propagation measurement information. The packet delay serves as one index related to radio wave propagation since delay occurs in transmission to the reception side through a retransmission process in layer 2, for example, at the time of occurrence of an error. The packet delay serves as, for example, an index indicating where link characteristics deteriorate in a wireless system in which a plurality of devices share wireless bands.

When the PER of the source device is equal to or greater than the threshold value (step S955), the control unit 370 confirms the unstable link (step S956). That is, the control unit 370 determines whether the source device is the first source device (step S956). Then, an empty situation of a frequency channel different from the frequency channel currently used by the source device is comprehended (step S957 and S958).

For example, when the source device is the second source device (step S956), an empty situation of a frequency channel different from the frequency channel currently used by the second source device is comprehended (step S957). When the source device is the first source device (step S956), an empty situation of a frequency channel different from the frequency channel currently used by the first source device is comprehended (step S958).

Here, FIG. 22 illustrates an example of a case in which the main image and the sub-image have the same area (where N=1). An example in which the frequency channel is 60 GHz and the data transmission rate is 1 Gbps in the first source, and the frequency channel is 2.4 GHz and the data transmission rate of the source is 100 Mbps in the second source is illustrated.

For example, when the second source is changed (step S956), the frequency channel of the first link remains at 60 GHz and the data transmission rate is dropped from 1 Gbps to 500 Mbps (step S957). The frequency channel of the second link is changed from 2.4 GHz to 60 GHz and the data transmission rate is changed from 100 Mbps to 500 Mbps (step S957). In this way, when the frequency channel of the second link is changed from 2.4 GHz to 60 GHz, two links (the first and second links) are necessary for 60 GHz. Here, for example, a case in which the maximum data transmission rate of 60 GHz is 1 Gbps and the areas of the main image and the sub-image are the same is assumed. In this case, the same transmission speed is necessary for the main image and the sub-image. In this case, to perform transmission with two links (the first and second links), it is necessary to set 500 Mbps (1 Gbps/2) as the data transmission rate. Therefore, when the frequency channel of the second link is changed from 2.4 GHz to 60 GHz, the data transmission rate is changed from 100 Mbps to 500 Mbps (step S957).

For example, when the first source is changed (step S956), the frequency channel of the first link is changed from 60 GHz to 2.4 GHz and the data transmission speed is lowered from 1 Gbps to 50 Mbps (step S958). For the second link, the frequency channel remains at 2.4 GHz and the data transmission rate is lowered from 100 Mbps to 50 Mbps (step S958). When the frequency channel of the second link remains at 2.4 GHz, the reason for lowering the data transmission rate from 100 Mbps to 500 Mbps is the same as that of the case in which the frequency channel of the second link is changed from 2.4 GHz to 60 GHz (step S957).

In this way, after the empty situation of the data transmission speed is comprehended (steps S957 and S958), the control unit 370 notifies the target source device of the change information regarding the frequency channel and the encoding rate in regard to the unstable link (step S959).

Subsequently, the control unit 370 determines whether a setting request is received from the target source device transmitting the change information (step S960). When the setting request is not received, the monitoring is continuously performed. Conversely, when the setting request is received (step S960), the control unit 370 transmits a response to the setting request to the target source device (step S961). After the response to the setting request is transmitted, the source device sets the encoding rate. That is, the target source device sets the encoding rate to control the stream generation of the image or the audio in consideration of the number of devices connected to the network for each frequency channel to be used.

An embodiment of the present technology is not limited thereto. For example, the streams of separate throughputs at 60 GHz and 2.4 GHz may be generated and switching may be performed while being synchronized. For example, such a process is possible by using a low delay codec.

Subsequently, the control unit 370 decides the encoding rate or the frequency channel to be used with reference to each piece of information regarding whether characteristics of 60 GHz are better or characteristics of 2.4 GHz are better according to a communication situation (step S962). Here, each piece of referred information is, for example, information such as the PER, the data transmission rate, and the stability or the management information illustrated in FIG. 4.

Subsequently, the control unit 370 selects the stable frequency channel between 60 GHz and 2.4 GHz (step S963). Then, the control unit 370 transmits a request for transmitting the stream using the selected frequency channel to the target source device (for example, the information processing device 200) (step S963). Accordingly, the stable link is selected and the stable stream communication can be performed.

Each threshold value may be changed according to whether the source device is a mobile device. Accordingly, when the source device is a mobile device, the switching is configured to easily occur and the stabilization is realized, and thus the transmission can be realized.

Here, when the source device (target source device) targeted to change the frequency channel is a mobile device and two frequency channels are simultaneously used, a battery is easily consumed. Accordingly, the information processing device 200 may perform determination based on information received from the information processing device 300. To perform the determination, it is necessary to include information regarding the links of all of the source devices connected to the information processing device 300 in the information (for example, the command information illustrated in FIG. 6) from the information processing device 300 and it is necessary for the information processing device 200 to acquire each piece of such information. Then, the information processing device 200 can select the stable frequency based on the information regarding all of the source devices acquired in this way. The information processing device 200 can determine whether another link is affected. The information processing device 300 may be notified in advance of the management information indicating that the information processing device 200 is a mobile station, and the information processing device 300 may determine the frequency channel at which the transmission of the stream is stable based on the information regarding the stream transmission control (for example, the data transmission speed control and the scalability transmission rate control) of the entire system.

In this way, the information processing devices 200 and 300 are the information processing devices capable of performing the wireless communication using the plurality of frequency channels. The control unit 370 of the information processing device 300 performs the control such that one frequency channel is set in the information processing device 200 from the plurality of frequency channels based on the capability information regarding the information processing device 200, the radio wave propagation measurement information, and the use of the information processing device 300. The control unit 370 of the information processing device 300 can perform the control such that one frequency channel is set more stably from the plurality of frequency channels based on the capability information regarding the information processing device 200, a function of causing a buffer standby time to be automatically constant (Time To Live unction) and deleting the stream data from an unstable link transmission buffer after the constant time, a function of determining that the link is unstable by the number of retransmissions or the like, and the use of the information processing device. In this case, the control unit 370 of the information processing device 300 can perform the control such that one frequency channel is set based on the radio wave propagation measurement information obtained by measuring the streams from the information processing device 200 while switching the plurality of frequency channels.

In this way, in the second embodiment of the present technology, a sink device (for example, a multi-view monitor) gathering images transmitted from a plurality of source devices as one can appropriately display images transmitted from the source devices. For example, it is possible to provide a target rate of a scalable codec according to a display form or a connection form of a sink device in regard to a data transmission rate with a large dynamic range and perform data transmission rate control in which the granularity of the transmission rate is minute. For example, it is possible to perform the data transmission rate control using the SNR scalability, the spatial scalability, and the temporal scalability.

In the second embodiment of the present technology, the example in which the first frequency channel is set to 60 GHz and the second frequency channel is set to 2.4 GHz for use has been described, but the present technology is not limited thereto. For example, the first frequency channel may be used as a 5 GHz band and the second frequency channel may be used as a 2.4 GHz band.

In the second embodiment of the present technology, the example in which two kinds of frequency channels are used has been described, but an embodiment of the present technology is not limited thereto. For example, the same can also apply to a case in which two different kinds of frequency channels are used (for example, LTE-A and 2.4 GHz or LTE-A and 60 GHz). For example, the same can also apply to a case in which three or more kinds of frequency channels are used. For example, the same can also apply to an information processing device that uses three kinds of frequency channels, 2.4 GHz, 5 GHz, and 60 GHz. In the second embodiment of the present technology, the example in which the same frequency is used in the first and second links has been described. However, the information processing device 300 may have access point (AP) PCP or group owner (GO) functions at 2.4 GHz, 5 GHz, and 60 GHz and an operation based on any of the functions may be performed by the information processing device 300. The information processing devices 200 and 400 may operate as the GO, and the information processing device 300 may operate as a client.

[Interchange Example of Packets Between Source and Sink Devices]

Next, an interchange example of packets between a source device (transmission side information processing device) and a sink device (reception side information processing device) will be described in detail with reference to the drawings.

[Configuration Example of Information Processing Device (Source Device)]

Figure 23:
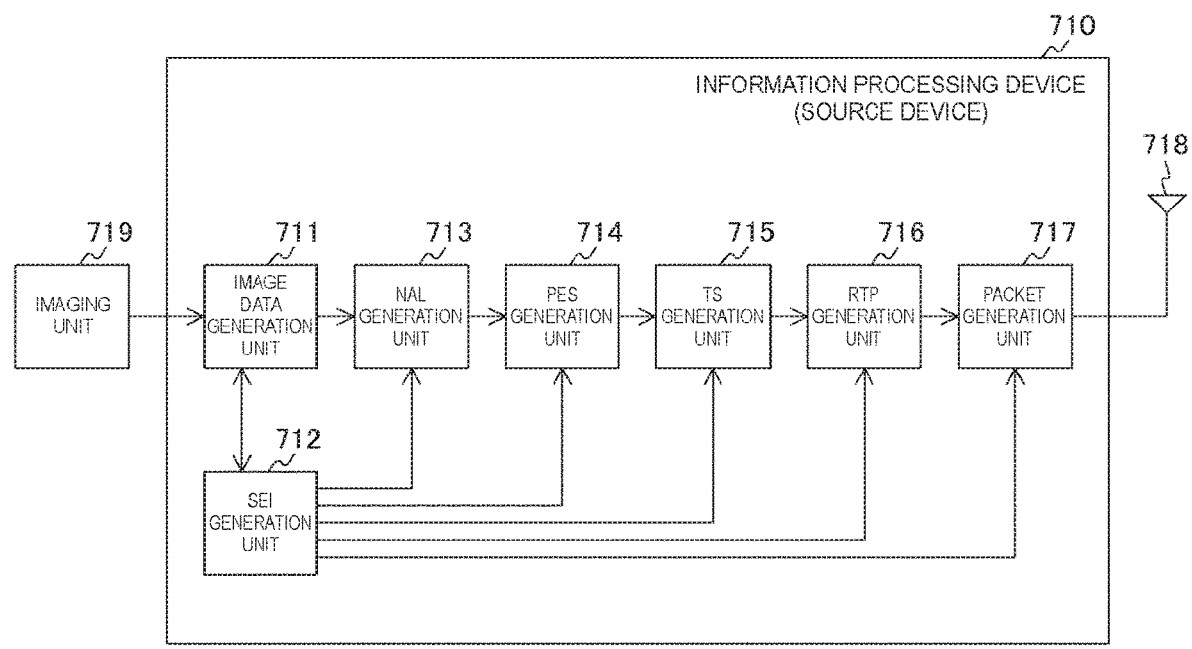
FIG. 23 is a block diagram illustrating a functional configuration example of an information processing device 710 according to the second embodiment of the present technology.

FIG. 23 is a block diagram illustrating a functional configuration example of an information processing device 710 according to the second embodiment of the present technology. The information processing device 710 is an example of a source device and corresponds to the information processing devices 200 and 400 illustrated in FIG. 17. In FIG. 23, only a configuration related to data transmission in the configuration of the information processing device 710 is illustrated and the other remaining configuration is not illustrated and will not be described.

Figure 24:
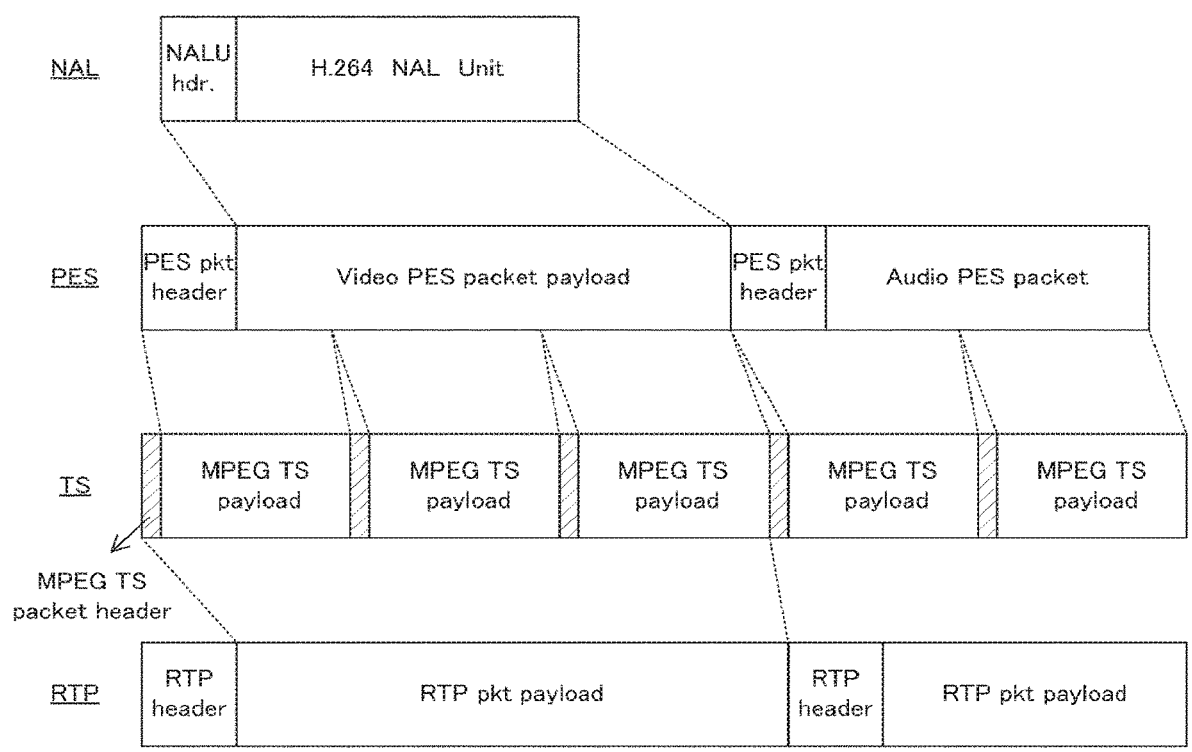
FIG. 24 is a diagram schematically illustrating packets generated in a transmission process performed by the information processing device 710 according to the second embodiment of the present technology.

FIG. 24 is a diagram schematically illustrating packets generated in a transmission process performed by the information processing device 710 according to the second embodiment of the present technology. The packets will be described in detail with reference to FIG. 23.

The information processing device 710 includes an image data generation unit 711, a supplemental enhancement information (SEI) generation unit 712, a network abstraction layer (NAL) generation unit 713, a packetized elementary stream (PES) generation unit 714, a transport stream (TS) generation unit 715, a real-time transport protocol (RTP) generation unit 716, and an antenna 718. These units are controlled by a control unit (which corresponds to the control unit 240 illustrated in FIG. 2).

The information processing device 710 is an example of an information transmission device (source device) that acquires image data generated by an imaging unit 719 and transmits the image data using wireless communication. The imaging unit 719 is, for example, an imaging device that images a subject and generates image data and is, for example, a digital still camera or a digital video camera (for example, a camera-integrated recorder). In FIG. 23, an example in which the imaging unit 719 is provided outside the information processing device 710 is illustrated, but the imaging unit 719 may be provided inside the information processing device 710.

The image data generation unit 711 performs various kinds of image processing on the image data (image data with a high frame rate) supplied from the imaging unit 719 to generate image data which is a transmission target. For example, the image data generation unit 711 encodes the image data (the image data with a high frame rate) supplied from the imaging unit 719 in accordance with advanced video coding (AVC) scheme. Then, the image data generation unit 711 supplies the encoded image data (encoded data) to the NAL generation unit 713. The image data generation unit 711 supplies control information regarding a current encoding target to the SEI generation unit 712.

The SEI generation unit 712 generates SEI and supplies the generated SEI to each unit. For example, the SEI generation unit 712 generates control information supplied from the image data generation unit 711, an encoding unit, and control information regarding a transmission designation (sink device) of the image data. For example, the SEI generation unit 712 generates the SEI for an AVC scheme and supplies the generated SEI for the AVC scheme to the NAL generation unit 713. The SEI generation unit 712 generates a control information flag and supplies the generated control information flag to the TS generation unit 715 and the RTP generation unit 716.

The NAL generation unit 713 adds an NAL header to the image data (encoded data) supplied from the image data generation unit 711, the SEI supplied from the SEI generation unit 712, or the like. That is, the NAL generation unit 713 generates an NAL unit of the compressed image data, the SEI, or the like. In this way, the NAL generation unit 713 functions as a transmission data generation unit, generates an access unit (AU) from the generated NAL unit as transmission data, and supplies the transmission data to the PES generation unit 714. An example of the NAL unit generated by the NAL generation unit 713 is illustrated in the top of FIG. 24.

The PES generation unit 714 performs PES packetizing on the AU supplied from the NAL generation unit 713 and supplies PES packets obtained through the PES packetizing to the TS generation unit 715. An example of the PES packets generated in the PES generation unit 714 is illustrated in the second from the upper side of FIG. 24.

The TS generation unit 715 performs TS packetizing on the data including the PES packets supplied from the PES generation unit 714 and the display control information flag supplied from the SEI generation unit 712 to generate TS packets. Then, the TS generation unit 715 multiplexes the TS packets to generate a TS and supplies the generated TS to the RTP generation unit 716. An example of the TS packets generated by the TS generation unit 715 is illustrated in the third from the upper side of FIG. 24.

The RTP generation unit 716 generates the TS supplied from the TS generation unit 715 as RTP packets and supplies the generated RTP packets to the packet generation unit 717. An example of the RTP packets generated by the RTP generation unit 716 is illustrated in the bottom of FIG. 24.

The packet generation unit 717 adds an UDP header or a TCP header and an Internet Protocol (IP) header and generates wireless packets (IEEE802.11 packets to perform wireless transmission. Then, the packet generation unit 717 supplies the generated wireless packets to the antenna 718.

The packet generation unit 717 sets the priority of the wirelessly transmitted packets. Accordingly, the information processing device 710 can transmit packets with high importance to another information processing device (sink device) even when a change in a wireless radio wave environment occurs. A method of setting the priority will be described in detail with reference to FIG. 25.

The antenna 718 is an antenna that functions as a transmission unit and transmits the wireless packets supplied from the packet generation unit 717 to another information processing device (sink device) using radio waves.

[Example of Priority Competition Access Control]

Figure 25:
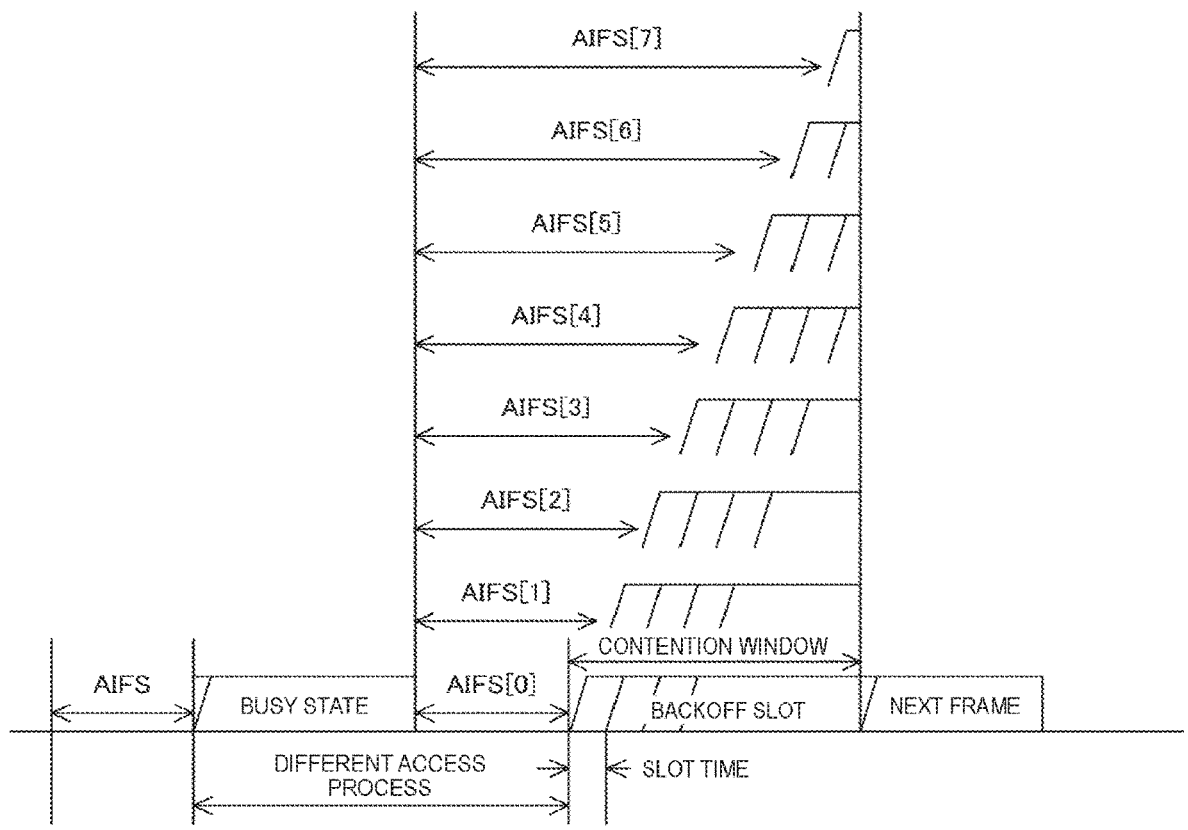
FIG. 25 is a diagram illustrating an example of a priority competition access control method performed by the information processing device 710 according to the second embodiment of the present technology.

FIG. 25 is a diagram illustrating an example of a priority competition access control method performed by the information processing device 710 according to the second embodiment of the present technology. A priority competition access control scheme illustrated in FIG. 25 is a priority competition access control scheme in a wireless communication system that conforms to IEEE802.11e. The priority competition access control scheme is referred to as an enhanced distributed channel access (EDCA).

In the EDCA, a difference is made in a transmission backoff timing according to priorities (access categories 0 to 7) described in an access category (hereinafter referred to as an AC) of data to be transmitted. Further, a difference is made in a setting value of an arbitration inter frame space (AIFS) in which transmission starts. When another communication does not start throughout the AIFS, data can be transmitted. That is, data of the access category with high priority is transmitted with setting of the short AIFS and data of the access category with low priority is transmitted with setting of the long AIFS.

When the transmission is performed in this way, an information processing device that transmits the data with the low priority waits for transmission due to communication of the other data with high priority within an AIFS setting time. That is, an access control method of permitting an information processing device that stores data with high transmission priority to preferentially transmit data to a wireless medium is realized.

FIG. 25 illustrates an example in which access category 0 has the highest priority and the priorities are set up to access category 7. Data of access category 0 with the highest priority can be transmitted after AIFS [0] passes. Data of access category 1 with the next highest priority can be transmitted after "AIFS [1]=AIFS [0]+backoff 1 unit" (corresponding to 1 backoff slot) passes.

In the following, similarly, data of access category 2 can be transmitted after "AIFS [2]=AIFS [0]+backoff 2 units" passes, and data of access category 3 can be transmitted after "AIFS [3]=AIFS [0]+backoff 3 units" passes. Further, data of access category 4 can be transmitted after "AIFS [4]=AIFS [0]+backoff 4 units" passes, and data of access category 5 can be transmitted after "AIFS [5]=AIFS [0]+backoff 5 units" passes. Furthermore, data of access category 6 can be transmitted after "AIFS [6]=AIFS [0]+backoff 6 units" passes, and data of access category 7 can be transmitted after "AIFS [7]=AIFS [0]+backoff 7 units" passes.

[Example of Priority Setting of EDCA]

Next, a method of performing packet classification on the NAL generated by the image data generation unit 711 or the NAL generation unit 713 using the plurality of PESs and setting the priority of the EDCA for each classification will be described.

Figure 26:
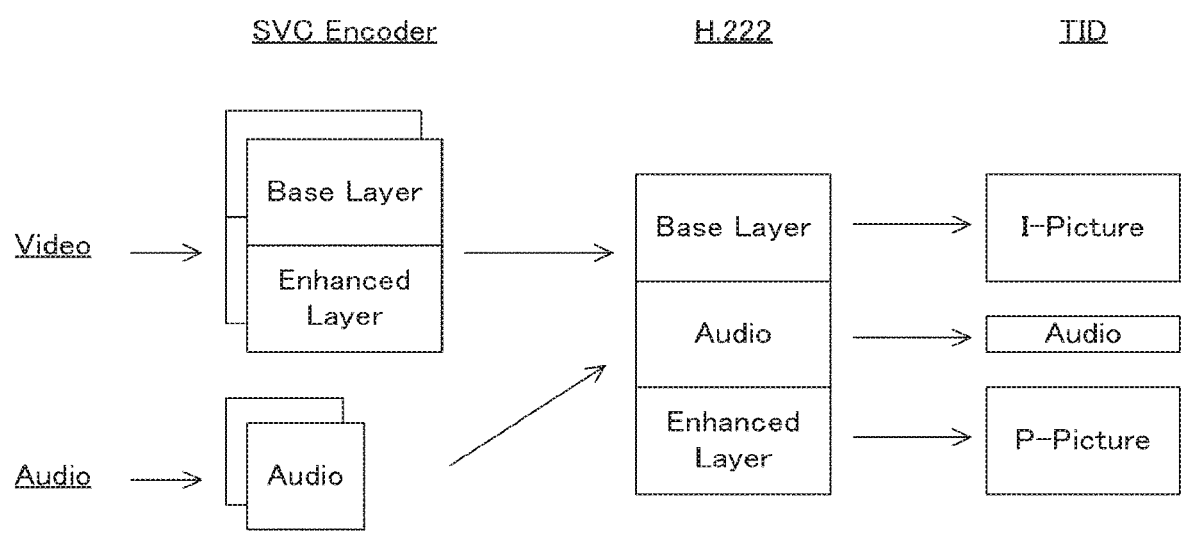
FIG. 26 is a diagram schematically illustrating a flow of media data when the information processing device 710 performs a transmission process according to the second embodiment of the present technology.

FIG. 26 is a diagram schematically illustrating a flow of media data when the information processing device 710 performs a transmission process according to the second embodiment of the present technology.

Figure 27:
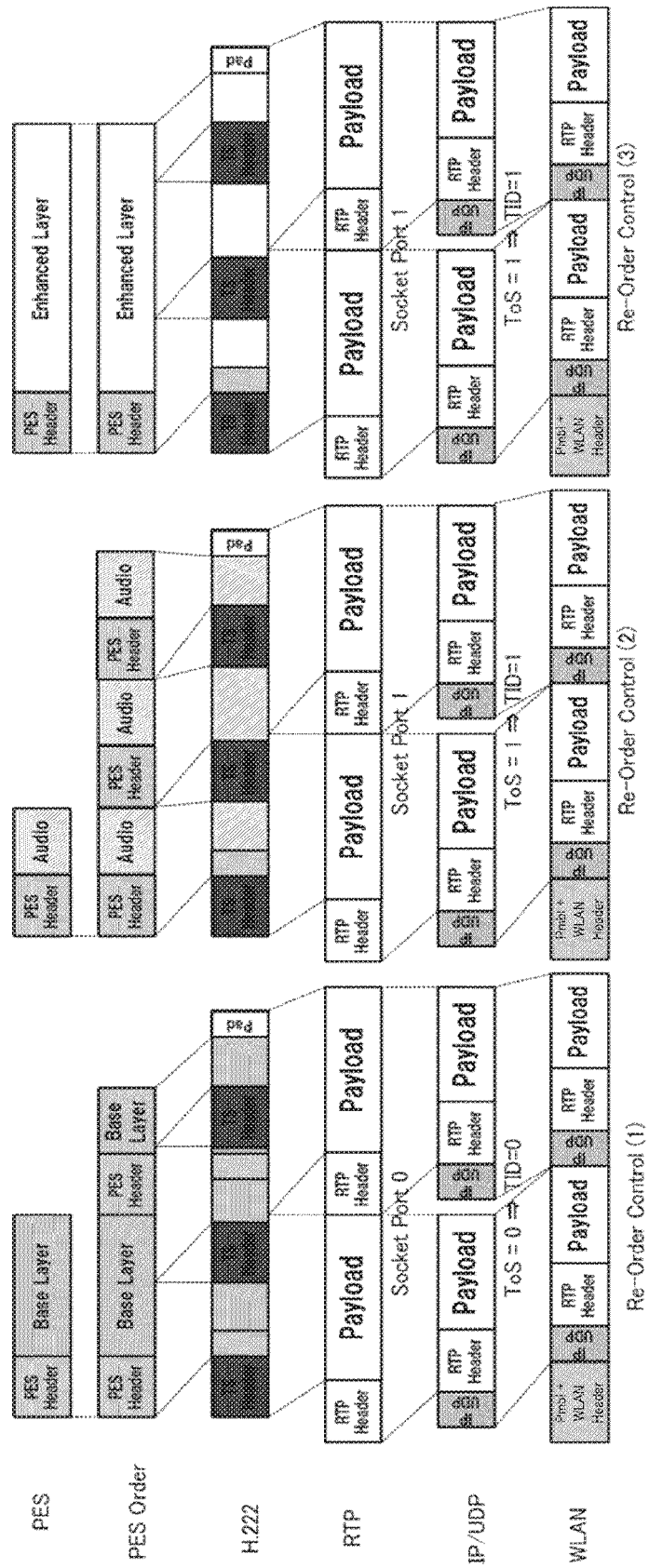
FIG. 27 is a diagram schematically illustrating a generation example of wireless packets to be transmitted by the information processing device 710 according to the second embodiment of the present technology.

FIG. 27 is a diagram schematically illustrating a generation example of wireless packets to be transmitted by the information processing device 710 according to the second embodiment of the present technology. Specifically, an generation example of wireless packets of a base layer generated with scalable video coding (SVC) is illustrated in the bottom of FIG. 27. In the middle of FIG. 27, a generation example of wireless packets of an enhanced layer generated from the SVC is illustrated. In the top of FIG. 27, a generation example of wireless packets of audio data encoded by an audio codec is illustrated.

As illustrated in FIG. 27, the base layer and the enhanced layer generated from the SVC and the audio data encoded by the audio codec are mapped to separate PESs. The PES generation unit 714 multiplexes the plurality of packets in regard to each PES and the TS generation unit 715 splits the multiplexed packets into the TS packets. H.222 illustrated in FIG. 27 is a standard for generating the TS packets, but another generation method may be used.

The RTP generation unit 716 performs a process of performing RTP packetizing on the TS packets generated by the TS generation unit 715 and performing multiplexing. The packet generation unit 717 forms the RTP packets as IP packets. The packet generation unit 717 performs a process of writing priority information on type of service (TOS) fields of the IP headers of the IP packets. Through the writing process, an EDCA function of the packet generation unit 717 can be notified of the priority information from the TOS fields of the IP headers of the IP packets in the process of generating the wireless packets. Accordingly, in the wireless transmission, the packets with high priority can be transmitted at a high probability.

[Process Example of Wireless Packet]

Next, a process method when the wireless packets generated by the information processing device 710 are interchanged will be described.

[Rearranging Process Example by a Sequence Number of Each PES]

Figure 28:
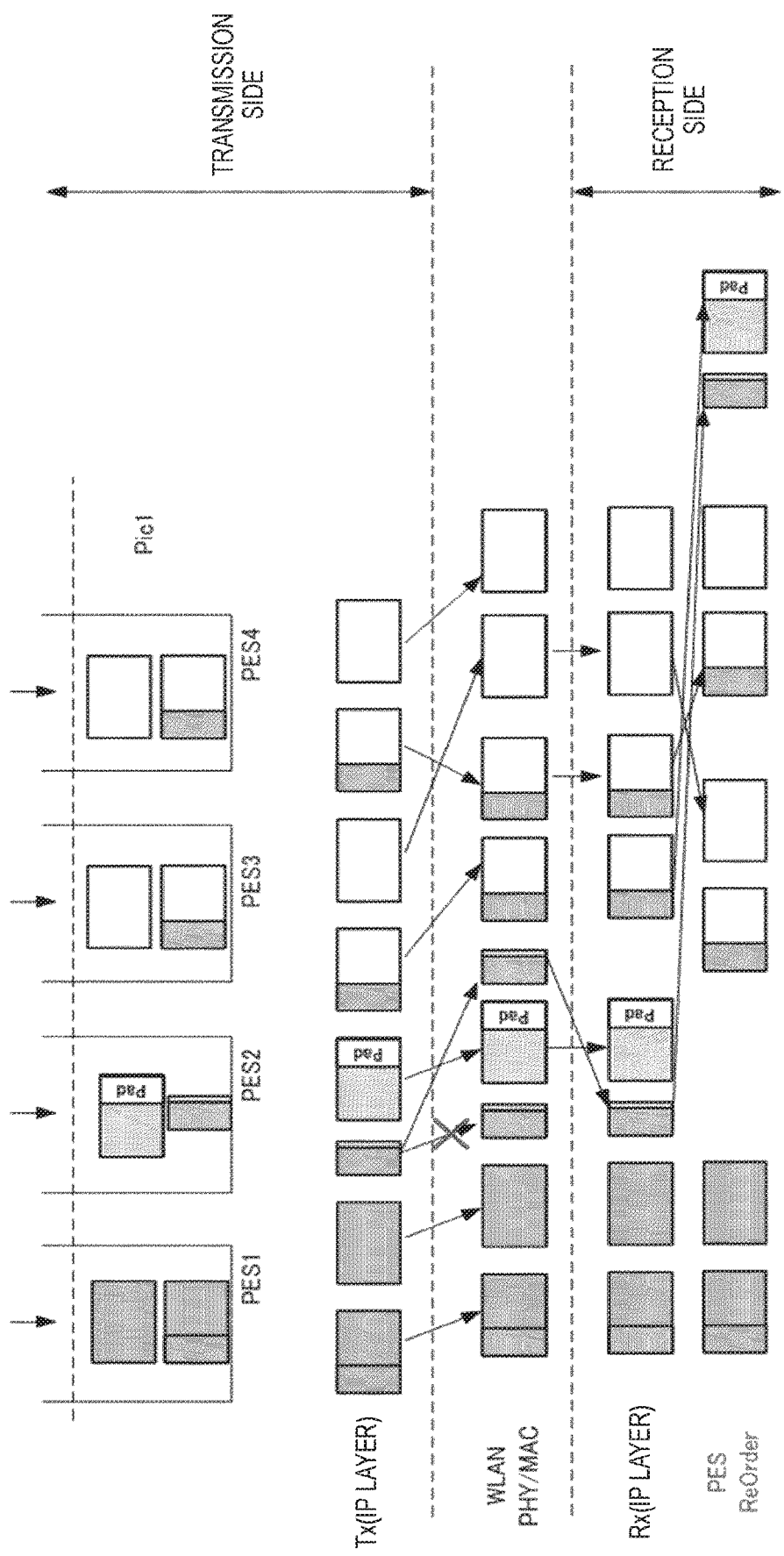
FIG. 28 is a diagram schematically illustrating an interchange example of the wireless packets generated by the information processing device 710 according to the second embodiment of the present technology.

FIG. 28 is a diagram schematically illustrating an interchange example of the wireless packets generated by the information processing device 710 according to the second embodiment of the present technology. Process content of a transmission side information processing device (the information processing device 710) is schematically illustrated on the left side of FIG. 28, and process content of a reception side information processing device is schematically illustrated on the right side of FIG. 28.

Figure 29:
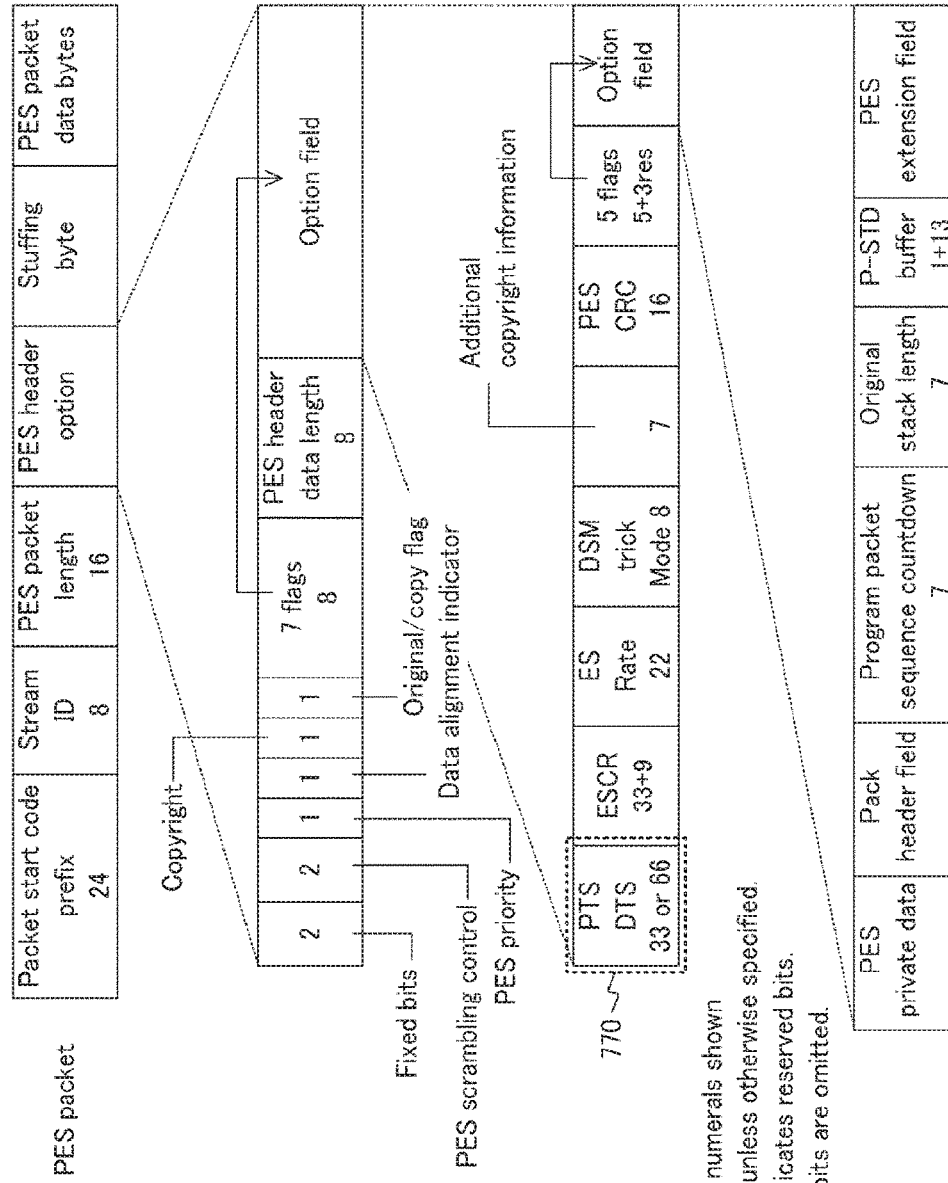
FIG. 29 is a diagram illustrating an example of a frame format of a PES generated by the information processing device 710 according to the second embodiment of the present technology.

FIG. 29 is a diagram illustrating an example of a frame format of a PES generated by the information processing device 710 according to the second embodiment of the present technology.

FIG. 28 illustrates an example in which a packet reception order in a retransmission process of a wireless physical layer process is different from at an output time from the RTP generation unit 716 of the information processing device 710 in accordance with the radio wave propagation environment.

In a MAC layer of the reception side information processing device, an operation is generally performed so that the packet order in the same PES is normal. On the other hand, the packet order between the PESs is not ensured even in the same stream. Therefore, the reception side information processing device performs a rearranging (a rearranging process (ReOrder process) by the sequence number) so that the packet order between the PESs becomes the original procedure. It is necessary to perform a rearranging process (the rearranging by the sequence number) to return the transmission priority in allocation of the PES to the NAL generation unit 713.

In the rearranging process (the rearranging by the sequence number), the order can be determined using a number present in the sequence number field of the RTP packet or DTS information (for example, information inside reference numeral 770 illustrated in FIG. 29) of the PES packet.

[Interchange Example of Transmission and Reception in QoS Transmission (Example of Buffering of Each PES)]

Figure 30:
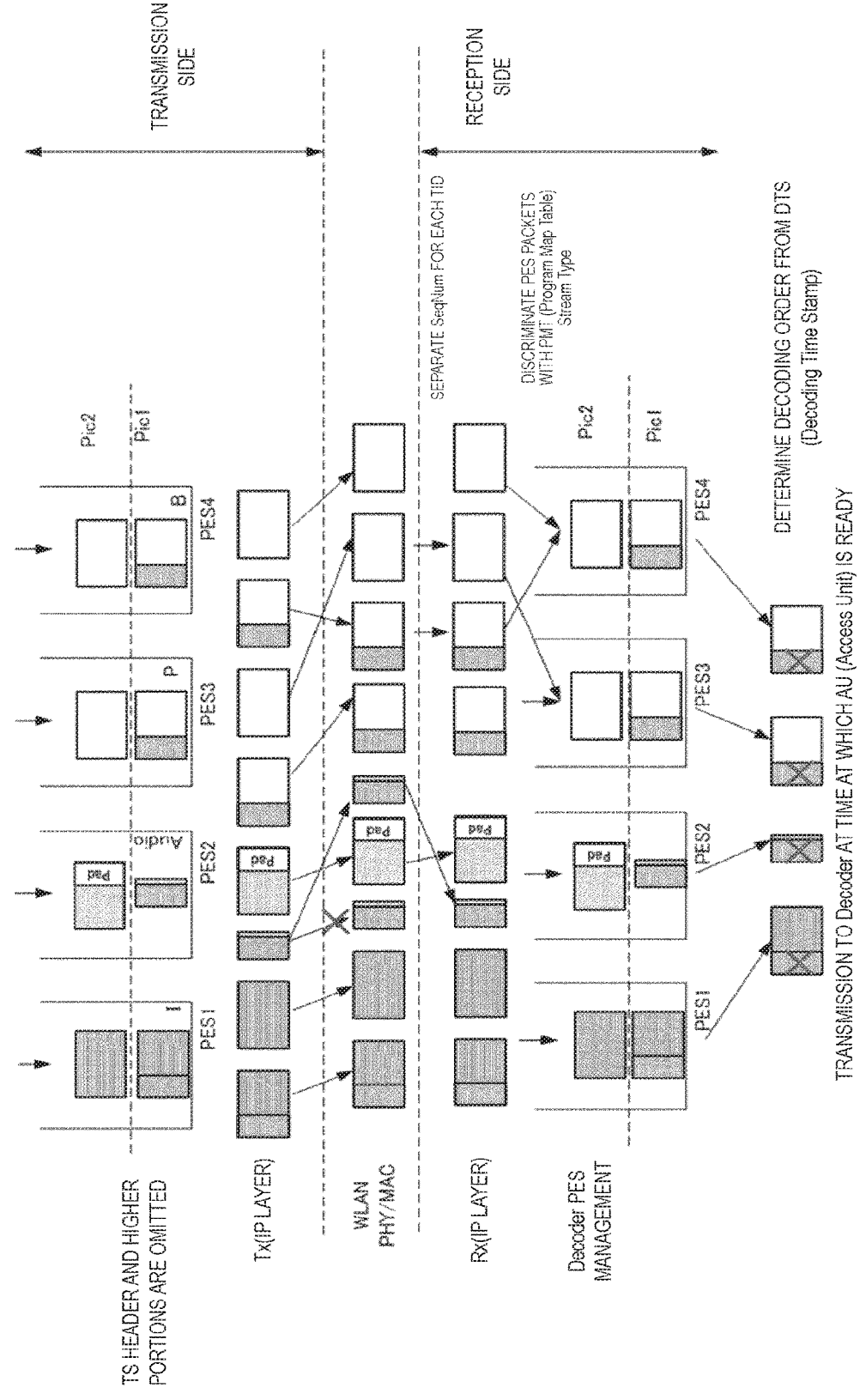
FIG. 30 is a diagram schematically illustrating an interchange example of the wireless packets generated by the information processing device 710 according to the second embodiment of the present technology.

FIG. 30 is a diagram schematically illustrating an interchange example of the wireless packets generated by the information processing device 710 according to the second embodiment of the present technology. Process content of the transmission side information process (the information processing device 710) is schematically illustrated on the left side of FIG. 30 and process content of the reception side information processing device is schematically illustrated on the right side of FIG. 30.

FIG. 28 illustrates an example in which the rearranging process (the rearranging process by the sequence number) is performed once. In FIG. 30, however, the rearranging process (the rearranging process by the sequence number) is not performed once, but a process method performed step by step is illustrated.

Here, to perform the process illustrated in FIG. 30, the reception side information processing device has a PES management storage region for each PES. In this way, by including the PES management storage region for each PES, each packet is written on each corresponding storage region when the packet is written on the storage region. Therefore, the packet order between the PES can be returned. Therefore, for example, even when the packet order between the PESs is transposed, the packet order between the PESs can be naturally returned. When a reading process from each storage region is performed and the packet is transmitted to a decoder, it is desirable to determine a reading order or time from the DTS header (for example, information inside reference numeral 770 illustrated in FIG. 29) of the PES packet.

[Interchange Example of Control Packet Between Transmission and Reception]

Figure 31:
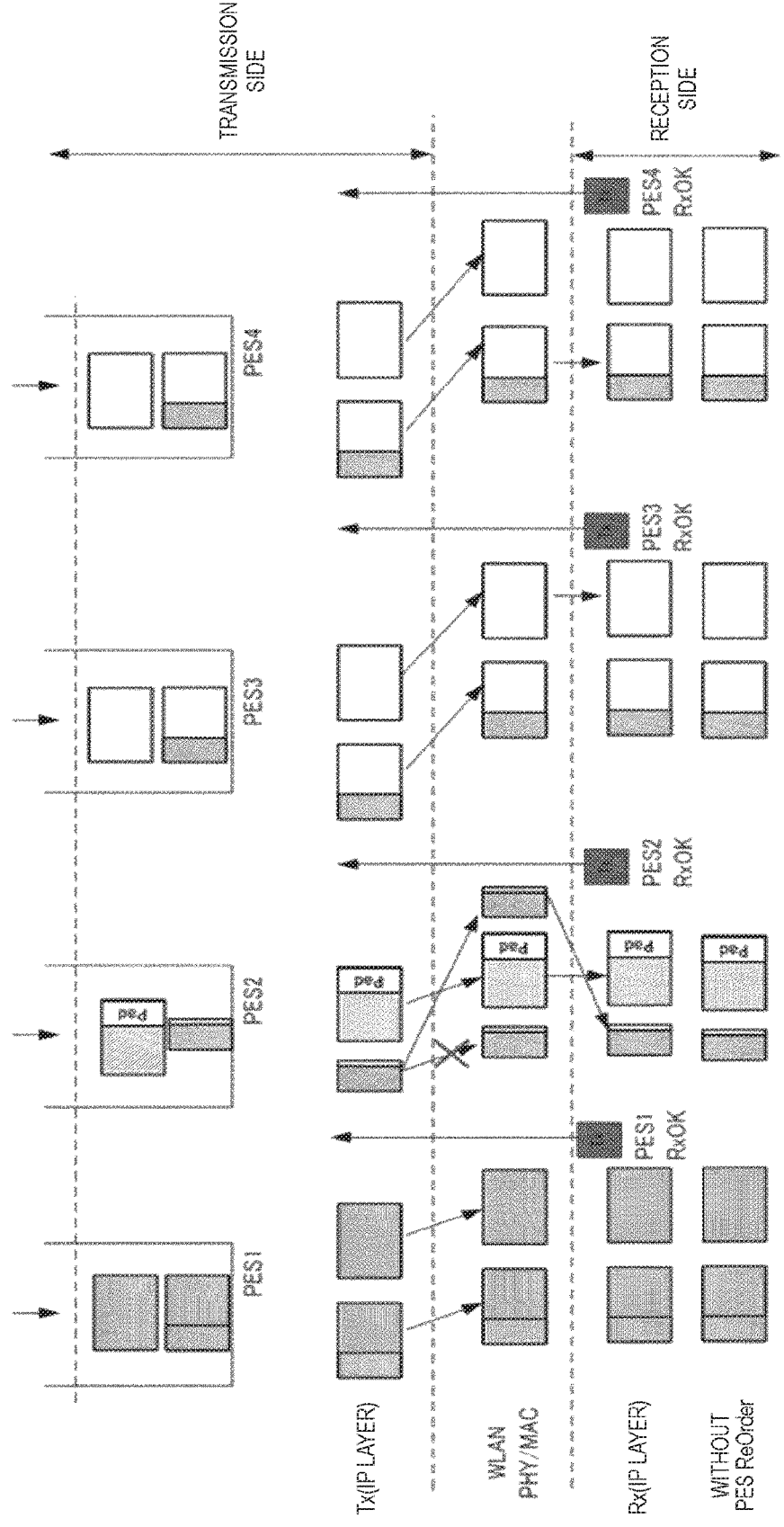
FIG. 31 is a diagram schematically illustrating an interchange example of the wireless packets generated by the information processing device 710 according to the second embodiment of the present technology.

FIG. 31 is a diagram schematically illustrating an interchange example of the wireless packets generated by the information processing device 710 according to the second embodiment of the present technology. Process content of the transmission side information process (the information processing device 710) is schematically illustrated on the left side of FIG. 31 and process content of the reception side information processing device is schematically illustrated on the right side of FIG. 31.

FIG. 31 illustrates an example in which a process of transmitting a reception confirmation (Acknoledge) packet from the reception side information processing device to the transmission side information processing device before movement to the subsequent PES between the transmission side information processing device and the reception side information processing device.

When the reception side information processing device performs a process of decoding the PES packet, the packet order is returned inside the same PES, and then the packet is received. Therefore, at a timing at which all the same PES packets are received, the reception side information processing device transmits the reception confirmation (Acknoledge) packet to the transmission side information processing device.

The transmission side information processing device receiving the reception confirmation (Acknoledge) packet starts transmitting the PES with the immediately lower priority. The transmission side information processing device retains the PES with the highest priority in advance for a given time to transmit this PES. Even when the transmission side information processing device does not transmit the packet with the lowest priority after elapse of the given time, the transmission side information processing device deletes all of the subsequent packets from the transmission buffer and starts the transmission process from the PES with the highest priority.

For example, in the case of wireless video transmission of the SVC scheme, a given time can be defined as a base layer transmission interval of the image data. At a timing at which the base layer can be transmitted, a process of stopping transmission of the enhancement layer or the audio data and prioritizing the transmission of the base layer can be performed.

For example, in the case of the wireless video transmission of the AVC scheme, a given time can be defined as an I picture transmission interval of the image data. At a timing at which an I picture can be transmitted, a process of stopping transmission of a P picture or a B picture and prioritizing the transmission of the I picture can be performed.

3. Third Embodiment

In the third embodiment of the present technology, a multi-reception diversity setting method, a multi-reception diversity changing method, and a content protection setting method will be mainly described.

[Multi-Reception Diversity Setting Method and Multi-Reception Diversity Changing Method Under Topology and Multiband Operation Environment]

For example, in communication (for example, 60 GHz) of a millimeter wave band, a broad bandwidth can be ensured. Therefore, the data transmission rate can be considerably fast for transmission. Since a wavelength is short, the size of a mounted device (including an antenna) can be reduced.

However, in the communication of the millimeter wave band, attenuation is large in rainfall or atmosphere. Accordingly, there are technologies for causing an antenna to have directivity and gaining a distance, such as beamforming. However, in an environment in which a link may not be ensured as in blocking by a person, a fast data transmission rate which is characteristics of a millimeter wave band may not be ensured. Accordingly, there is a method of avoiding the blocking in such a manner a reception side information processing device includes a plurality of wireless communication units (reception units). Such a technology is referred to as multi-reception diversity.

For example, a use form in which a plurality of images (for example, a main image and a sub-image) are displayed on one large-scale monitor is assumed. In such a use form, the monitor has a large screen. Therefore, by using the above-described technology (multi-reception diversity), intervals (installation intervals) of positions at which a plurality of wireless communication units are installed can be enlarged, and therefore it is possible to further improve the advantage.

However, even in the case of such a use form, it is necessary to perform setting based on the entire topology, such as setting of links as multi-reception diversity among a plurality of source devices. Therefore, for example, in a system that displays a plurality of source devices on one gathered monitor, it is important how to set the multi-reception diversity and how to change the multi-reception diversity.

[Method of Setting Content Protection Under Topology and Multiband Operation Environment]

Next, the content protection setting method will be considered. For example, a case in which a 60 GHz wireless network system typified by IEEE802.11ad is added and link control is necessary under the multiband operation environment is assumed. In this case, a control method of controlling an operation of setting display positions and bands for a plurality of images displayed in a sink device is important. In topology in which an avoidance link is prepared in advance as in the multi-reception diversity, a control method for setting content protection (also including a switching method therefor) is important.

Accordingly, in the third embodiment of the present technology, an example in which appropriate control is performed on communication between source and sink devices will be described.

[Configuration Example of Communication System]

Figure 32:
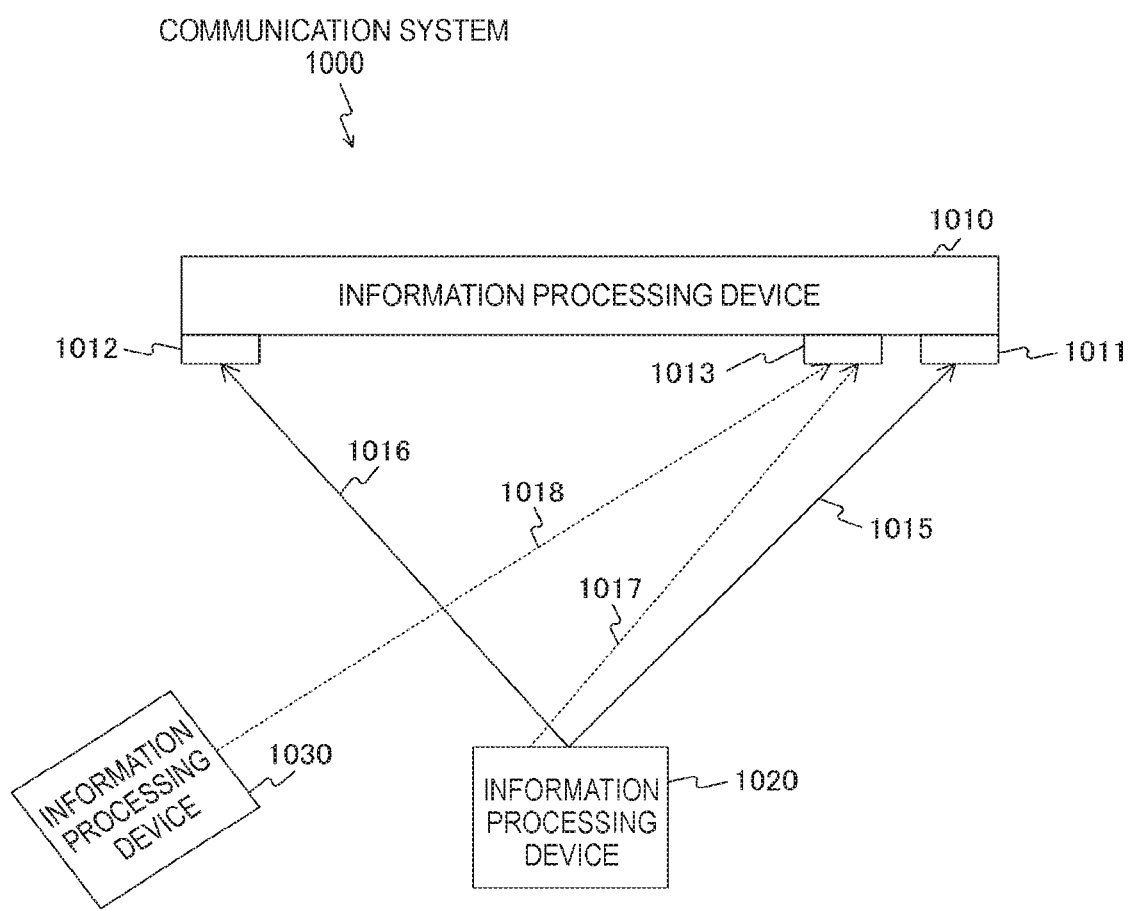
FIG. 32 is a block diagram illustrating a system configuration example of a communication system 1000 according to a third embodiment of the present technology.

FIG. 32 is a block diagram illustrating a system configuration example of a communication system 1000 according to a third embodiment of the present technology.

A communication system 1000 includes information processing devices 1010, 1020, and 1030. The communication system 1000 corresponds to the communication system 100 illustrated in FIG. 1. For example, the information processing device 1010 corresponds to the information processing device 300 which is a sink device, the information processing device 1020 corresponds to the information processing device 200 which is a source device, and the information processing device 1030 corresponds to the information processing device 400 which is a source device. Therefore, the description of the common portions to the communication system 100 will be partially omitted below.

In the third embodiment of the present technology, a case in which the display area of a main image is greater than that of a sub-image, as illustrated in FIG. 5, will be described as an example. In this case, since the main image has a larger resolution than the sub-image, it is desirable to perform high-quality video transmission of the main image and perform standard quality video transmission of the sub-image.

In the third embodiment of the present technology, an example in which an information processing device capable of performing a concurrent operation of simultaneously using a plurality of frequency channels among three kinds of frequency channels, 2.4 GHz, 5 GHz, and 60 GHz is used will be described.

For example, to perform high-quality video transmission of the main image, it is necessary to select a communication scheme capable of performing a fast data transmission rate. Accordingly, in the third embodiment of the present technology, an example in which wireless communication units (for example, wireless communication units 1011 and 1012 illustrated in FIG. 32) that conform to the IEEE802.11ad standard typified by 60 GHz are used will be described. On the other hand, when the standard quality video transmission of the sub-image is performed, a wireless communication unit of 2.4 GHz or 5 GHz (for example, a wireless communication unit 1013 illustrated in FIG. 32) is used.

Here, since fast transmission of maximum several Gbps can be performed in IEEE802.11ad used for the main image, 4K transmission can be performed without limit to HD as the resolution, and thus IEEE802.11ad is suitable for high quality video transmission. As described above, however, IEEE802.11ad adopts a technology for causing an antenna to have directivity and gaining a distance. Therefore, an environment in which a link may not be ensured as in blocking by a person is also assumed. Accordingly, in the third embodiment of the present technology, an example in which the multi-reception diversity is appropriately set in the environment (an example appropriately corresponding to a change in topology) will be described.

Specifically, the information processing device 1010 is assumed to include the three wireless communication units 1011 to 1013. As described above, the wireless communication units 1011 and 1012 are assumed to be wireless communication units that conform to the IEEE802.11ad standard typified by 60 GHz. The wireless communication unit 1013 is assumed to be a wireless communication unit of 2.4 GHz or 5 GHz.

In this way, in the third embodiment of the present technology, two wireless interfaces (the wireless communication units 1011 and 1012 of 60 GHz) of a sink device (the information processing device 1010) are assumed to be included. That is, the sink device (the information processing device 1010) includes a plurality of reception units (the wireless communication units 1011 and 1012 of 60 GHz) that perform reception using the multi-reception diversity. When the multi-reception diversity is used, the plurality of reception units (the wireless communication units 1011 and 1012 of 60 GHz) are used. Accordingly, for example, even when an obstacle is located between the information processing device 1010 and the wireless communication unit 1011 (indicated by a dotted line 1015) and link disconnection occurs, the link can be avoided between the information processing device 1010 and the wireless communication unit 1012 (indicated by a dotted line 1016). That is, it is possible to prevent the video transmission between the information processing devices 1010 and 1020 from being interrupted.

In this way, when the transmission from the information processing device 1020 to the information processing device 1010 is performed using the multi-reception diversity, the information processing device 1020 copies the same image data as the image data transmitted to the wireless communication unit 1011 and transmits packets to the wireless communication unit 1012.

The information processing device 1010 can interpolate the packets lost in the image data received by the wireless communication unit 1011 from the image data received by the wireless communication unit 1012. By interpolating the packets in this way, it is possible to cause the received data to be close to the image data transmitted by the information processing device 1020 as much as possible. The information processing device 1010 generates a main image based on the image data subjected to the interpolation process and causes a display unit to display the main image.

The information processing device 1030 can be connected to the wireless communication unit 1013 to transmit image data to the wireless communication unit 1013. In this case, the information processing device 1010 generates a sub-image based on the image data received by the wireless communication unit 1013 and displays the sub-image on the display unit.

In this way, for example, when the information processing device 1020 performs the high quality video transmission of the main image to the information processing device 1010, the connection between the information processing devices 1010 and 1020 can be set to 1 to 2 (indicated by the dotted lines 1015 and 1016). For example, when the information processing device 1030 performs the standard quality video transmission of the sub-image to the information processing device 1010, the connection between the information processing devices 1010 and 1030 can be set to 1 to 1 (indicated by a dotted line 1018).

[Interchange Example Between Layers of Information Processing Device (Source Device)]

FIGS. 33 to 36 are diagrams schematically illustrating an interchange example of data between layers of an information processing device 1020 according to the third embodiment of the present technology. FIGS. 33 to 36 illustrate an interchange example of data between memories 1101 to 1104 included in the information processing device 1020.

The application memory 1101 is assumed to be an application memory included in the information processing device 1020. The memories 1102 and 1103 are assumed to be memories included in two ports of the wireless communication unit 220 (illustrated in FIG. 2) of 60 GHz. The memory 1104 is assumed to be a memory included in a port of the wireless communication unit 220 of 2.4 GHz or 5 GHz.

[Example in which Source Device is Group Owner (GO) and Sink Device is Client]

Figure 33:
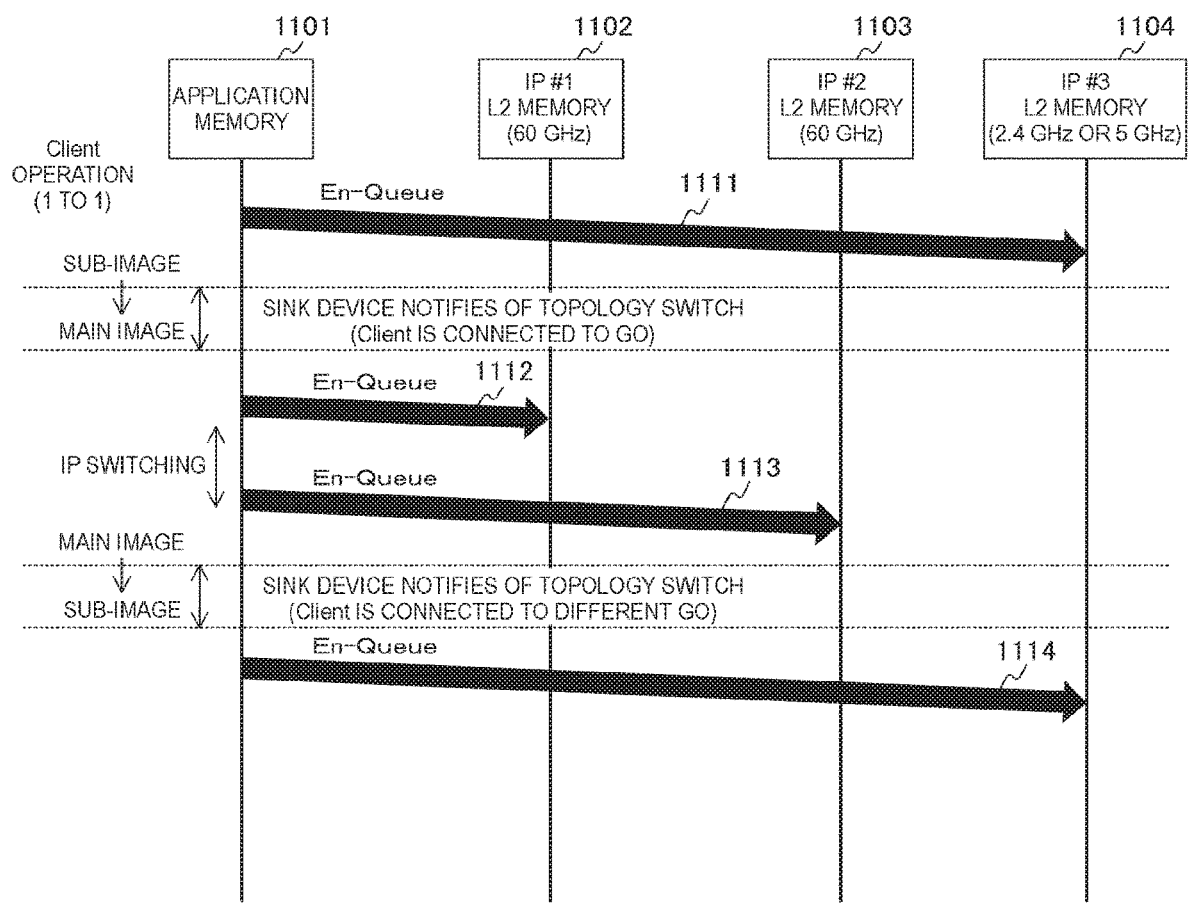
FIG. 33 is a diagram schematically illustrating an interchange example of data between layers of an information processing device 1020 according to the third embodiment of the present technology.
Figure 34:
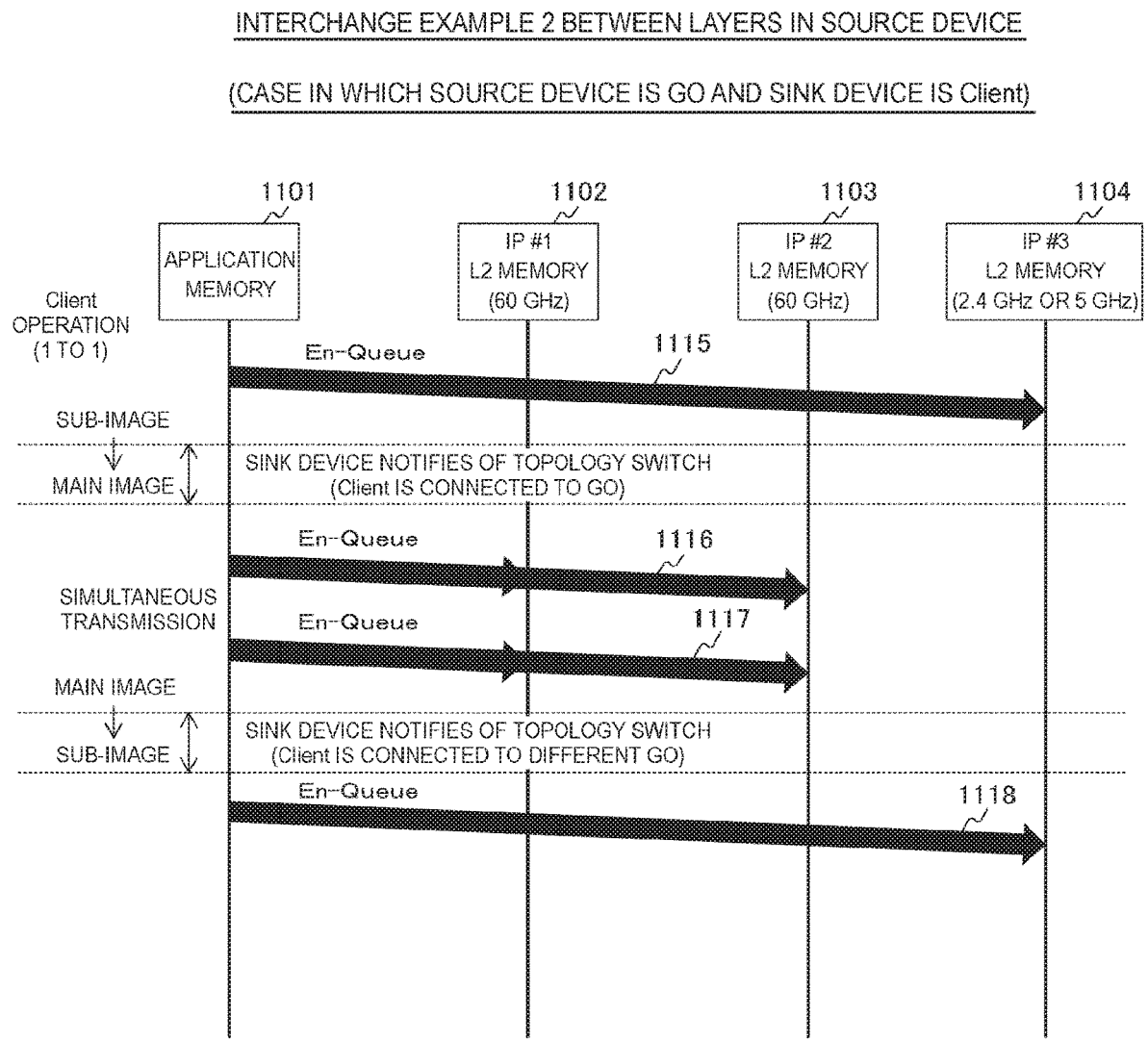
FIG. 34 is a diagram schematically illustrating an interchange example of data between layers of an information processing device 1020 according to the third embodiment of the present technology.

FIGS. 33 and 34 illustrate an example of a case in which the source device (the information processing device 1020) is a GO and the sink device (the information processing device 1010) is a client. FIGS. 33 and 34 illustrate an example in which topology is changed by changing a main image and a sub-image. Each example to be described below is established even when the GO is substituted with an AP and the client is substituted with a station. FIGS. 33 and 34 illustrate an example in which topology is changed by changing a main image and a sub-image.

In FIG. 33, a switch control method of transmitting packets to any one while switching the multi-reception diversity is used. In FIG. 34, a control method of copying the transmission packets, as described above, is used. First, the switch control method will be described.

[Example in which Link Switch Control is Performed in Connection State to Two Wireless Communication Units of 60 GHz]

First, an example in which the source device (the information processing device 1020) performs the link switch control in a connection state to two wireless communication units of 60 GHz of the sink device (the information processing device 1010) will be described with reference to FIG. 33.

First, the wireless communication unit 220 of 2.4 GHz or 5 GHz in the source device (the information processing device 1020) is assumed to transmit data (1111). That is, data transmission from the wireless communication unit 220 (2.4 GHz or 5 GHz) of the source device (the information processing device 1020) to the wireless communication unit 1013 (2.4 GHz or 5 GHz) of the sink device (the information processing device 1010) is assumed to be performed. For example, the data transmission is performed, as indicated by a dotted line 1017 of FIG. 32. In this case, when the sub-image displayed on the display unit 351 of the sink device (the information processing device 1010) is changed to the main image, a topology switch notification is transmitted from the sink device (the information processing device 1010) to the source device (the information processing device 1020).

In this way, when the sub-image is changed to the main image and the topology switch notification is transmitted from the sink device (the information processing device 1010), the wireless communication unit 220 of 60 GHz in the source device (the information processing device 1020) starts the data transmission. That is, the data transmission from the wireless communication unit 220 (60 GHz) of the source device (the information processing device 1020) to the wireless communication units 1011 and 1012 (60 GHz) of the sink device (the information processing device 1010) starts. In this case, the source device (the information processing device 1020) performs the data transmission while sequentially switching the links in the connection state to the two wireless communication units 1011 and 1012 (60 GHz) of the sink device (the information processing device 1010) (1112 and 1113). For example, the data transmission is performed while the dotted lines 1015 and 1016 of FIG. 32 are switched.

In this way, the source device (the information processing device 1020) can perform the switch control in the connection state to the two wireless communication units 1011 and 1012 (60 GHz) of the sink device (the information processing device 1010), and therefore can perform the link switch quickly.

A case in which the data transmission may not be in any of the two wireless communication units 1011 and 1012 (60 GHz) of the sink device (the information processing device 1010) (a case in which both of the wireless communication units are interrupted) is also assumed. In this case, fallback can be performed by IP transmission to the wireless communication unit 1013 (2.4 GHz or 5 GHz).

When the main image display on the display unit 351 of the sink device (the information processing device 1010) is changed to the sub-image, the topology switch notification is transmitted from the sink device (the information processing device 1010) to the source device (the information processing device 1020).

In this way, when the main image is changed to the sub-image and the topology switch notification is transmitted from the sink device (the information processing device 1010), the wireless communication unit 220 of 2.4 GHz or 5 GHz in the source device (the information processing device 1020) starts the data transmission. That is, the data transmission from the wireless communication unit 220 (2.4 GHz or 5 GHz) of the source device (the information processing device 1020) to the wireless communication unit 1013 (2.4 GHz or 5 GHz) of the sink device (the information processing device 1010) starts (1114). For example, the data transmission is performed, as indicated by a dotted line 1017 of FIG. 32.

[Example in which Simultaneous Transmission to Two Wireless Communication Units of 60 GHz is Performed]

Next, an example in which the source device (the information processing device 1020) performs simultaneous transmission to two wireless communication units of 60 GHz of the sink device (the information processing device 1010) will be described with reference to FIG. 34.

Since the process (1115: the topology switch notification) until the transmission of the topology switch notification from the sink device (the information processing device 1010) to the source device (the information processing device 1020) is the same as the example illustrated in FIG. 33, the description thereof will be omitted here.

In this way, when the sub-image is changed to the main image and the topology switch notification is transmitted from the sink device (the information processing device 1010), the wireless communication unit 220 of 60 GHz in the source device (the information processing device 1020) starts the data transmission. That is, the data transmission from the wireless communication unit 220 (60 GHz) of the source device (the information processing device 1020) to the wireless communication units 1011 and 1012 (60 GHz) of the sink device (the information processing device 1010) starts. In this case, the source device (the information processing device 1020) performs simultaneous transmission of the data to the two wireless communication units 1011 and 1012 (60 GHz) of the sink device (the information processing device 1010) (1116 and 1117). For example, as in the dotted lines 1015 and 1016 of FIG. 32, the data transmission is simultaneously performed.

In this way, the source device (the information processing device 1020) performs the simultaneous transmission of the data to the two wireless communication units 1011 and 1012 (60 GHz) of the sink device (the information processing device 1010), and therefore can perform the transmission process without consideration of transmission characteristics.

When the data transmission may not be performed in any of the two wireless communication units 1011 and 1012 (60 GHz) of the sink device (the information processing device 1010), as in the example illustrated in FIG. 33, fallback can be performed by IP transmission to the wireless communication unit 1013.

Since the case in which the main image display on the display unit 351 of the sink device (the information processing device 1010) is changed to the sub-image is the same as the example illustrated in FIG. 33, the description thereof will be omitted here. To determine that one or both of the links are disconnected, a function of confirming an accumulation remaining amount of a transmission buffer may be provided. A standby time of the transmission buffer may be controlled more automatically, the data may be deleted when a given time or more has passed, and disconnection or an unstable link may be determined based on the number of deletions.

[Example in which Sink Device is GO and Source Device is Client]

Figure 35:
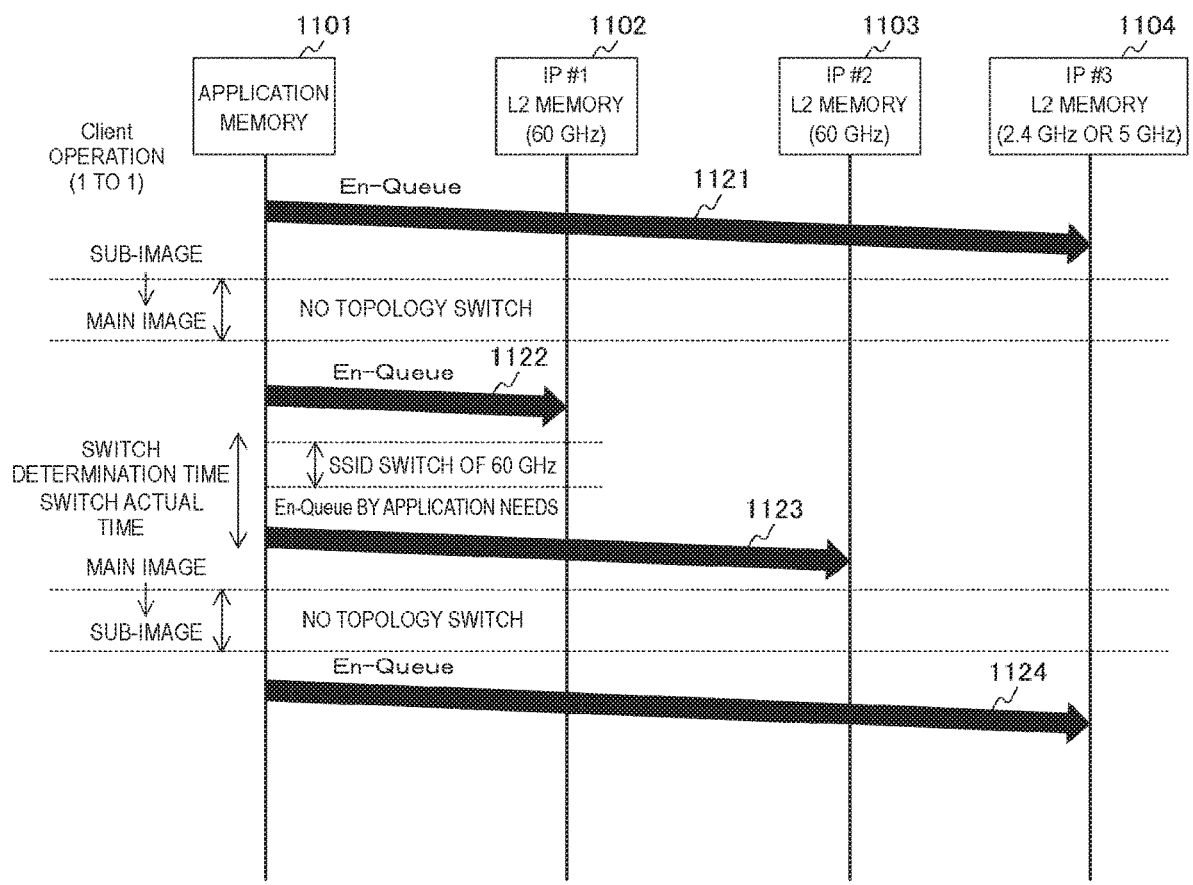
FIG. 35 is a diagram schematically illustrating an interchange example of data between layers of an information processing device 1020 according to the third embodiment of the present technology.
Figure 36:
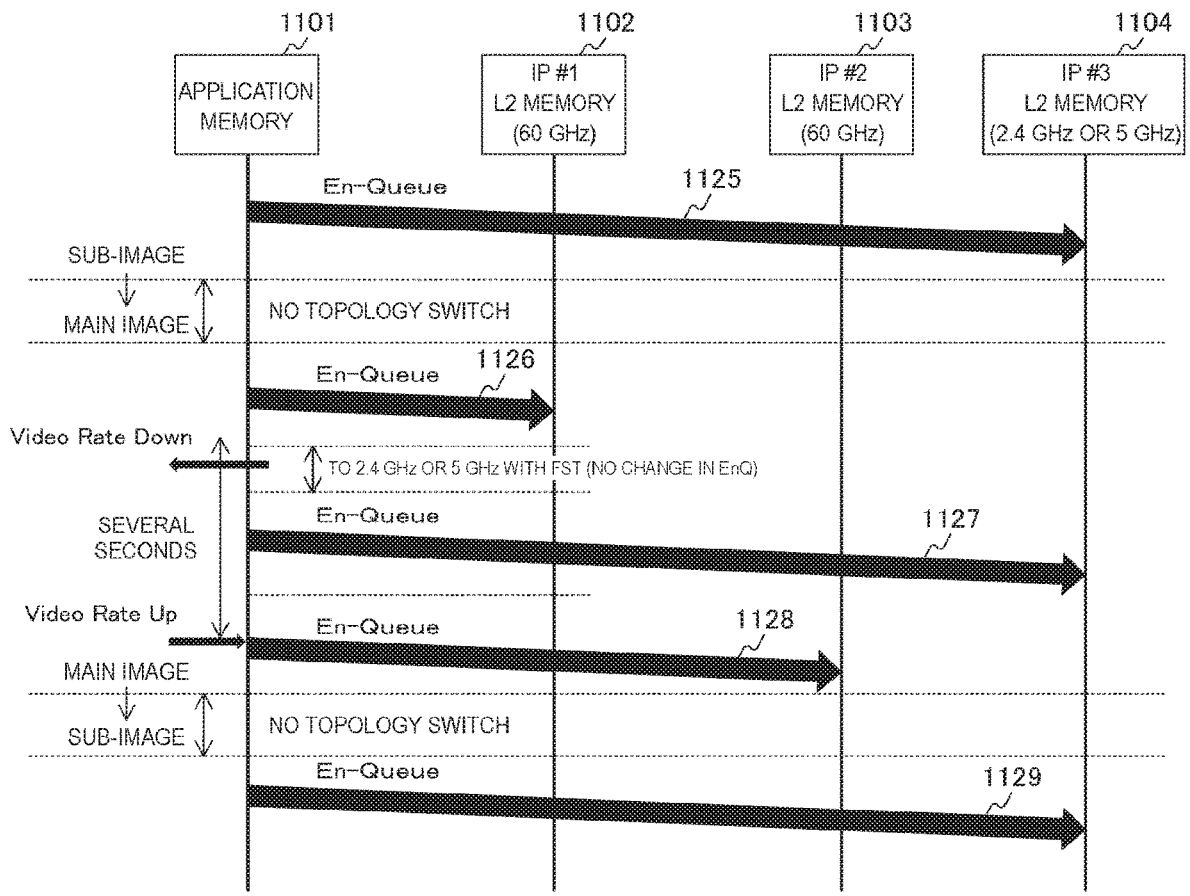
FIG. 36 is a diagram schematically illustrating an interchange example of data between layers of an information processing device 1020 according to the third embodiment of the present technology.

FIGS. 35 and 36 illustrate an example in which the sink device (the information processing device 1010) is a GO and the source device (the information processing device 1020) is a client. Here, when the sink device is the GO, the source device of the client may not be connected to two wireless communication units of the sink device. Accordingly, FIGS. 35 and 36 illustrate an example in which the link switch control is performed when the data transmission to the wireless communication units 1011 and 1012 of 60 GHz is performed.

First, an example in which the source device (the information processing device 1020) performs the data transmission to two wireless communication units of 60 GHz of the sink device (the information processing device 1010) will be described with reference to FIG. 35.

First, the wireless communication unit 220 of 2.4 GHz or 5 GHz in the source device (the information processing device 1020) is assumed to transmit data (1121). That is, the data transmission from the wireless communication unit 220 (2.4 GHz or 5 GHz) of the source device (the information processing device 1020) to the wireless communication unit 1013 (2.4 GHz or 5 GHz) of the sink device (the information processing device 1010) is assumed to be performed. For example, the data transmission is performed, as indicated by a dotted line 1017 of FIG. 32. In this case, the sub-image displayed on the display unit 351 of the sink device (the information processing device 1010) is assumed to be changed to the main image.

In this way, when the sub-image is changed to the main image, the wireless communication unit 220 of 60 GHz in the source device (the information processing device 1020) starts data transmission (1122 and 1123). That is, the data transmission from the wireless communication unit 220 (60 GHz) of the source device (the information processing device 1020) to the wireless communication units 1011 and 1012 (60 GHz) of the sink device (the information processing device 1010) starts (1122 and 1123). In this case, the source device (the information processing device 1020) performs the data transmission while sequentially performing switching by a service set identifier (SSID) of 60 GHz between the two wireless communication units 1011 and 1012 of the sink device (the information processing device 1010) (1122 and 1123). For example, the data is transmitted while the dotted lines 1015 and 1016 of FIG. 32 are switched.

In this way, in the example illustrated in FIG. 35, all of the sink devices of 2.4 GHz or 5 GHz, or 60 GHz are the GO, and therefore it is possible to reduce state transition when the sub-image is changed to the main image. By not changing the use frequency and not performing scanning after the switch to the main image, the switch time of the GO can be shortened.

A case in which the main image displayed on the display unit 351 of the sink device (the information processing device 1010) is changed to the sub-image will be assumed. In this way, when the main image is changed to the sub-image, the wireless communication unit 220 of 2.4 GHz or 5 GHz in the source device (the information processing device 1020) starts the data transmission (1124). That is, the data transmission from the wireless communication unit 220 (2.4 GHz or 5 GHz) of the source device (the information processing device 1020) to the wireless communication unit 1013 (2.4 GHz or 5 GHz) of the sink device (the information processing device 1010) starts (1124). For example, the data transmission is performed, as indicated by a dotted line 1017 of FIG. 32.

Next, an example in which the source device (the information processing device 1020) performs the data transmission to two wireless communication units of 60 GHz of the sink device (the information processing device 1010) will be described with reference to FIG. 36.

Since the process (1125) up to the change from the sub-image to the main image is the same as that of the example illustrated in FIG. 35, the description thereof will be omitted here.

In this way, when the sub-image is changed to the main image, the wireless communication unit 220 of 60 GHz in the source device (the information processing device 1020) starts the data transmission (1126 and 1128). That is, the data transmission from the wireless communication unit 220 (60 GHz) of the source device (the information processing device 1020) to the wireless communication units 1011 and 1012 (60 GHz) of the sink device (the information processing device 1010) starts (1126 and 1128). Here, in the example illustrated in FIG. 36, transparent connection at 2.4 GHz or 5 GHz and 60 GHz is assumed to be performed. In this case, during the switching of the link of 60 GHz, fallback at 2.4 GHz or 5 GHz is performed (1127). In this way, by performing fallback to 2.4 GHz or 5 GHz during the switching of the link of 60 GHz, the image can be displayed on the display unit 351 of the sink device (the information processing device 1010) without stop even when a switch time of the GO is lengthened.

In the example illustrated in FIG. 36, all of the sink devices of 2.4 GHz or 5 GHz, or 60 GHz are the GO as in the example illustrated in FIG. 35, and therefore it is possible to reduce state transition when the sub-image is changed to the main image.

Since the case in which the main image displayed on the display unit 351 of the sink device (the information processing device 1010) is changed to the sub-image is the same as the example illustrated in FIG. 35, the description thereof will be omitted here.

In this way, in the examples illustrated in FIGS. 33 to 36, the cases in which the source and sink devices are the GO and the client have been described as the examples. However, even when the source and sink devices are a PCP and a station (STA), the examples illustrated in FIGS. 33 to 36 can be applied. Simultaneous transmission from the application memory 1101 to the memories 1103 and 1104 may be performed. For example, as described with reference to FIG. 20, when there are two links, the link from the application memory 1101 to the memory 1103 and the link from the application memory 1101 to the memory 1104, the transmission rates are different. Therefore, as illustrated in FIG. 19, the simultaneous transmission may be performed by distributing the enhanced layer to the application memory 1101 to the memory 1103 and distributing the base layer from the application memory 1101 to the memory 1104. When the simultaneous transmission is performed, a video compression process may be performed after copying, a video with a low compression ratio may be transmitted from the application memory 1101 to the memory 1103, and a video with a high compression ratio may be transmitted from the application memory 1101 to the memory 1104.

[Operation Example of Information Processing Device (Source Device)]

Figure 37:
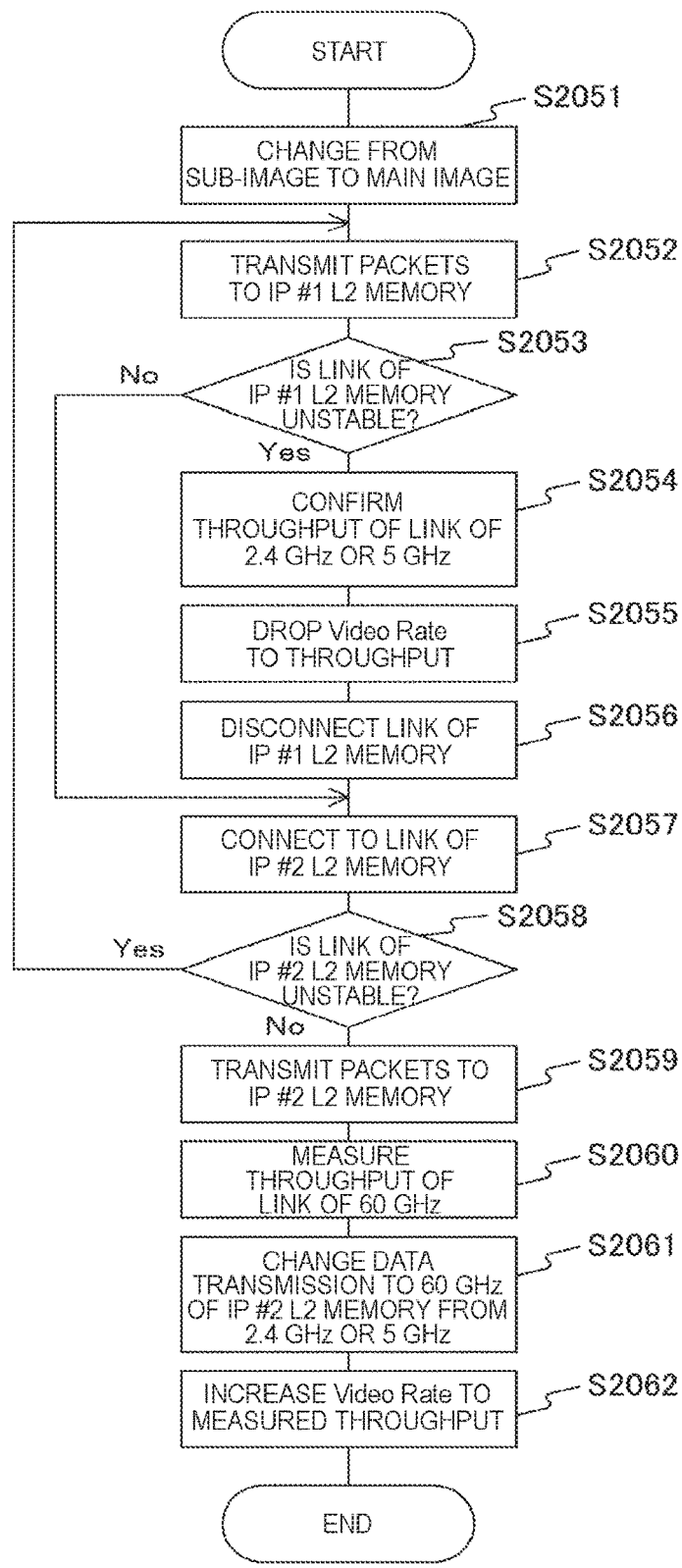
FIG. 37 is a flowchart illustrating an example of a processing procedure of a data transmission process performed by the information processing device 1020 according to the third embodiment of the present technology.

FIG. 37 is a flowchart illustrating an example of a processing procedure of a data transmission process performed by the information processing device 1020 according to the third embodiment of the present technology. In the processing procedure, an example of the data transmission process corresponding to FIG. 36 will be described.

First, an image displayed in the information processing device 1010 (the source device) is assumed to be changed from the sub-image to the main image (step S2051). In this case, an operation starts with the link of 60 GHz and the packets are transmitted to the IP #1 L2 memory 1102 (step S2052). Subsequently, it is determined whether the link of 60 GHz of the IP #1 L2 memory 1102 is unstable (step S2053). When the link is stable, the process proceeds to step S2057.

When the link of 60 GHz of the IP #1 L2 memory 1102 is unstable (step S2053), the throughput of the link of 2.4 GHz or 5 GHz is confirmed (step S2054). Subsequently, a video rate is dropped to this throughput (step S2055). Subsequently, the link of the IP #1 L2 memory 1102 is disconnected (step S2056).

Subsequently, connection to the link of the IP #2 L2 memory 1103 is made (step S2057). Subsequently, it is determined whether the link of 60 GHz of the IP #2 L2 memory 1103 is unstable (step S2058). When the link is unstable, the process returns to step S2052. That is, the connection is made again and a trial is continuously performed until any link of 60 GHz is stable.

When the link of 60 GHz of the IP #2 L2 memory 1103 is stable (step S2058), the packets are transmitted to the IP #2 L2 memory 1103 (step S2059). Subsequently, the throughput of the link of 60 GHz is measured (step S2060). Subsequently, the data transmission is changed to the link of 60 GHz of the IP #2 L2 memory 1103 from 2.4 GHz or 5 GHz (step S2061). Subsequently, the video rate is increased to the throughput obtained by the measurement (step S2062).

[Operation Example of Information Processing Device (Source Device)]

Next, an operation example of the information processing device will be described. Here, an example of a case in which the sink device (the information processing device 1010) is a GO and the source device (the information processing device 1020) is a client will be described.

Here, the two following kinds ((a) and (b)) of operation examples will be described as operation examples of a data transmission process performed between the two wireless communication units 1011 and 1012 that conform to the IEEE802.11ad standard typified by 60 GHz:

(a) an operation example of a case in which a Media Access Control (MAC) address different for each link is set: the MAC address is an example of identification example for identifying a device that performs communication using wireless communication; and (b) an operation example of a case in which a MAC layer management entity (MLME) is single and only one MAC address is visible irrespective of the number of links.

First, (a) the operation example of the case in which the MAC address different for each link is set will be described with reference to FIG. 38. The setting of the content protection (Link Content Protection Setup) in this case will be described in detail with reference to FIGS. 41 to 44.

Figure 38:
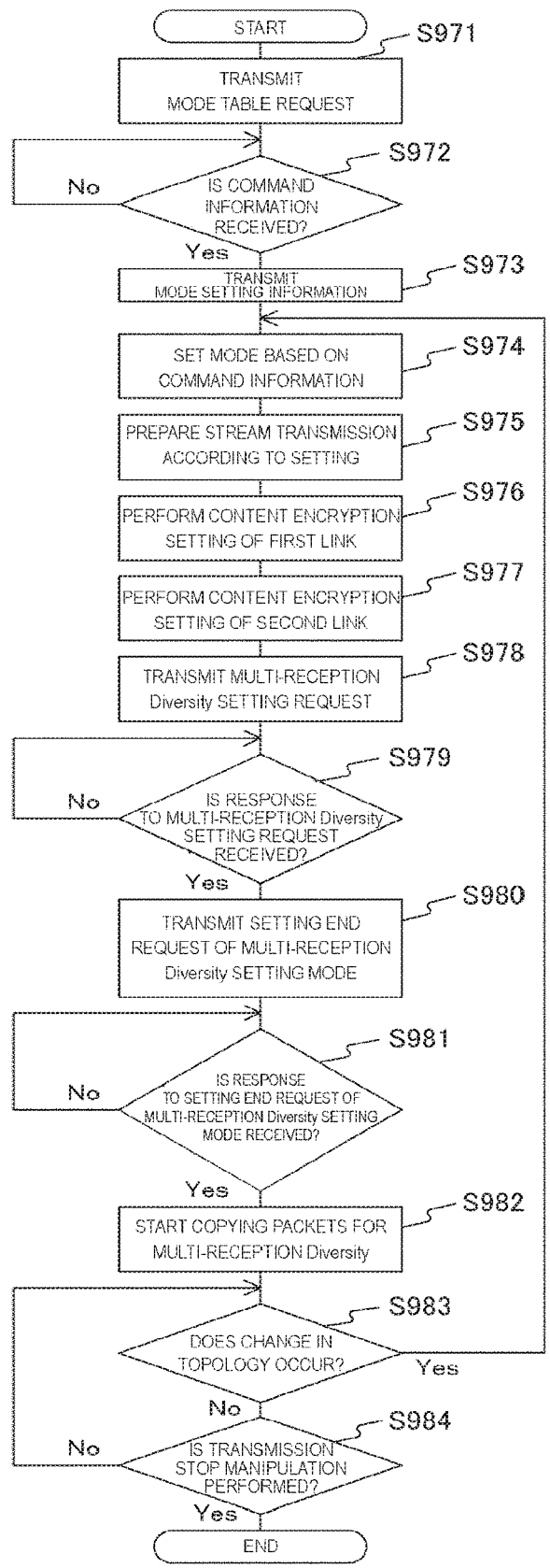
FIG. 38 is a flowchart illustrating an example of a processing procedure of a data transmission process performed by the information processing device 1020 according to the third embodiment of the present technology.

FIG. 38 is a flowchart illustrating an example of a processing procedure of a data transmission process performed by the information processing device 1020 according to the third embodiment of the present technology. The processing procedure illustrated in FIG. 38 is a modification example of the processing procedure illustrated in FIG. 12. Therefore, the description of the common processing procedure to the processing procedure illustrated in FIG. 12 will be omitted partially. In the processing procedure illustrated in FIG. 38, an example of the data transmission process performed between the two wireless communication units 1011 and 1012 that conform to the IEEE802.11ad standard typified by 60 GHz will be described as described above.

The first processes (steps S971 to S975) correspond to the processes (steps S901 to S905) illustrated in FIG. 12. Here, the information processing device 1020 performs the data transmission process with the two wireless communication units 1011 and 1012. Therefore, the information processing device 1020 performs the processes (steps S971 to S975) with one wireless communication unit (for example, the wireless communication unit 1011), and subsequently performs the processes (steps S971 to S975) with the other wireless communication unit (for example, the wireless communication unit 1012).

In step S975, a process of completing video and audio transmission setting between the source device (the information processing device 1020) and the two wireless communication units 1011 and 1012 of the sink device (the information processing device 1010) instead of the stream transmission is performed. That is, step S975 means a state in which the stream transmission can be prepared.

Here, when the source device transmits source information necessary for the content protection, the source device requests WFD content_protection as M3 (RTSP request). When the source device receives information which can correspond to the request with RTSP response, the source device performs encryption of high-bandwidth digital content protection system (HDCP) 2.2.

When the stream transmission can be prepared (step S975), the information processing device 1020 performs key generation and key exchange related to the content encryption with the wireless communication unit 1011 of the information processing device 1010 (step S976). In this way, by performing the key generation and the key exchange related to the content encryption between the source device (the information processing device 1020) and one wireless communication unit (the wireless communication unit 1011) of the sink device, it is possible to improve the secrecy ability of the wireless link.

Subsequently, the information processing device 1020 performs the key generation and the key exchange related to the content encryption with the wireless communication unit 1012 of the information processing device 1010 (step S977). In this way, by performing the key generation and the key exchange related to the content encryption between the source device (the information processing device 1020) and the other wireless communication unit (the wireless communication unit 1012) of the sink device, it is possible to improve the secrecy ability of the wireless link.

In this way, in the example illustrated in FIG. 32, there is a possibility of the round trip time (RTT) of each link being different, the content encryption is performed for each link. As a scheme of performing the content encryption, HDCP, digital transmission content protection (DTCP)-IP, or the like can be used.

Subsequently, the information processing device 1020 performs a multi-reception diversity setting request to the two wireless communication units 1011 and 1012 of the information processing device 1010 (step S978). That is, the source device transmits the multi-reception diversity setting request to the two wireless communication units of the sink device (step S978).

Subsequently, the information processing device 1020 determines whether to receive a response to the multi-reception diversity setting request from the information processing device 1010 (step S979). When the response to the multi-reception diversity request is not received, the monitoring is continuously performed.

When the information processing device 1020 receives the response to the multi-reception diversity setting request from the information processing device 1010 (step S979), the information processing device 1020 prepares the multi-reception diversity setting. After the preparation is completed, the information processing device 1020 transmits a setting end request of a multi-reception diversity setting mode to the two wireless communication units 1011 and 1012 of the information processing device 1010 (step S980).

Subsequently, the information processing device 1020 determines whether to receive a response to the setting end request of the multi-reception diversity setting mode from the information processing device 1010 (step S981). When the response to the setting end request of the multi-reception diversity setting mode is not received, the monitoring is continuously performed.

When the response to the setting end request of the multi-reception diversity setting mode is received from the sink device (step S981), it can be determined that the multi-reception diversity setting ends between the source and sink devices. Therefore, the information processing device 1020 copies the image data and the audio data for the multi-reception diversity and starts transmitting the packets (step S982). That is, the information processing device 1020 transmits the packets of the same data (the image data and the audio data) to the wireless communication units 1011 and 1012 of the information processing device 1010 (step S982).

Here, a case in which a change in the topology occurs during the data transmission process (for example, a case in which the source device of a middle channel is changed) is assumed. In this way, when the change in the topology occurs (step S983), a change in the frequency channel between the source and sink devices and a change in a multi-reception diversity setting topology occur, and thus the process returns to step S974 (re-negotiation process). Conversely, when the change in the topology does not occur (step S983), the information processing device 1020 determines whether a transmission stop manipulation is performed (step S984). When the transmission stop manipulation is performed (step S984), the operation of the data transmission process ends. Conversely, when the transmission stop manipulation is not performed (step S984), the process returns to step S983.

Next, (b) the operation example of the case in which a MAC layer management entity (MLME) is single and only one MAC address is visible irrespective of the number of links will be described with reference to FIG. 39.

Figure 39:
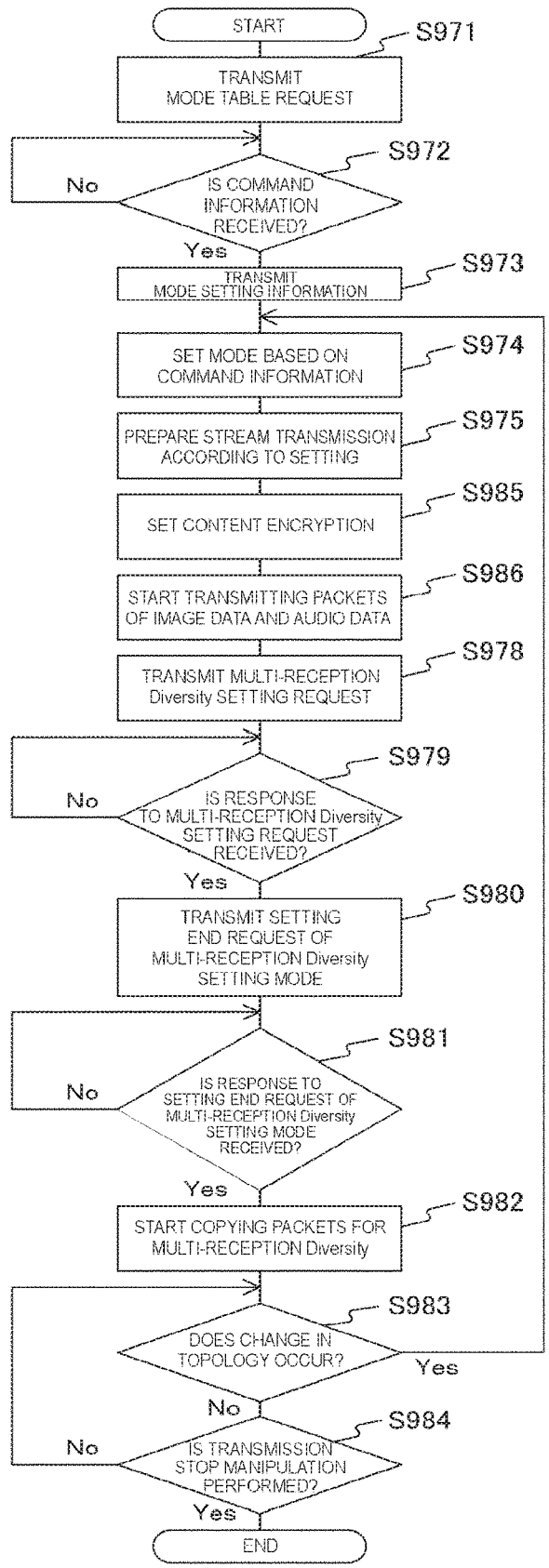
FIG. 39 is a flowchart illustrating an example of a processing procedure of a data transmission process performed by the information processing device 1020 according to the third embodiment of the present technology.

FIG. 39 is a flowchart illustrating an example of a processing procedure of the data transmission process performed by the information processing device 1020 according to the third embodiment of the present technology. The processing procedure illustrated in FIG. 39 is a modification example of the processing procedure illustrated in FIG. 38. Therefore, the same reference numerals are given to the common processing procedure to the processing procedure illustrated in FIG. 38, and the description thereof will be omitted partially.

When the stream transmission can be prepared (step S975), the information processing device 1020 performs the key generation and the key exchange through content encryption corresponding to one MAC address with the information processing device 1010 (step S985). Accordingly, it is possible to improve the secrecy ability of the wireless link.

Subsequently, the information processing device 1020 starts transmitting the packets of the image data and the audio data (step S986). For subsequent processes (steps S978 to S982), the same processes as the processes (steps S978 to S982) illustrated in FIG. 38 are performed as processes of a lower layer than the MLME.

[Operation Example of Information Processing Device (Sink Device)]

Next, an operation example of the reception side sink device (the information processing device 1010) will be described.

Figure 40:
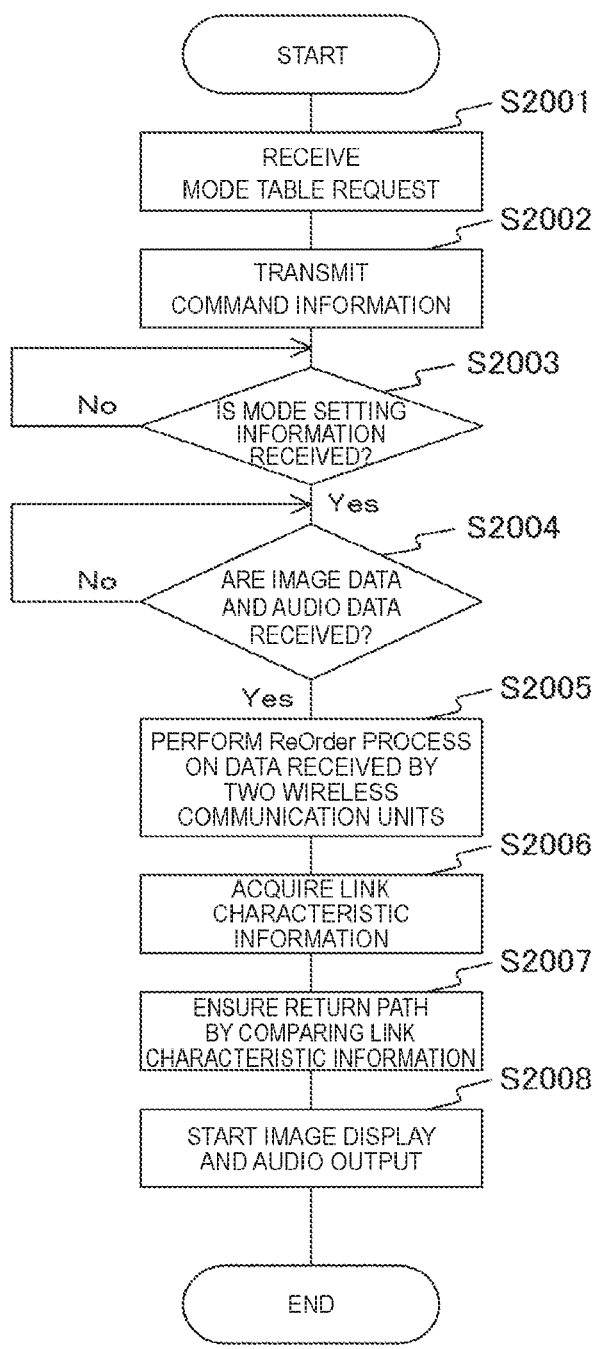
FIG. 40 is a flowchart illustrating an example of a processing procedure of a data reception process performed by an information processing device 1010 according to the third embodiment of the present technology.

FIG. 40 is a flowchart illustrating an example of a processing procedure of a data reception process performed by an information processing device 1010 according to the third embodiment of the present technology. In the processing procedure illustrated in FIG. 40, an example of the data reception process using the two wireless communication units 1011 and 1012 that conform to the IEEE802.11ad standard typified by 60 GHz will be described as described above.

First, when a mode table request is received (step S2001), the information processing device 1010 transmits the command information to the source device transmitting the mode table request (step S2002). For example, the command information is transmitted to the information processing device 1020.

Subsequently, the information processing device 1010 determines whether to receive the mode setting information from the source device transmitting the command information (step S2003). When the mode setting information is not received, the monitoring is continuously performed.

When the information processing device 1010 receives the mode setting information from the source device (step S2003), the information processing device 1010 ends the setting related to the transmission of the image data and the audio data with the source device. Here, as described above, the information processing device 1010 performs the data reception process using the two wireless communication units 1011 and 1012. Therefore, the information processing device 1010 performs the processes (steps S2001 to S2003) in one wireless communication unit (for example, the wireless communication unit 1011), and subsequently performs the processes in the other wireless communication unit (for example, the wireless communication unit 1012).

In this way, when the connection setting is performed in the two wireless communication units 1011 and 1012 through the processes (steps S2001 to S2003), topology in which two GOs (the two wireless communication units 1011 and 1012) are connected is constructed. Since a function in which one station is connected to two APs is present in the current state, the same function is assumed to be realized between the GO and the client. In this way, after the construction of the topology, the information processing device 1010 receives the image data and the audio data using the two wireless communication units 1011 and 1012 (step S2004).

Here, when the information processing device 1010 performs the communication using the multi-reception diversity with the source device, the key generation and the key exchange related to the content encryption, interchange of the information regarding the multi-reception diversity setting, and the like are performed with the source device. For example, the processes corresponding to steps S976 to S981 illustrated in FIG. 38 are performed. However, the processes are not illustrated in FIG. 40 and the description thereof will be omitted.

When the information processing device 1010 receives the image data and the audio data (step S2004), the information processing device 1010 performs an interpolation process on the received image data and audio data (step S2005). For example, the information processing device 1010 performs the interpolation process on the image data and the audio data which may not be received by one wireless communication unit (for example, the wireless communication unit 1011), using the data received by the other wireless communication unit (for example, the wireless communication unit 1012). A rearranging process (Re-Order Duplicate packet deletion) may be performed along with the interpolation process. For example, a common reception buffer is included in the two wireless communication units 1011 and 1012 so that the rearranging process can be performed.

Subsequently, the information processing device 1010 acquires link characteristic information based on the received data (step S2006). Here, the link characteristic information is, for example, each piece of information stored in the radio wave propagation measurement information 393 illustrated in FIG. 4. The link characteristic information is, for example, the PER, the BER, the number of retransmissions of packets, the throughput, frame drop, the SIR, the RSSI, or the SINR (for example, used instead of the SIR). In this way, by comprehending the link characteristic information, the information processing device 1010 can determine which path is stable between the two wireless communication units 1011 and 1012 when the information processing device 1010 responds to a message to the source device.

The information processing device 1010 may transmit the acquired link characteristic information to the source device (step S2007). That is, the information processing device 1010 may ensure a return path by comparing the acquired link characteristic information (step S2007).

Subsequently, the information processing device 1010 starts image display and audio output based on the received image data and audio data (step S2008).

In this way, the control unit (corresponding to the control unit 370 illustrated in FIG. 3) of the information processing device 1010 performs the control such that the multi-reception diversity of the stream related to the source device is set based on the capability information regarding the source device, the radio wave propagation measurement information regarding the communication with the source device, and the use of the information processing device 1010. Here, when the source device (for example, the information processing device 1020) transmits the stream using the multi-reception diversity, the other links are preferably not affected despite the fact that one or more unstable links are present among the plurality of links. Accordingly, the control unit (for example, the control unit (corresponding to the control unit 240 illustrated in FIG. 2) of the information processing device 1020) of the source device performs buffering management of the stream to be transmitted. The control unit of the source device may cause a standby time of a buffer to be automatically constant (Time To Live function) and delete the stream data from a transmission buffer for an unstable link after the constant time. The control unit of the source device may actively delete the unstable link transmission buffer from the buffer at a timing at which it can be confirmed that the link becomes unstable based on the number of retransmissions or the like. Accordingly, it is possible to operate the multi-reception diversity of the stream without affecting the unstable link.

When the source device transmits the stream using the multi-reception diversity, the control unit of the information processing device 1010 performs control such that either of a first operation of simultaneously transmitting the stream to the plurality of reception units and a second operation of sequentially transmitting the stream to each reception unit while switching the plurality of reception units is performed. When the source device transmits the streams using the multi-reception diversity, the control unit of the information processing device 1010 performs control such that either of the first operation of setting identification information (for example, a MAC address) in each of a plurality of links related to the plurality of reception units and the second operation of setting the identification information in only one piece of identification information irrespective of the number of links is performed. The control unit of the information processing device 1010 performs control such that different content protection is set between the first and second operations.

The control unit (corresponding to the control unit 240 illustrated in FIG. 2) of the information processing device 1020 performs control such that the multi-reception diversity of the streams related to the sink device is set based on control performed from the sink device based on the capability information regarding the information processing device 1020, the radio wave propagation measurement information regarding the communication with the sink device, and the use of the sink device.

In the third embodiment of the present technology, the example in which the multi-reception diversity is used when the display area of the main image is greater than that of the sub-image has been described. However, in other cases (cases other than the magnitude of the display area), the multi-reception diversity may be used. For example, when a display image designated by a user is displayed as a high-quality image, the multi-reception diversity can be used.

In the third embodiment of the present technology, the example in which the data transmission scheme of 60 GHz is used when the multi-reception diversity is used has been described, but other data transmission schemes may be used. For example, since a fast data transmission scheme typified by IEEE802.11ac is also present at 5 GHz, the fast data transmission scheme may be used. A wireless scheme other than Wi-Fi may be used.

In FIG. 38, the example in which the content encryption is separately performed for each link in the processes of steps S976 and S977 has been described, but the link is not limited to 60 GHz. For example, the third embodiment of the present technology can also be applied to a case in which 60 GHz is set for the source device and one wireless communication unit of the sink device and 2.4 GHz or 5 GHz is set for the source device and the other wireless communication unit of the sink device.

In the third embodiment of the present technology, the example in which two kinds of operations of (a) and (b) are defined as the processing methods for the two wireless communication units 1011 and 1012 and the same packets are generated and transmitted for each link in both of (a) and (b) has been described. However, an embodiment of the present technology is not limited to the generation of the packets, but any one link with good characteristics is selected without using the plurality of links and the image data and the audio data may be transmitted using the link. For example, the sink device responds to the source device with characteristic information such as the PER at the time of reception of the packets and the source device can select the link with good characteristics and transmit the packets. In this way, when the source device selects the link with good characteristics and transmit the packets, it is possible to reduce power consumption in either of the source device and the sink device.

[Example of HDCP in Multi-Reception Diversity]

In the third embodiment of the present technology, as described above, it is possible to set an environment in which two links are connectable by using the multi-reception diversity. Accordingly, an example of a case in which HDCP is used in an environment in which two links are connectable will be described below.

[Operation Example of Information Processing Device (Source Device)]

Figure 41:
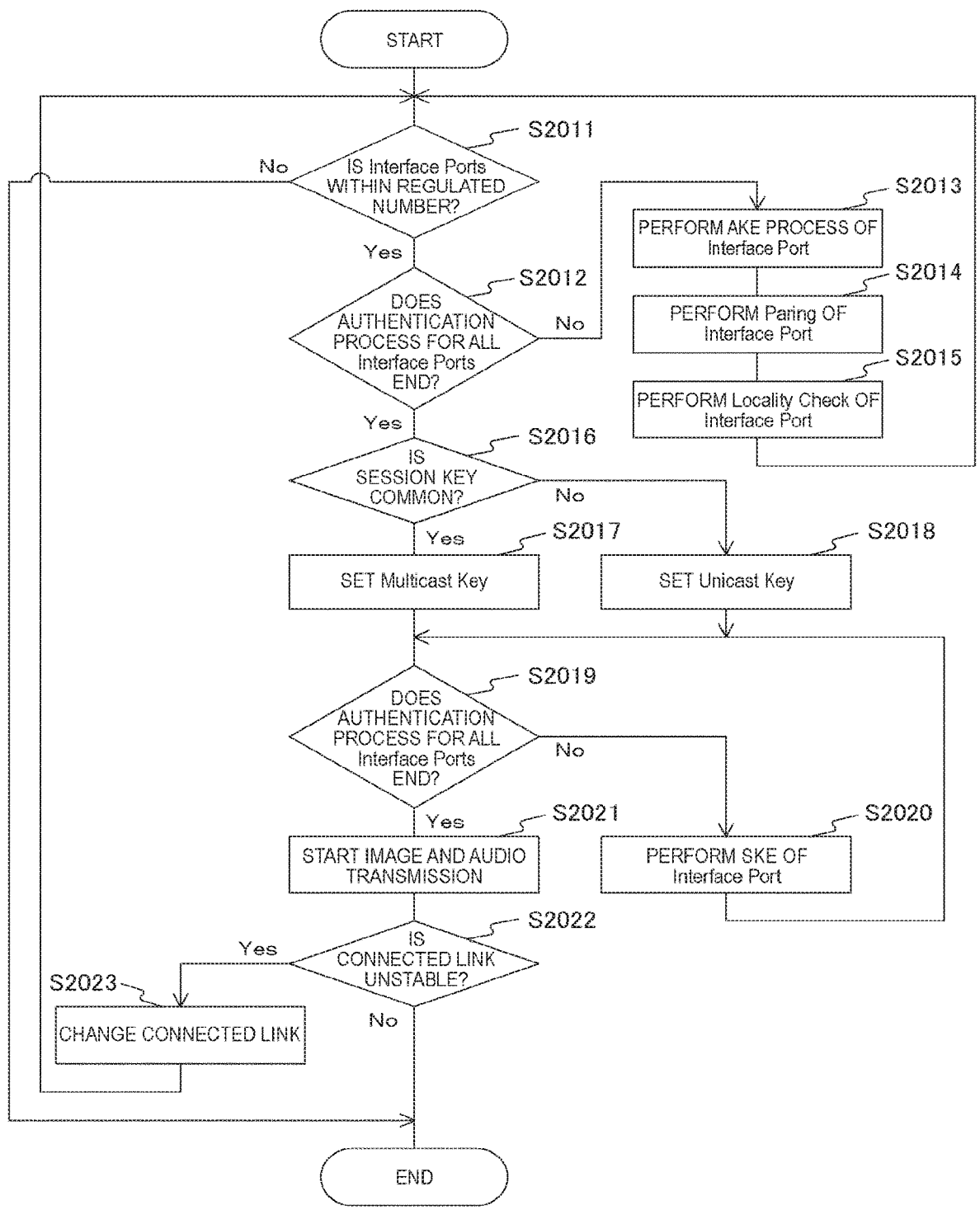
FIG. 41 is a flowchart illustrating an example of a processing procedure of an HDCP process performed by the information processing device 1020 according to the third embodiment of the present technology.

FIG. 41 is a flowchart illustrating an example of a processing procedure of an HDCP process performed by the information processing device 1020 according to the third embodiment of the present technology. In the processing procedure, an example of the HDCP process corresponding to FIG. 38 will be described.

First, an authentication protocol is independently performed for each HDCP-protected interface port (steps S2011 to S2015). Specifically, it is determined whether interface ports to be used from now are within a regulated number (step S2011). That is, it is determined whether the number of hops (the number of transmissions) is within the regulated number (step S2011).

When the interface ports are within the regulated number (step S2011), it is determined whether an authentication process for all of the interface ports ends (step S2012). For example, when processes (steps S2013 to S2015) ends for each interface port, 1 is added to the number of ports and it is determined whether the interface ports are within the regulated number.

Conversely, when the authentication process does not end for all of the interface ports (step S2012), an authentication and key exchange (AKE) process of the interface port is performed (step S2013). The AKE will be described in detail with reference to FIG. 43. Subsequently, paring of the interface port is performed (step S2014). The paring will be described in detail with reference to FIG. 43. Subsequently, locality check of the interface port is performed (step S2015). The locality check will be described in detail with reference to FIG. 44.

When the authentication process ends for all of the interface ports (step S2012), it is determined whether a session key can be commonized (step S2016). That is, it is determined whether the session key is reproduced for each interface port (step S2016). For example, this determination is performed based on incidental information (meta information) associated with content which is a transmission target.

When the session key can be commonized (step S2016), a multicast key is set (step S2017). Accordingly, the multicast key is interchanged between the source and sink devices. For example, when there is no problem with the multicast key and the original content is not copied and the multi-reception diversity is performed, a circumstance is assumed to be good.

Conversely, when the session key may not be commonized (step S2016), a unicast key is set (step S2018). That is, when the multicast key is not permitted (step S2016), the unicast key is separately generated (step S2018). Accordingly, the unicast key is interchanged between the source and sink devices.

Subsequently, it is determined whether an authentication process (an authentication process of an HDCP-protected interface port) for all of the interface ports ends (step S2019). When the authentication process does not end for all of the interface ports (step S2019), session key exchange (SKE) of the interface port is performed (step S2020). The SKE will be described in detail with reference to FIG. 44.

Conversely, when the authentication process ends for all of the interface ports (step S2019), image and audio transmission starts (step S2021).

Subsequently, it is determined whether the currently connected link is unstable (step S2022). When the currently connected link is unstable (step S2022), the link is changed to a different link (step S2023). Conversely, when the currently connected link is not unstable (step S2022), the operation of the HDCP process ends.

[Operation Example of Information Processing Device (Source Device)]

Next, an example in which a content protection scheme (version) is commonized for each link in an environment in which two links are connectable will be described.

Figure 42:
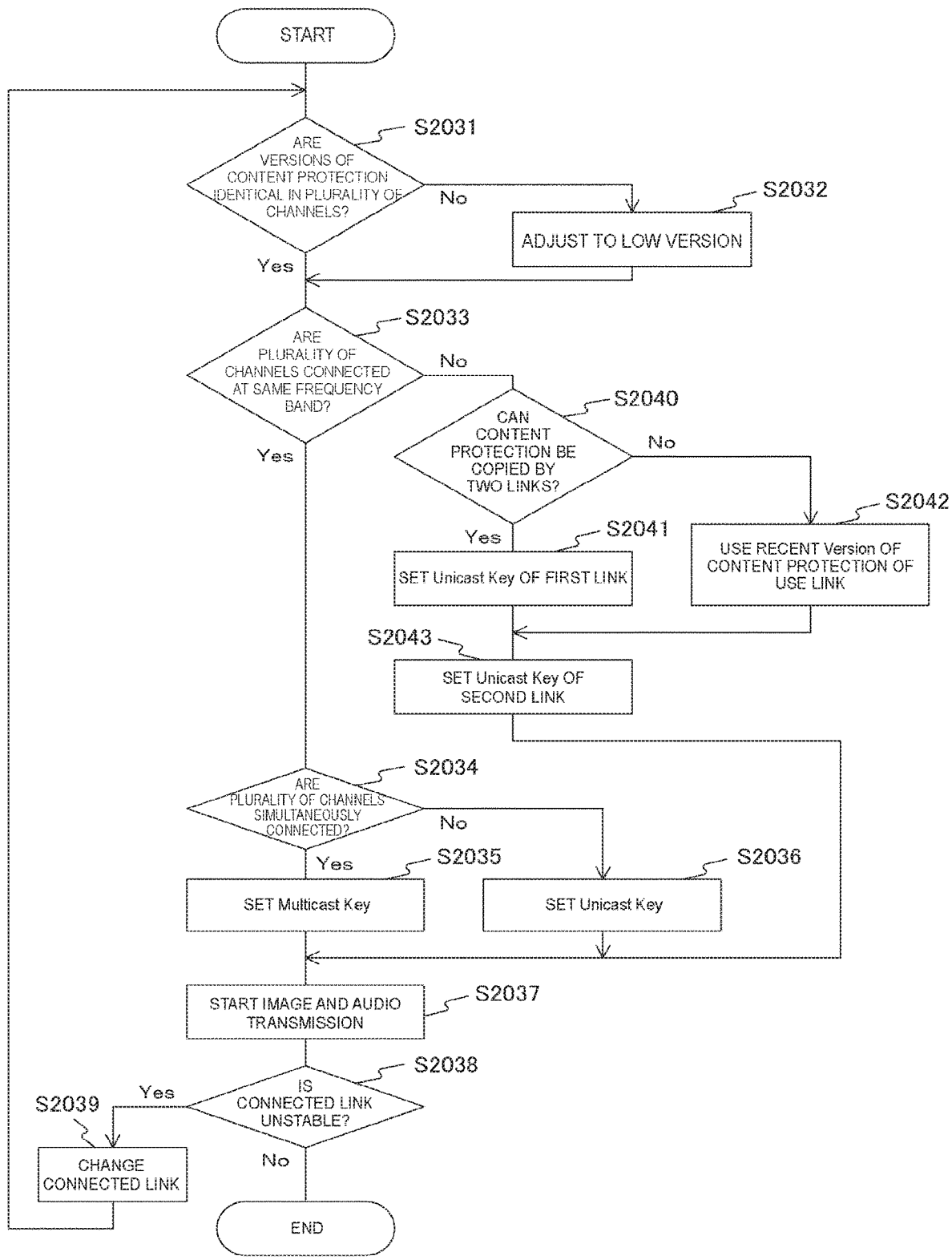
FIG. 42 is a flowchart illustrating an example of a processing procedure of an HDCP process performed by the information processing device 1020 according to the third embodiment of the present technology.

FIG. 42 is a flowchart illustrating an example of a processing procedure of an HDCP process performed by the information processing device 1020 according to the third embodiment of the present technology. In the processing procedure, an example of the HDCP process corresponding to FIG. 39 will be described. That is, an example of the process related to the content protection at the same frequency band in the multi-reception diversity will be described.

First, it is determined whether HDCP versions of two links are identical (step S2031). When the versions are identical (step S2031), encryption is performed with the versions. Conversely, when the versions are not identical (step S2031), the encryption is performed with the low version. Therefore, the versions are adjusted to the low version between the HDCP versions of the two links (step S2032).

Subsequently, it is determined whether the frequencies of the two links are the same frequency (step S2033). For example, it is determined whether the frequency bands such as 2.4 GHz, 5 GHz, and 60 GHz bands are the same, and different channels with the same frequency band are adjusted in this process.

When the frequencies of the two links are the same frequency (step S2033), it is determined whether the plurality of channels are simultaneously connected (step S2034). When the plurality of channels are simultaneously connected (step S2034), the multicast key is set (step S2035). Accordingly, the multicast key is interchanged between the source and sink devices. Conversely, when the plurality of channels are not simultaneously connected (step S2034), the unicast key is set (step S2036). Accordingly, the unicast is interchanged between the source and sink devices.

In this way, since the interchange of the content protection with the two links ends and the links are encrypted, the image and audio transmission starts (step S2037).

Subsequently, it is determined whether the currently connected link is unstable (step S2038). When the currently connected link is unstable (step S2038), the link is changed to a different link (step S2039). Conversely, when the currently connected link is not unstable (step S2038), the operation of the HDCP process ends.

When the frequencies of the two links are not the same frequency (step S2033) and the different frequency band is used as the other link, it is determined whether the content protection can be copied by two links (step S2040). For example, this determination is performed based on incidental information (meta information) associated with content which is a transmission target.

Here, for example, in the third embodiment of the present technology, the example in which the packets are copied by two links and are simultaneously transmitted to the wireless communication units has been described. However, when the frequency bands are different, the locality check result measured in the first link can be used. Therefore, such a process is necessary.

When the content protection may not be copied by two links (step S2040), the recent version is used in the content protection of the use link (step S2042). Conversely, when the content protection can be copied by two links (step S2040), the unicast key is set in each link (steps S2041 and S2042). In the processing procedure illustrated in FIG. 42, for example, a device key of the transmission side and a device key of the reception side may be set to one, but a common secret key or a session key may be different for each link.

[Key Exchange Example Related to Link Encryption of HDCP]

Next, a process example related to key exchange for link encryption of HDCP will be described.

FIGS. 43 and 44 are sequence charts illustrating an example of a key exchange process performed between a source device and a sink device according to the third embodiment of the present technology.

Here, when the link encryption is performed, the key exchange is performed in the following (1) to (4) processes:

(1) authentication and key exchange (AKE);
(2) pairing;
(3) locality check; and
(4) session key exchange (SKE).

Accordingly, an example of a key exchange process in accordance with the above-described (1) to (4) processes will be described below with reference to FIGS. 43 and 44.

[AKE and Pairing]

The AKE and the pairing will be described with reference to FIG. 43. FIG. 43a illustrates an example of a case in which a 128-bit master key (km) is not stored and FIG. 43b illustrates an example of a case in which the 128-bit master key (km) is stored.

The AKE is a first step of an authentication protocol. An HDCP transmitter (device A) can initiate authentication at any time even when the authentication exchange is completed previously.

The HDCP transmitter transmits a new 64-bit pseudo-random value (rtx) as a part of an authentication initiation message AKE_Init to an HDCP receiver (device B) (751). Accordingly, authentication of a new HDCP session is initiated.

Subsequently, the HDCP transmitter receives a certrx value and an AKE_Send_Cert including REPEATER from the HDCP receiver (752). REPEATER indicates whether the connected HDCP receiver is an HDCP repeater.

Here, the example of the case in which the 128-bit master key (km) is not stored will be described with reference to FIG. 43a.

The HDCP transmitter verifies a signature on a certificate using Kpubdcp. A failure of the signature verification means a failure in the authentication and the HDCP transmitter interrupts the authentication protocol. The HDCP transmitter generates a 128-bit master key (km) and transmits an AKE_No_Stored_km message to the HDCP receiver (753).

Subsequently, the HDCP transmitter receives an AKE_Send_rrx message including a 64-bit pseudo-random value (rrx) from the HDCP receiver (754). The HDCP transmitter receives an AKE_Send_H_prime message including 256-bit H' from the HDCP receiver (755). This message has to be received within 1 second after Ekpub (km) (AKE_No_Stored_km) is transmitted to the HDCP receiver.

Next, the example of the case in which the 128-bit master key (km) is stored will be described with reference to FIG. 43b.

The HDCP transmitter transmits an AKE_Stored_km message including 128-bit Ekh (km) and 128-bit m associated with a Reciver ID of the HDCP receiver to the HDCP receiver (757).

Subsequently, the HDCP transmitter receives an AKE_Send_rrx message including a 64-bit pseudo-random value (rrx) from the HDCP receiver (758). The HDCP transmitter receives an AKE_Send_H_prime message including 256-bit H' from the HDCP receiver (759). This message has to be received witin 200 mS after AKE_Stored_km is transmitted to the HDCP receiver.

When this message may not be received within 200 mS or H and H' are not identical, the authentication is determined to fail and the authentication protocol is interrupted.

[Pairing]

To quicken the AKE process, the pairing has to be performed concurrently for an HDCP reception period with the HDCP transmitter having AKE.

[Locality Check]

The locality check will be described with reference to FIG. 44a.

An HDCP transmitter initiates by generating 64-bit nounce random r_n and transmitting provisional 64-bit pseudo-random r_n to a downstream HDCP receiver (761). In this case, the HDCP transmitter starts a timer in accordance with transmission of provisional 64-bit pseudo-random r_n.

The HDCP receiver calculates "L'=HMAC–SHA 256" (r_n, k_d XOR r_rx) using the received provisional 64-bit pseudo-random r_n. Then, the HDCP receiver transmits an LC_Send_L_prime message to the HDCP transmitter (762).

When the HDCP transmitter receives the LC_Send_L_prime message (762), the HDCP transmitter calculates L using the same formula as right L' and collates L with the received L'. When L and L' are not identical, the HDCP transmitter determines that locality verification fails.

[SKE]

The session key exchange (SKE) will be described with reference to FIG. 44b.

The session key exchange (SKE) is initiated by the HDCP transmitter after the locality verification succeeds.

The HDCP transmitter HW-generates ession key k_S of a 128-bit pseudo-random number and HW-generates r_iv of a 64-bit pseudo-random number. The HDCP transmitter HW-generates 128-bit dkey_2 as ctr=2 using a slide #6 block. The HDCP transmitter encrypts k_S with dkey_2 (E_dkey (k_S)=k_S XOR (dkey_2 XOR r_rx)).

Then, the HDCP transmitter transmits r_iv and a session key E_dkey (k_s) encrypted as a part of an SKE_Send_Eks message to the HDCP receiver (763). The HDCP transmitter transmits the encrypted session key to the HDCP receiver and enables the HDCP encryption to be performed after 200 mS after the transmission of the encrypted session key.

The HDCP receiver generates 128-bit dkey_2 as ctr=2 using the slide #6 block. The HDCP receiver decodes k_S (k_S=E_dkey (k_S) OR (dkey_2 XOR r_rx)).

The content encrypted with the session key ks starts to be transmitted from the HDCP transmitter to the HDCP receiver (764).

Here, the HDCP encryption has to be possible only after the AKE, the locality verification, and the success of the SKE stage end.

The HDCP transmitter may correspond to simultaneous connection with the HDCP receiver by a plurality of HDCP-protected interface ports. The same session key and riv may be shared throughout all of the HDCP-protected interface ports (3.8 Uniqueness of ks and rtx).

However, the HDCP transmitter is assumed to ensure different km and rtx values between the connected HDCP receivers.

In this way, the control unit (corresponding to the control unit 307 illustrated in FIG. 3) of the information processing device 1010 performs the control such that the content protection of the stream related to the source device is set based on the capability information regarding the source device, the radio wave propagation measurement information regarding the communication with the source device, and the use of the information processing device 1010. In this case, when the versions of the content protection used in the plurality of frequency channels used to transmit the streams using the multi-reception diversity are different, the control unit of the information processing device 1010 performs the control such that the content protection related to the low version between the versions is set. The control unit (corresponding to the control unit 307 illustrated in FIG. 3) of the information processing device 1010 may perform control such that the HDCP setting method of the source device is selected based on the management information (illustrated in FIG. 4) regarding the source device.

[Configuration Example of Communication System]

FIG. 45 is a block diagram illustrating a functional configuration example of each information processing device included in the communication system according to the third embodiment of the present technology. FIG. 45 illustrates an information processing device 720 serving as a transmission side information processing device (source device) and an information processing device 730 serving as a reception side information processing device (sink device).

The information processing device 720 is an information processing device when a part of the information processing device 710 illustrated in FIG. 23 is modified. Therefore, the same reference numerals are given to common portions as the information processing device 710, and the description thereof will be omitted.

Units (an antenna 731 to an SEI generation unit 744) included in the information processing device 730 correspond to the units (an antenna 728 to an image data generation unit 711) included in the information processing device 720. For example, the generation units (an image data generation unit 711 to a wireless packet generation unit 726) included in the information processing device 730 correspond to the decoding units (an image data decoding unit 743 to a wireless packet decoding unit 734) included in the information processing device 720. Therefore, the description of the information processing device 730 will be omitted.

A display unit 745 is, for example, a display device that displays an image based on image data decoded by the image data decoding unit 743. As the display unit 745, for example, a display panel such as an organic EL display, a crystal LED display, or an LCD can be used. FIG. 45 illustrates an example in which the display unit 745 is provided outside the information processing device 730, but the display unit 745 may be provided inside the information processing device 730.

FIG. 45 illustrates an example in which the packet generation unit 722 corresponds to two wireless schemes (an example in which one IP address is set for 2.4 GHz, 5 GHz, and 60 GHz). That is, FIG. 45 illustrates an example of a scheme other than an example in which one IP address is set for 2.4 GHz or 5 GHz and one IP address is set for 60 GHz. The example illustrated in FIG. 45 corresponds to the example illustrated in FIG. 39.

The information processing device 720 includes an encryption generation unit 721, a packet generation unit 722, and antennas 727 and 728. These units are controlled by a control unit (corresponding to the control unit 240 illustrated in FIG. 2). The packet generation unit 722 includes a UDP generation unit 723, a TCP generation unit 724, an IP generation unit 725, and a wireless packet generation unit 726. The two antennas 727 and 728 are connected to the wireless packet generation unit 726. Here, the antenna 727 is assumed to be an antenna corresponding to 60 GHz and the antenna 728 is assumed to be an antenna corresponding to 2.4 GHz or 5 GHz.

In this way, even when the two antennas 727 and 728 are included, processes up to the IP generation unit 725 can be comprehended as one block. The wireless packet generation unit 726 corresponds to two frequency channels.

Such a configuration is defined as a transparent function of fast session transfer (FST) in IEEE802.11ad. In higher layers than the IP generation unit 725, wireless video transmission can be performed without comprehending the characteristics of the two antennas 727 and 728.

The details of switching determination of the wireless packet generation unit 726 are not described in IEEE802.11ad. Therefore, for example, the determination can be performed based on a PER, a BER, the number of retransmissions of packets, a throughput, and the like. For example, the determination may be performed based on frame drop, an SIR, an RSSI, and the like or an SINR may be used instead of an SIR.

Here, a case in which image data for which content protection necessary is transmitted in an environment in which any one wireless line is connected is assumed. Here, a case in which connection is made via the antenna 727 will be assumed for description. A connection order of the antennas 727 and 728 is not limited and any antenna may be first connected. When image data for which content protection is necessary is transmitted, any wireless line may be connected.

As in the example illustrated in FIG. 41, the encryption generation unit 721 performs an encryption process on the wireless line connected via the antenna 727 only once. In the encryption process, key exchange between the transmission side information processing device 720 and the reception side information processing device 730 is completed, and thus the image data encrypted with the key can be transmitted. In the third embodiment of the present technology, even when the wireless line is changed from the antenna 727 to the antenna 728, the key changed in the key exchange can be used until disconnection of the port of the IP generation unit 725.

On the other hand, in the process of the wireless packet generation unit 726, higher layers than the IP generation unit 725 may not comprehend whether 60 GHz is used or 2.4 GHz or 5 GHz is used in the physical layer (first layer). As described above, a stream transmission band is different by about 10 times between 60 GHz and 2.4 GHz or 5 GHz. Therefore, it is necessary to increase a compression ratio of image data when 2.4 GHz or 5 GHz is used. Accordingly, in the third embodiment of the present technology, control is performed such that the wireless packet generation unit 726 to the image data generation unit 711 (or the SEI generation unit 712) are notified in real time of channel change information or a channel set in a current situation. That is, the control unit (corresponding to the control unit 240 illustrated in FIG. 2) of the information processing device 720 performs control such that a higher layer than a layer related to the IP packet generation is notified of information regarding a frequency channel used to transmit a stream among a plurality of frequency channels.

For example, for information generated by the SEI generation unit 712, stability is necessary although a data transmission speed is low. Therefore, the information generated by the SEI generation unit 712 is preferably transmitted at 2.4 GHz or 5 GHz rather than 60 GHz. Accordingly, the wireless packet generation unit 726 uses a type of service (TOS) field of the IP header of an IP packet to transmit the information generated by the SEI generation unit 712 at a frequency channel with high stability. That is, the wireless packet generation unit 726 performs a writing process of writing frequency channel setting information on the TOS field of the IP header of an IP packet. Through the writing process, a frequency channel to which an intention of a higher layer is reflected can be set based on the TOS field of the IP header of an IP packet in the process of generating a wireless packet. That is, the control unit (corresponding to the control unit 240 illustrated in FIG. 2) of the information processing device 720 performs control such that setting information regarding the setting of a frequency channel used to transmit a stream is written on the TOP field of the IP header of an IP packet. Accordingly, it is possible to designate a physical layer to be used from a transport layer. That is, the control unit (corresponding to the control unit 240 illustrated in FIG. 2) of the information processing device 720 can perform control such that the physical layer to be used is designated from the transport layer.

An embodiment of the present technology is not limited to the example illustrated in FIG. 45. For example, in FIG. 45, the example in which only two antennas are connected to the wireless packet generation unit 726 has been described, but the number of antennas is not limited to the corresponding frequency bands. For example, when transmission is performed using IEEE802.11n/ac using a Multiple Input Multiple Output (MIMO) scheme, a plurality of antennas are used with one channel. In addition to two frequency channels, a protocol for connection to a public line, such as Bluetooth (registered trademark) or LTE, may be mounted.

In FIG. 45, the example in which the IP generation unit 725 sets one IP address has been described, but an embodiment of the present technology is not limited thereto. For example, one MAC address may be set or another fixed IP may be set.

In FIG. 45, an example in which the wireless packet generation unit 726 uses the TOS field of the IP header to transmit the information generated by the SEI generation unit 712 with the frequency channel with high stability has been described, but an embodiment of the present technology is not limited thereto. For example, even when the transparent function of the fast session transfer (FST) is used, a frequency channel may be set with a TCP packet or a UDP packet. A frequency channel may be set in accordance with a connection port or a frequency setting field may be provided in a part of a packet header.

In the third embodiment of the present technology, FIGS. 35 and 36 are assumed as the topologies in which the content protection process is performed for the description, but an embodiment of the present technology is not limited thereto. Originally, as illustrated in FIGS. 33 and 34, there is the advantage in which a process is performed in a multi-reception environment in which 1: N (where N is 2 or more) is set in the content protection. For example, a topology environment in which an information processing device performing the content transmission has an AP or PCP function or a GO function is preferable. For example, when the transmission side information processing device 1020 functions as a GO, the wireless communication unit 1011 and the wireless communication unit 1012 can be connected as clients. Thus, this topology is a topology which can be constructed even when a non-concurrent device is used. Despite depending on a device, there is a device for which one information processing device can be connected to only one GO. Therefore, in this case, the content protection process is performed in the topology illustrated in FIG. 33 or 34.

Based on whether a source device or a sink device is a mobile device, it may be determined whether transmission (switching diversity) is set while performing switching or multi-reception diversity is set. That is, it may be determined whether power consumption is reduced with only one PHY or multiple PHYs are used. When the device is a mobile device, pause may be made at the time of a sub-image.

In this way, in the third embodiment of the present technology, the multi-reception diversity can be appropriately set or switched to improve robust tolerance in a link in which high-quality video transmission is necessary in accordance with a connection form. In this way, by controlling the setting or the switching, it is possible to stably transmit and receive a high-quality video. In the topology in which an avoidance link is prepared as in the multi-reception diversity, the content protection can be appropriately set or switched. In this way, by controlling the setting and the switching, it is possible to perform communication in which robust tolerance is improved for a video for which the content protection is necessary.

According to an embodiment of the present technology, a sink device performing output based on streams from a plurality of source devices can reduce unnecessary power consumption by performing adjustment of the resolutions of the streams, transmission stop, a change in a frequency channel, or the like. Accordingly, it is possible to realize appropriate communication for a mobile device. By improving band use efficiency of the frequency channels, it is possible to realize communication in which a robust property is improved.

That is, the sink device managing a plurality of links can reduce battery consumption of a mobile device by performing scheduling. The entire system can be scheduled so that a mobile device capable of using a plurality of frequency channels uses only one frequency channel. Even in a topology in which it is necessary to completely switch a difference between frequency channels, transmission can be stably realized by facilitating switching in accordance with device information (for example, whether a device is a mobile device). Even when there is a difference between the frequency channels, each piece of information (the management information and the user information) can be appropriately interchanged. In the embodiments of the present technology, the examples of the topologies in which two links are present in regard to two source devices have been described, but an embodiment of the present technology is not limited thereto. For example, when the number of devices is 2, it is necessary to perform the stream transmission control (for example, the data transmission speed control and the scalability transmission rate control) related to the links corresponding to the number of devices, and state transition is considerable. Therefore, the control is difficult, but benefit can be obtained. For example, an embodiment of the present technology can also be applied to a topology in which two or more source devices are connected.

A sink device (for example, a display) displaying images transmitted from a plurality of source devices can appropriately display an image transmitted from each source device. For example, by setting robust tolerance (multi-reception diversity) of an image transmitted from each source device, it is possible to appropriately display each image. For example, by performing the content protection setting or the stream transmission control (for example, the data transmission speed control and the scalability transmission rate control) in a wireless layer with a large dynamic range or a multi-band operation, it is possible to appropriately display each image.

That is, for example, when a plurality of source devices are connected to one gathered monitor (for example, a monitor with an 80-inch large screen or a monitor in which a plurality of small monitors are bundled), appropriate setting can be performed according to each topology.

An embodiment of the present technology can be applied to other devices having wireless communication functions. For example, an embodiment of the present technology can be applied to imaging devices (for example, digital still cameras and digital video cameras (for example, camera-integrated recorders)) having wireless communication functions. For example, an embodiment of the present technology can also be applied to display devices (for example, televisions, projectors, and personal computers) having wireless communication functions or portable information processing devices (for example, smartphones and tablet terminals).

4. Application Example

The technology of the present disclosure can be applied to various products. For example, the information processing device 200, 300, 400, or the like may be realized as a mobile terminal such as a smartphone, a tablet-type personal computer (PC), a notebook PC, a portable game terminal, or a digital camera, a fixed-type terminal such as a television receiver set, a printer, a digital scanner, or a network storage, or an in-vehicle terminal such as a car navigation device. In addition, the information processing device 200, 300, 400, or the like may be realized as a terminal which performs machine-to-machine (M2M) communication (which is also referred to as a machine-type communication (MTC) terminal) such as a smart meter, a vending machine, a remote monitoring device, or a point-of-sale (POS) terminal. Furthermore, the information processing device 200, 300, 400, or the like 0 may be a wireless communication module (for example, an integrated circuit module configured in one die) mounted in these terminals.

4-1. First Application Example

FIG. 48 is a block diagram showing an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on a chip (SoC), and controls functions of an application layer and another layer of the smartphone 900. The memory 902 includes a random access memory (RAM) and a read only memory (ROM), and stores a program that is executed by the processor 901, and data. The storage 903 may include a storage medium such as a semiconductor memory or a hard disk. The external connection interface 904 is an interface for connecting an external device such as a memory card or a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 913 supports one or more of wireless LAN standards such as IEEE 802.11a, 11b, 11g, 11n, 11ac, and 11ad to execute wireless communication. The wireless communication interface 913 can communicate with another device via a wireless LAN access point in an infrastructure mode. In addition, the wireless communication interface 913 can directly communicate with another device in an ad hoc mode. The wireless communication interface 913 can typically include a baseband processor, a radio frequency (RF) circuit, and a power amplifier. The wireless communication interface 913 may be a one-chip module in which a memory which stores a communication control program, a processor which executes the program and a relevant circuit are integrated. The wireless communication interface 913 may support other kinds of wireless communication schemes such as a near field wireless communication scheme, a proximity wireless communication scheme or a cellular communication scheme in addition to the wireless LAN scheme. The antenna switch 914 switches connection destinations of the antenna 915 between a plurality of circuits (for example, circuits for different wireless communication schemes) included in the wireless communication interface 913. The antenna 915 has a single or a plurality of antenna elements (for example, a plurality of antenna elements which constitute a MIMO antenna), which are used by the wireless communication interface 913 for transmission and reception of radio signals.

Figure 46:
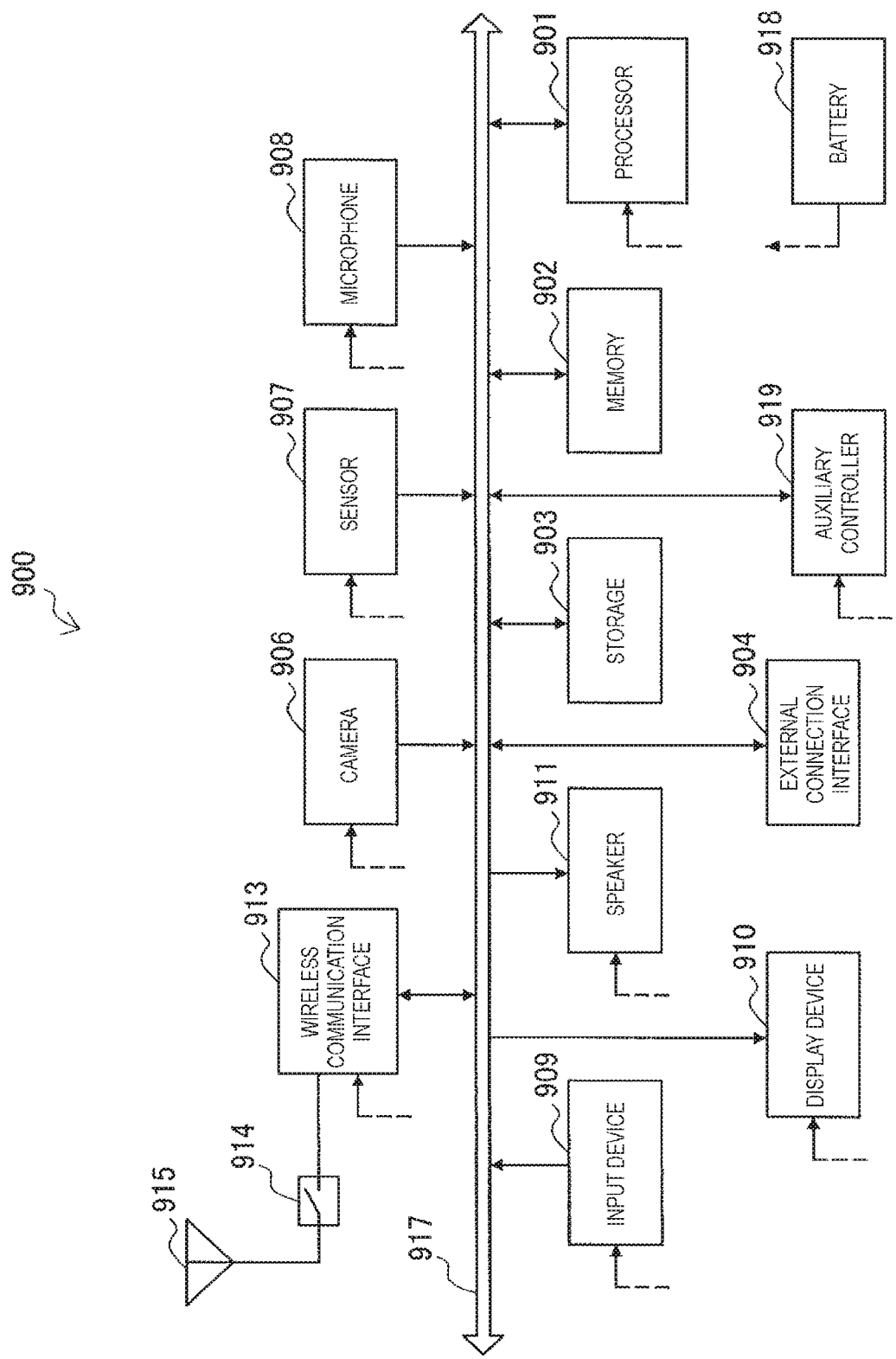
FIG. 46 is a block diagram illustrating an example of a schematic configuration of a smartphone.

It should be noted that the smartphone 900 is not limited to the example of FIG. 46 and may include a plurality of antennas (for example, an antenna for a wireless LAN, an antenna for the proximity wireless communication scheme, etc.). In that case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to each other. The battery 918 supplies power to blocks of the smartphone 900 illustrated in FIG. 46 via feeder lines, which are partially shown as dashed lines in the figure. The auxiliary controller 919 operates a minimum necessary function of the smartphone 900, for example, in a sleep mode.

In the smartphone 900 shown in FIG. 46, the wireless communication units 220 and 320, the control units 240 and 370, etc. described using FIGS. 2 and 3 may be implemented by the wireless communication interface 913. In addition, at least some of these functions may be implemented by the processor 901 or the auxiliary controller 919.

4-2. Second Application Example

Figure 47:
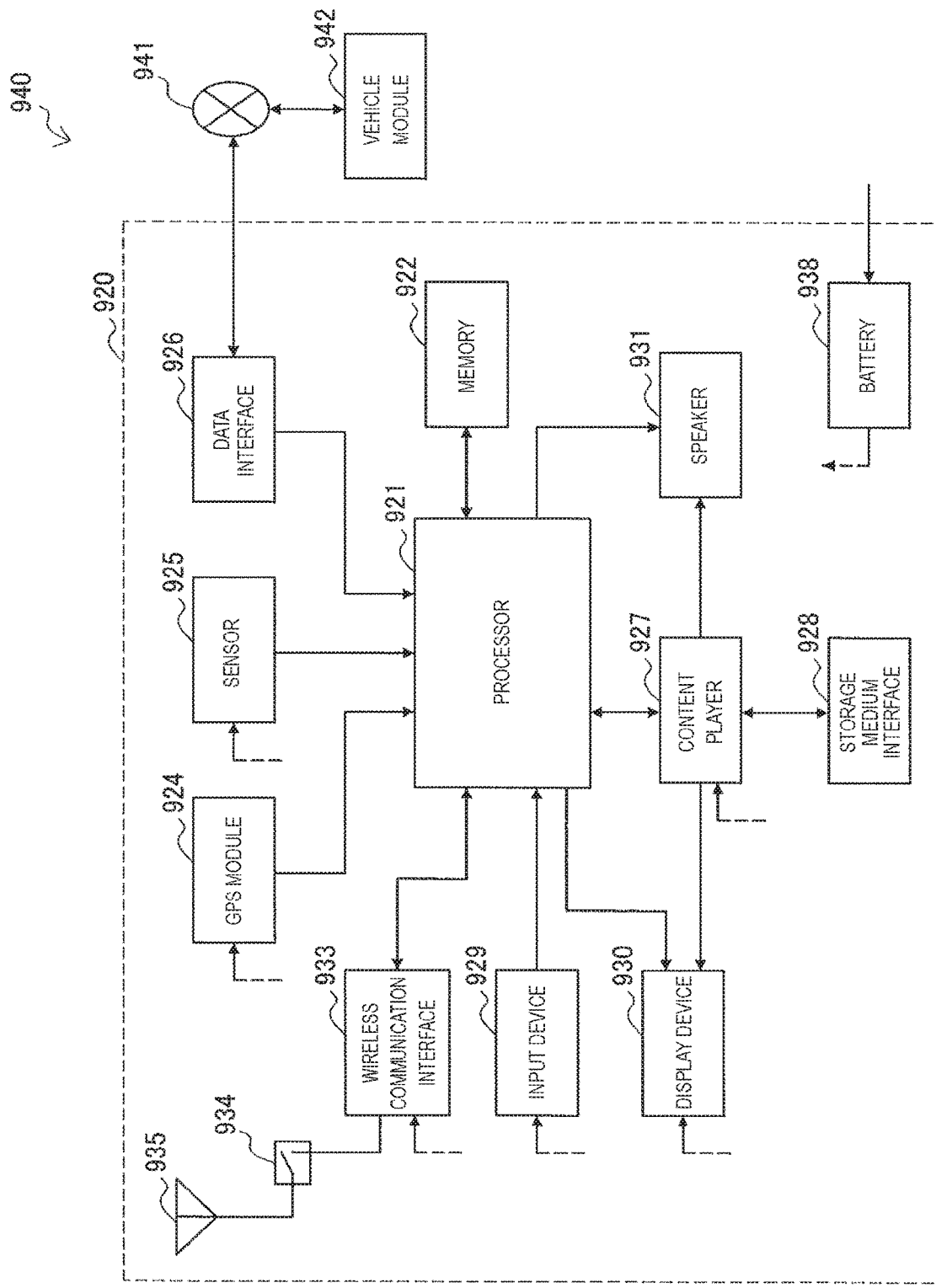
FIG. 47 is a block diagram illustrating an example of a schematic configuration of a car navigation device.

FIG. 47 is a block diagram illustrating an example of a schematic configuration of a car navigation device 920 to which the technology of the present disclosure may be applied. The car navigation device 920 includes a processor 921, a memory 922, a global positioning system (GPS) module 924, a data interface 926, a sensor 925, a content player 927, a storage medium interface 928, an input device 929, a display device 930, a speaker 931, a wireless communication interface 933, an antenna switch 934, an antenna 935, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports one or more of wireless LAN standards such as IEEE 802.11a, 11b, 11g, 11n, 11ac, and 11ad to execute wireless communication. The wireless communication interface 933 can communicate with another device via a wireless LAN access point in an infrastructure mode. In addition, the wireless communication interface 933 can directly communicate with another device in an ad hoc mode. The wireless communication interface 933 can typically include a baseband processor, an RF circuit, and a power amplifier. The wireless communication interface 933 may be a one-chip module in which a memory which stores a communication control program, a processor which executes the program and a relevant circuit are integrated. The wireless communication interface 933 may support other kinds of wireless communication schemes such as a near field wireless communication scheme, a proximity wireless communication scheme or a cellular communication scheme in addition to the wireless LAN scheme. The antenna switch 934 switches connection destinations of the antenna 935 between a plurality of circuits included in the wireless communication interface 933. The antenna 935 has a single or a plurality of antenna elements, which are used by the wireless communication interface 933 for transmission and reception of radio signals.

In addition, the car navigation device 920 may include a plurality of antennas, not limited to the example of FIG. 47. In that case, the antenna switches 934 may be omitted from the configuration of the car navigation device 920.

The battery 938 supplies power to blocks of the car navigation device 920 illustrated in FIG. 47 via feeder lines that are partially shown as dashed lines in the figure. The battery 938 accumulates power supplied form the vehicle.

In the car navigation device 920 illustrated in FIG. 47, the wireless communication units 220 and 320, the control units 240 and 370, etc. that have been described with reference to FIGS. 2 and 3 may be implemented by the wireless communication interface 933. At least a part of the functions may also be implemented by the processor 921.

The technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a hard disk, a CD (Compact Disc), an MD (Mini-Disc), and a DVD (Digital Versatile Disc), a memory card, and a Blu-ray disc (registered trademark) can be used.

Effects described in the present description are just examples, the effects are not limited, and there may be other effects.

Additionally, the present technology may also be configured as below.

(1)

An information processing device which receives a stream for outputting image information from another information processing device by using wireless communication, the information processing device including:

a wireless communication unit configured to perform communication for exchanging capability information regarding the information processing device and capability information regarding the other information processing device with the other information processing device; and a control unit configured to perform scalability transmission rate control of a stream of the other information processing device based on the capability information regarding the other information processing device and a use of the information processing device.

(2)

The information processing device according to (1), wherein the information processing device and the other information processing device are information processing devices which can perform wireless communication using a plurality of frequency channels, and wherein the control unit performs control of setting one frequency channel among the plurality of frequency channels based on the capability information regarding the other information processing device, radio wave propagation measurement information regarding communication with the other information processing device, and the use of the information processing device.

(3)

The information processing device according to (2), wherein the control unit performs control of setting the one frequency channel based on the radio wave propagation measurement information obtained by measuring the stream from the other information processing device while the plurality of frequency channels are switched and the use of the information processing device.

(4)

The information processing device according to (2), wherein, when communication quality specified by the radio wave propagation measurement information decreases and thus it is necessary to restrict the scalability transmission rate control, the control unit performs control of changing a frequency channel to be used to a frequency channel with a faster data transmission speed based on the radio wave propagation measurement information and the use of the information processing device.

(5)

The information processing device according to (2), wherein, when communication quality specified by the radio wave propagation measurement information decreases and thus it is necessary to restrict the scalability transmission rate control, the control unit performs control of changing a frequency channel to be used to a frequency channel with a slower data transmission speed based on the radio wave propagation measurement information and the use of the information processing device.

(6)

The information processing device according to (2), wherein, before a frequency channel being used is switched to another frequency channel, the control unit performs control of restricting the scalability transmission rate.

(7)

The information processing device according to any of (2) to (6), wherein the control unit performs control of causing display information regarding whether to disconnect a frequency channel being used to be displayed on a display unit.

(8)

The information processing device according to any of (2) to (7), wherein, when a user manipulation indicating that disconnection of a frequency channel being used is not permitted has been received, the control unit performs control of switching the frequency channel.

(9)

The information processing device according to any of (1) to (8), wherein the wireless communication unit performs the exchange of the capability information by capability negotiation or capability re-negotiation defined in the Wi-Fi Display specification.

(10)

The information processing device according to (9), wherein the capability information is exchanged by an RTSP M3 Message in the capability negotiation or capability re-negotiation.

(11)

The information processing device according to any of (1) to (10), wherein the capability information includes information indicating whether a device is a mobile device.

(12)

The information processing device according to any of (1) to (11), wherein the capability information includes information indicating whether the use of the information processing device is changed.

(13)

The information processing device according to any of (1) to (12), wherein the capability information includes information indicating whether a multi-reception diversity function is included.

(14)

The information processing device according to any of (1) to (13), wherein the control unit performs control in a manner that stop of transmission or intermittent transmission of the stream is performed when a low power-consumption mode is set.

(15)

The information processing device according to any of (1) to (14), wherein the control unit causes at least one of a change request for a transmission rate and a change request for transmission quality to be included in a command transmitted from the information processing device to the other information processing device.

(16)

The information processing device according to (15), wherein the control unit uses a command in a state in which an HDCP session is maintained as the command.

(17)

The information processing device according to any of (1) to (16), wherein the control unit performs control in a manner that a physical layer to be used is designated from a transport layer.

(18)

The information processing device according to any of (1) to (17), wherein the control unit receives physical link switch information and performs control in a manner that AVC/HEVC starts from an I frame.

(19)

An information processing device which transmits a stream for outputting image information to another information processing device by using wireless communication, the information processing device including:

a wireless communication unit configured to perform communication for exchanging capability information regarding the information processing device and capability information regarding the other information processing device with the other information processing device; and a control unit configured to perform scalability transmission rate control of a stream of the other information processing device on the basis of control performed by the other information processing device based on the capability information regarding the information processing device and a use of the other information processing device.

(20)

An information processing method for receiving a stream for outputting image information from another information processing device by using wireless communication, the information processing method including:

a wireless communication procedure of performing communication for exchanging capability information regarding the information processing device and capability information regarding the other information processing device with the other information processing device; and a control procedure of performing scalability transmission rate control of a stream of the other information processing device based on the capability information regarding the other information processing device and a use of the information processing device.

REFERENCE SIGNS LIST 100 communication system
200 information processing device
210 antenna
220 wireless communication unit
230 control signal reception unit
240 control unit
250 image and audio signal generation unit 260 image and audio compression unit
270 stream transmission unit
300 information processing device
310 antenna
320 wireless communication unit
330 stream reception unit
340 image and audio decompression unit
350 image and audio output unit
351 display unit
352 audio output unit
360 user information acquisition unit
370 control unit
380 control signal transmission unit
390 management information retention unit
400 information processing device
700 communication system
710 information processing device
711 image data generation unit
712 SEI generation unit
713 NAL generation unit
714 PES generation unit
715 TS generation unit
716 RTP generation unit
717 packet generation unit
718 antenna
719 imaging unit
720 information processing device
721 encryption generation unit
722 packet generation unit
723 UDP generation unit
724 TCP generation unit
725 IP generation unit
726 wireless packet generation unit
727, 728 antenna
730 information processing device
731, 732 antenna
733 packet decoding unit
734 wireless packet decoding unit
735 IP decoding unit
736 UDP decoding unit
737 TCP decoding unit
738 RTP decoding unit
739 TS decoding unit
740 encryption decoding unit
741 PES decoding unit
742 NAL decoding unit
743 image data decoding unit
744 SET generation unit
745 display unit
1000 communication system
1010, 1020, 1030 information processing device
1011 to 1013 wireless communication unit
1101 application memory
1102 to 1104 memory

The invention claimed is:

1. An information processing device comprising:
wireless communication circuitry configured
to acquire first capability information regarding a first information processing device and second capability information regarding a second information processing device,
to receive a first stream for outputting first image information from the first information processing device by using wireless communication with a first link based on the first capability information,
to receive a second stream for outputting second image information from the second information processing device by using the wireless communication with a second link based on the second capability information; and
processing circuitry configured to perform scalability transmission rate control by which spatial, temporal, or SNR scalability encoding of the first stream and the second stream for simultaneously outputting the first and second image information based on the first capability information regarding the first information processing device, and the second capability information regarding the second information processing device, and
wherein the information processing device and the first and the second information processing devices are information processing devices that perform wireless communication using a plurality of frequency channels, and
when one of the first link or the second link is determined to be unstable, transmit change information to the first and second information processing devices, the change information including information regarding changes to both a frequency channel and an encoding rate used in the first link and the second link.

2. The information processing device according to claim 1,
wherein the processing circuitry performs control of setting one frequency channel among the plurality of frequency channels based on the capability information regarding the first and the second information processing device, radio wave propagation measurement information regarding the first and the second links with the first and second information processing device.

3. The information processing device according to claim 2, wherein the processing circuitry performs control of setting the one frequency channel based on the radio wave propagation measurement information obtained by measuring the stream from the first or the second information processing device while the plurality of frequency channels are switched.

4. The information processing device according to claim 2, wherein, when one of the first or the second links is determined to be unstable by the radio wave propagation measurement information, the processing circuitry performs control of changing a frequency channel to be used to a frequency channel with a faster data transmission speed based on the radio wave propagation measurement information.

5. The information processing device according to claim 2, wherein, when one of the first or the second links is determined to be unstable by the radio wave propagation measurement information, processing circuitry performs control of changing a frequency channel to be used to a frequency channel with a slower data transmission speed based on the radio wave propagation measurement information and the use of the information processing device.

6. The information processing device according to claim 2, wherein, before a frequency channel being used is switched to another frequency channel, the processing circuitry performs control of restricting the scalability transmission rate.

7. The information processing device according to claim 2, wherein the processing circuitry performs control of causing display information regarding whether to disconnect a frequency channel being used to be displayed on a display unit.

8. The information processing device according to claim 2, wherein the processing circuitry performs control of switching a frequency channel when a user manipulation indicating that disconnection of the frequency channel being used is not permitted, has been received.

9. The information processing device according to claim 1, wherein the wireless communication circuitry performs the exchange of the capability information by capability negotiation or capability re-negotiation defined in the Wi-Fi Display specification.

10. The information processing device according to claim 9, wherein the capability information is exchanged by an RTSP M3 Message in the capability negotiation or capability re-negotiation.

11. The information processing device according to claim 1,
wherein the capability information includes information indicating whether a device is a mobile device.

12. The information processing device according to claim 1,
wherein the capability information includes information indicating whether the use of the information processing device is changed.

13. The information processing device according to claim 1,
wherein the capability information includes information indicating whether a multi-reception diversity function is included.

14. The information processing device according to claim 1,
wherein the processing circuitry performs control in a manner that stop of transmission or intermittent transmission of the stream is performed when a low power-consumption mode is set.

15. The information processing device according to claim 1, wherein the processing circuitry causes at least one of a change request for a transmission rate and a change request for transmission quality to be included in the change information transmitted from the information processing device to the first and the second information processing device.

16. The information processing device according to claim 15, wherein the processing circuitry uses a command in a state in which an HDCP session is maintained as the command.

17. The information processing device according to claim 1,
wherein the processing circuitry performs control in a manner that a physical layer to be used is designated from a transport layer.

18. The information processing device according to claim 1,
wherein the processing circuitry receives physical link switch information including information about switching a link and performs control in a manner that advanced video coding (AVC)/high efficiency coding (HEVC) starts from an Intra-coded frame (I frame).

19. An information processing device comprising:
wireless communication circuitry configured to
transmit first capability information regarding the information processing device to a first information processing device by using wireless communication,
transmit a first stream for outputting first image information to the first information processing device by using wireless communication with a first link based on the first capability information, the first information processing device second capability information regarding a second information processing device and receiving the first stream and a second stream for outputting second image information from a second information processing device by using the wireless communication with a second link based on the second capability information; and
processing circuitry configured to perform scalability transmission rate control by which spatial, temporal, or SNR scalability encoding of the first and second streams for simultaneously outputting of the first and second image information on the basis of control performed by the first information processing device based on the first capability information regarding the first information processing device, and the second capability information regarding the second information processing device, and
wherein the information processing device and the first and the second information processing device are information processing devices that perform wireless communication using a plurality of frequency channels, and
when one of the first link or the second link is determined to be unstable, transmit change information to the first and second information processing devices, the change information including information regarding changes to both a frequency channel and an encoding rate used in the first link and the second link.

20. An information processing method comprising:
acquiring first capability information regarding a first information processing device and second capability information regarding a second information processing device,
receiving, by wireless communication circuitry of an information processing device, a first stream for outputting first image information from the first information processing device by using wireless communication with a first link based on the first capability information,
receiving, by wireless communication circuitry of the information processing device, a second stream for outputting second image information from the second information processing device by using the wireless communication with a second link based on the second capability information; and
performing, by processing circuitry of the information processing device, scalability transmission rate control by which spatial, temporal, or SNR scalability encoding of the first stream and the second stream for simultaneously outputting the first and second image information based on the first capability information regarding the first information processing device, and the second capability information regarding the second information processing device,
wherein the information processing device and the first and the second information processing device are information processing devices that perform wireless communication using a plurality of frequency channels, and
when one of the first link or the second link is determined to be unstable, transmit change information to the first and second information processing devices, the change information including information regarding changes to both a frequency channel and an encoding rate used in the first link and the second link.

* * * * *